United States Patent
Suzuki et al.

(10) Patent No.: US 7,013,326 B1
(45) Date of Patent: Mar. 14, 2006

(54) CHAT SYSTEM, DUMMY CLIENT SYSTEM FOR CHAT SYSTEM, AND COMPUTER READABLE MEDIUM STORING DUMMY CLIENT PROGRAM

(75) Inventors: Norihiko Suzuki, Kawasaki (JP); Toshihisa Eto, Oita (JP); Shin Zukeran, Naha (JP); Kentaro Kamioka, Naha (JP); Minoru Kawata, Kawasaki (JP); Toshihide Hida, Kawasaki (JP); Noboru Yamada, Kawasaki (JP); Eri Nakai, Kawasaki (JP); Yukiko Itakura, Kawasaki (JP); Miki Kamiya, Kawasaki (JP); Toshihiko Hirabayashi, Kawasaki (JP); Ichiroh Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 962 days.

(21) Appl. No.: 09/671,101

(22) Filed: Sep. 27, 2000

(30) Foreign Application Priority Data

Oct. 8, 1999 (JP) .......................................... 11-287941

(51) Int. Cl.
*G06F 15/16* (2006.01)

(52) U.S. Cl. ...................... 709/204; 709/203; 709/206; 709/223; 709/224

(58) Field of Classification Search ................ 709/204, 709/223, 224, 206, 218, 203, 205, 227
See application file for complete search history.

(56) References Cited

U.S. PATENT DOCUMENTS

| | | | | | |
|---|---|---|---|---|---|
| 5,664,126 | A | * | 9/1997 | Hirakawa et al. ........... | 345/751 |
| 5,987,503 | A | * | 11/1999 | Murakami ................... | 709/204 |
| 6,021,433 | A | * | 2/2000 | Payne et al. ................ | 709/219 |
| 6,038,296 | A | * | 3/2000 | Brunson et al. ........ | 379/100.11 |
| 6,212,548 | B1 | * | 4/2001 | DeSimone et al. ......... | 709/204 |
| 6,282,511 | B1 | * | 8/2001 | Mayer ........................ | 704/270 |
| 6,332,120 | B1 | * | 12/2001 | Warren ........................ | 704/235 |
| 6,345,290 | B1 | * | 2/2002 | Okada et al. ............... | 709/204 |
| 6,393,461 | B1 | * | 5/2002 | Okada et al. ............... | 709/204 |
| 6,438,611 | B1 | * | 8/2002 | Hara et al. ................... | 709/248 |
| 6,519,571 | B1 | * | 2/2003 | Guheen et al. ............... | 705/14 |
| 6,584,494 | B1 | * | 6/2003 | Manabe et al. ............. | 709/204 |
| 6,618,726 | B1 | * | 9/2003 | Colbath et al. ................ | 707/6 |
| 6,622,122 | B1 | * | 9/2003 | Fukushige et al. .......... | 704/257 |
| 2002/0059098 | A1 | * | 5/2002 | Sazawa et al. ................ | 705/14 |

FOREIGN PATENT DOCUMENTS

| JP | 10190729 | | 7/1998 |
|---|---|---|---|
| JP | 10190729 | A * | 7/1998 |

* cited by examiner

*Primary Examiner*—Frantz B. Jean
(74) *Attorney, Agent, or Firm*—Greer, Burns & Crain, Ltd.

(57) ABSTRACT

A dummy client accesses each channel of a chat system. When a message is transmitted from a client to a channel, the dummy client checks the content of the message. If the message satisfies a predetermined sentence condition, the dummy client executes a process corresponding to the sentence condition and to the content of each sentence segment included in the message.

35 Claims, 33 Drawing Sheets

Fig. 3

Channel Management Table

| Channel | User | Last Speaking Time | Keywords in the last utterance |
|---|---|---|---|
| Channel 1 | User A | 12:00 | |
| | ...... | ...... | ...... |
| Channel 2 | User C | 12:30 | |
| | ...... | ...... | ...... |
| ... | ... | ... | ... |

Message Table

| Requesting User | Addressee | Receiving Time and Date | Message |
|---|---|---|---|
| | | | |

Time and Date Specified Message Table

| Requesting User | Addressee | Specified Time and Date | Message |
|---|---|---|---|
| | | | |

Contact Registry Table

| Contact User Name | Communication Method Type | Contact Address | Registering User's Name | Registering Time |
|---|---|---|---|---|
| | | | | |

Schedule Reference Support Table

| Nickname | Real Name | Department Name |
|---|---|---|
| | | |

Alarm Management Table

| Registering User | Specified Time | Message |
|---|---|---|
| | | |

Keyword Registry Table

| Registering User | Registerd Keyword | Registerd Character String | Specified Channel |
|---|---|---|---|
| | | | |

18

CHAT SYSTEM, DUMMY CLIENT SYSTEM FOR CHAT SYSTEM, AND COMPUTER READABLE MEDIUM STORING DUMMY CLIENT PROGRAM

BACKGROUND OF THE INVENTION

1. Field of the Invention

This invention relates to a dummy client device, which is connected to a channel in which a chat server is providing chat service, and which automatically conducts information exchange among other clients concurrently connected to that channel. This invention also relates to a computer readable medium which causes a computer to function as such a dummy client device. This invention further relates to a chat system constructed of such a chart server and such a dummy client.

2. Description of the Related Art

In the past, various computer network providers have been offering chat services in which conversations or conferences among multiple terminals (users) is possible in real time via access to a host computer through a computer network. Especially in the recent years, due to vast popularity of the Internet, chat services that utilize the IRC (Internet Relay Chat) protocol have been provided. The concept of the chat service in accordance with the IRC protocol is explained with reference to FIG. 37.

In the figure, an IRC server 100 and client terminals 101 of respective users can mutually communicate through the Internet N. This IRC server 100 creates a plurality of logical channels (channel 1, channel 2). The client terminals 101 are connected to IRC server 100 in accordance with IRC protocol. Moreover, each client terminal accesses one of channels created by the IRC server 100. Needless to say, each channel can be connected to multiple client terminals 101. Also, each client terminal 101 can be connected to multiple channels at the same time. In the example of the figure, client terminal 101A of user A is connected to channels 1 and 2. Client terminal 101B of user B is connected to the channel 1. Client terminal 101C of user C is connected to the channel 2.

The user at a client terminal 101 that is connected to any one of the available channels can send messages to that channel which corresponds a physical area in the RAM assigned to the channel in the computer executing the IRC server 100. The messages sent to the channel in this way are immediately sent to all client terminals 101 for the users, which are connected to the corresponding channel. Accordingly, on this channel, all users of client terminals 101 that are connected to that channel can chat or conduct conferences with each other in real time.

However, the conventional chat system is designed solely for providing conversations among users-i.e., an environment for real time information exchange. Accordingly, at least two client terminals must be connected to one channel. More specifically, even if a user connects his or her client terminal to a certain channel for the purpose of chatting with another person, the conversation will not be established in case another client terminal does not access the same channel. Thus, the user has to wait until another client terminal accesses the channel, or otherwise, has to give up the conversation and terminate the access to the channel. This is the first problem of the conventional art.

Besides, when an user needs to convey information to another user or needs to have conversation with another user, they have to schedule such sessions in advance through other communication means (such as telephone and electric mail) in order to access the channel at the same time. Also, they have to adjust their own schedules to make such a session possible. These inconveniences significantly impairs the utility of information exchange through the chat system. This is the second problem of the conventional art.

Also, even when multiple client terminals (multiple users) access a particular channel so that a conversation is established among these users, if information that none of the users holds becomes to be referred by the chatting user, they have to retrieve such information with tools other than the chat system, such as Web browsers, etc. Also, in case that an urgent contact to another user who does not access the channel is required, such a contact needs to be made through communication method other than the chat system. These procedures are very inconvenient for users participating real time conversation, and may deteriorate efficiency of the conversation. This is the third problem of the conventional art.

SUMMARY OF THE INVENTION

A main object of the present invention is to provide, in solving the above-mentioned first problem, a dummy client device that behaves as an independent client with respect to another client terminal, which is connected to a chat server, and automatically exchanges information with that client terminal in response to the content of an utterance sent from the client terminal. The object also includes providing a computer readable medium storing a dummy client program that causes a computer to function as such a dummy client device. The object further includes providing a chat system constructed of such a dummy client and such a chat server.

A first adjective object of the present invention is to provide, in solving the above-mentioned second problem, a dummy client device that is capable of storing a message addressed to another user, which is included in an utterance sent from a client terminal connected to a chat server in accordance with the content of the utterance sent from the client terminal, and of forwarding such a message addressed to the user in accordance with the content of an utterance sent from the client terminal of the user. The object also includes providing a computer readable medium storing a dummy client program that causes a computer to function as such a dummy client device. The object further includes providing a chat system constructed of such a dummy client and such a chat server.

A second adjective object of the present invention is to provide, in solving the above-mentioned third problem, a dummy client device that requests, on behalf of a client terminal of a user connected to a particular channel, one of back-end servers to perform a designated process, which has been requested in a message sent from that client terminal. The object also includes providing a computer readable medium storing a dummy client program that causes a computer to function as such a dummy client device. The object further includes providing a chat system constructed of such a dummy client and such a chat server.

To achieve the above-mentioned main object, the present invention provides a dummy client device for conducting a chat with a client device though a chat server, the dummy client device including a monitoring part monitoring the content of an utterance sent to the chat server from a client device, a determination part determining whether the content of an utterance monitored by the monitoring part satisfies a predetermined sentence condition, and a process execution part executing a process corresponding to the predetermined sentence condition in accordance with the content of the utterance when the determination part determines that the utterance satisfies the predetermined sentence condition.

With such a construction, by transmitting an utterance satisfying a predetermined sentence condition to the chat server, a user using a client connected to the chat server can instruct the dummy client device to perform a designated process in accordance with the sentence condition even when other client are not connected to the chat server. That is, in such a dummy client device, the monitoring part is always monitoring the content of utterances sent from each client to the chat server. Thus, when an utterance satisfying the predetermined condition is sent, the determination part determines that the utterance satisfies the sentence condition. Then, the process execution part executes the designated process corresponding to the sentence condition in accordance with the content of the utterance. Accordingly, the user that has sent out such an utterance can perform some of desired operations with respect to the dummy client device without waiting for the other client to come in connection with the chat server. Here, the dummy client device may be constructed by a computer that is different from that for the chat server, or alternatively, may be constructed of the same computer. In the latter case, the computer logically includes an object functioning as the chat server in accordance with programs of the chart server and an object functioning as the dummy client server in accordance with programs for the dummy client server.

BRIEF DESCRIPTIONS OF THE DRAWINGS

The invention will be described below in detail with reference to the accompanying drawings, in which:

FIG. 3 shows a configuration of a channel management table;

FIG. 4 shows a configuration of a message table;

FIG. 5 shows a configuration of a time and date specified message table;

FIG. 6 shows a configuration of a contact registry table;

FIG. 7 shows a configuration of a schedule reference support table;

FIG. 8 shows a configuration of an alarm management table;

FIG. 9 shows a configuration of a keyword registry table;

DESCRIPTION OF THE PREFERRED EMBODIMENTS

The preferred embodiments of the present invention will now be described in detail below with reference to the drawings.

Schematic Configuration of a Chat System

Figure 1:
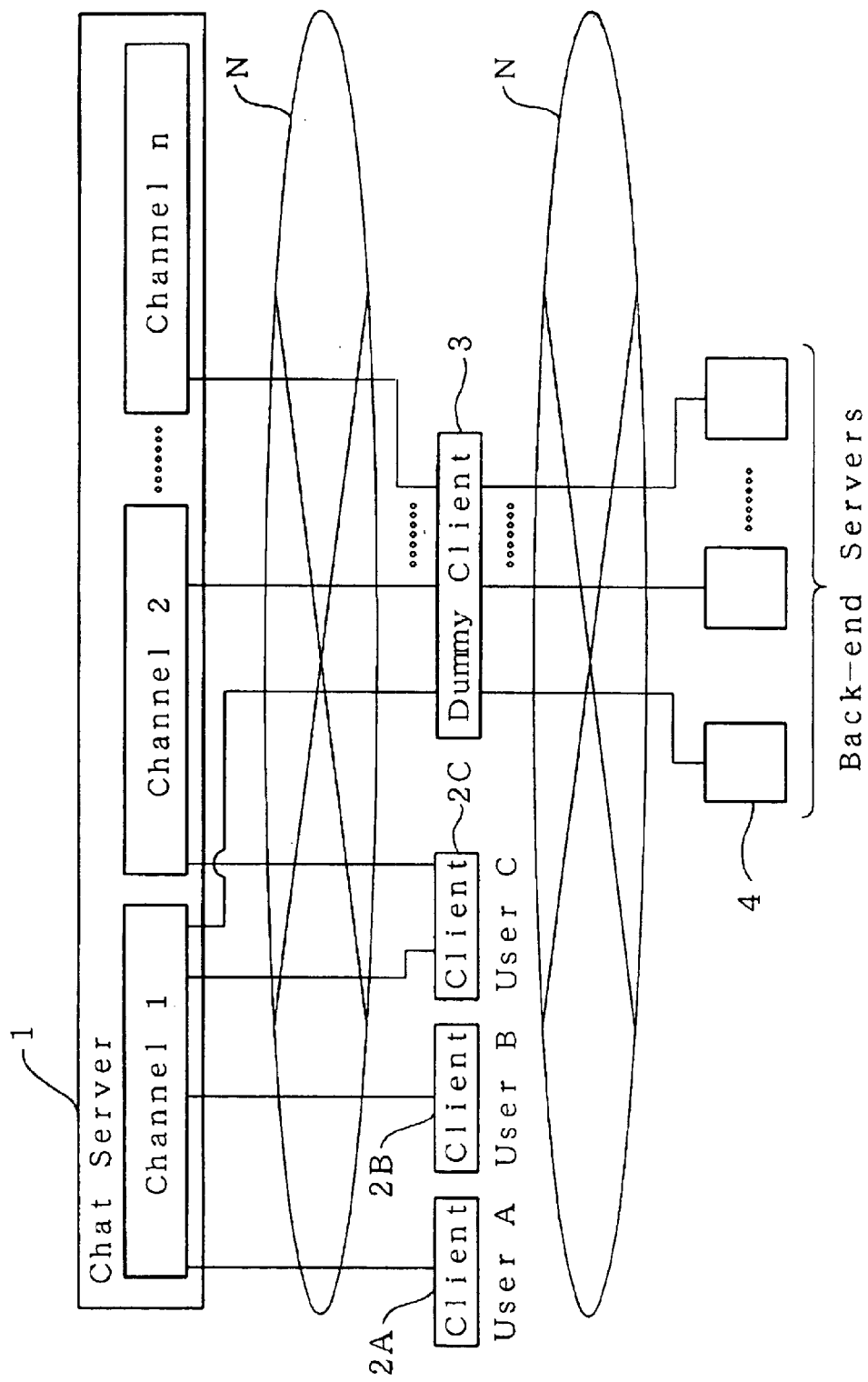
FIG. 1 is a block diagram showing an entire configuration of a chat system according to a preferred embodiment of the present invention.

FIG. 1 is a block diagram showing a schematic configuration of a chat system according to the present preferred embodiment. As shown in FIG. 1, this chat system is constructed of a chat server 1, a plurality of client terminals 2A through 2C, a dummy client device 3, and a plurality of back-end servers 4. The plurality of client terminals 2A–2C is configured to be capable of communicating with the chat server 1 through Internet N (in accordance with IRC protocol). The back-end servers 4 are configured to be capable of communicating with the dummy client device 3 through the Internet N.

The chat server device 1 is a computer, which executes a general IRC (Internet Relay Chat) server program. The hardware of the chat server device 1 is that for a general-purpose server computer, so programs other than the IRC server program can be executed. However, because only its function according to the IRC server program is focused here, the computer is simply referred to as "chat server" hereinafter.

Also, each of client devices 2A through 2C is a computer which executes a general chat tool program (Browser). The hardware of each client device 2A through 2C is that for a personal computer having general communication functions, so the programs other than chat client programs can be executed. However, because only its function according to the chat client program is focused here, these computers are simply referred to as "client" hereinafter.

Also, the dummy client device 3 is a computer executing a dummy client program that will be described later. The hardware of the dummy client 3 is that for a personal computer having general communicating functions, or the client 3 can be implemented in the server computer 1. However, because only its function according to the dummy client program is focused here, the dummy client device 3 is simply referred to as "dummy client" hereinafter.

Above described chat server 1 logically creates multiple channels and provides chat services to every channel. That is, when a connection specifying its server name and a port number is requested by one client 2 to the chat server 1, the chat server 1 connects this client 2 and allows that client 2 to communicate with it. When the connected client 2 specifies any one of channels to be used, the chat server 1 makes the client 2 access the specified channel so that the client 2 can participate a chat or conversation. That is, the chat server 1 allows that newly connected client 2 to transmit messages to the specified channel, and transmits (forwards) messages sent from any of the clients 2 that are connecting to the channel towards all the clients 2 in real time. Accordingly, the chat server 1 provides an environment in which clients 2 connecting to a channel can freely exchange information (make a conversation) in real time.

Also, the chat server 1 is equipped with a user management table for managing identification information indicating the identities of clients 2 currently connected to each channel. The identifying information typically includes, for example, a nickname of each user who is using a client 2 currently connected to the corresponding channel, for example. Further, when the client 2 connects to a channel for the first time, it sends a message notifying the connection. Such a message is called "JOIN message." By detecting this "JOIN message," the chat server 1 registers necessary items corresponding to the user in the user management table.

Although FIG. 1 shows only one chat server 1, more than one chat server may be provided for allowing access from each client 2 through the Internet N. Also, each of the clients 2 can simultaneously connect to multiple channels provided by a single chat server 1.

Here, messages sent from a particular client 2 to a specified channel is actually sent or forwarded to all the clients 2 connecting to the channel. However, if a message, that is an utterance, is directed to a particular receiver, the form of the message is usually such that the nickname of the person to which the message or the utterance is directed is added to the main message as identification information, that is, "the nickname of the person directed>main messages.".

The above-described dummy client 3 can connect to all the channels that are created by the chat server 1 with the same authority as that of actual clients 2. Contrary to the situation where a real client 2 sends out messages in accordance with operation by its user, the dummy client 3 automatically performs various processes (including sending out a message) in response to messages sent from any of real clients 2 through each channel. The dummy client 3 performs such automatic operations in accordance with algorithms that have been programmed in advance.

Here, the dummy client 3 may communicate with various back-end servers 4, if necessary, upon executing processes in response to messages from clients 2. Such communications may include retrieving necessary information from back-end servers 4, and requesting the back-end servers 4 to perform predetermined processes, etc. Also, because the chat server 1 responds to the inquiry from the dummy client 3 as to which user is connected to which channel, the chat server 1 may also be regarded as one of the back-end servers 4. Other examples of the back-end server 4 include, but are not limited to, a mail server (SMTP server) for sending e-mail to a specified address, a FAX mail server for sending message by facsimile, a dictionary server providing translation of a term the meaning of which is requested, a search server (portal site) for searching the URL of a home page based on key words, a personal information management server for providing the personal information of a person requested, and a calendar server for managing the reservation status of the conference rooms (places) at each departments of a company and for managing the schedule of members who belongs to the corresponding department.

Configuration of a Dummy Client Device

Figure 2:
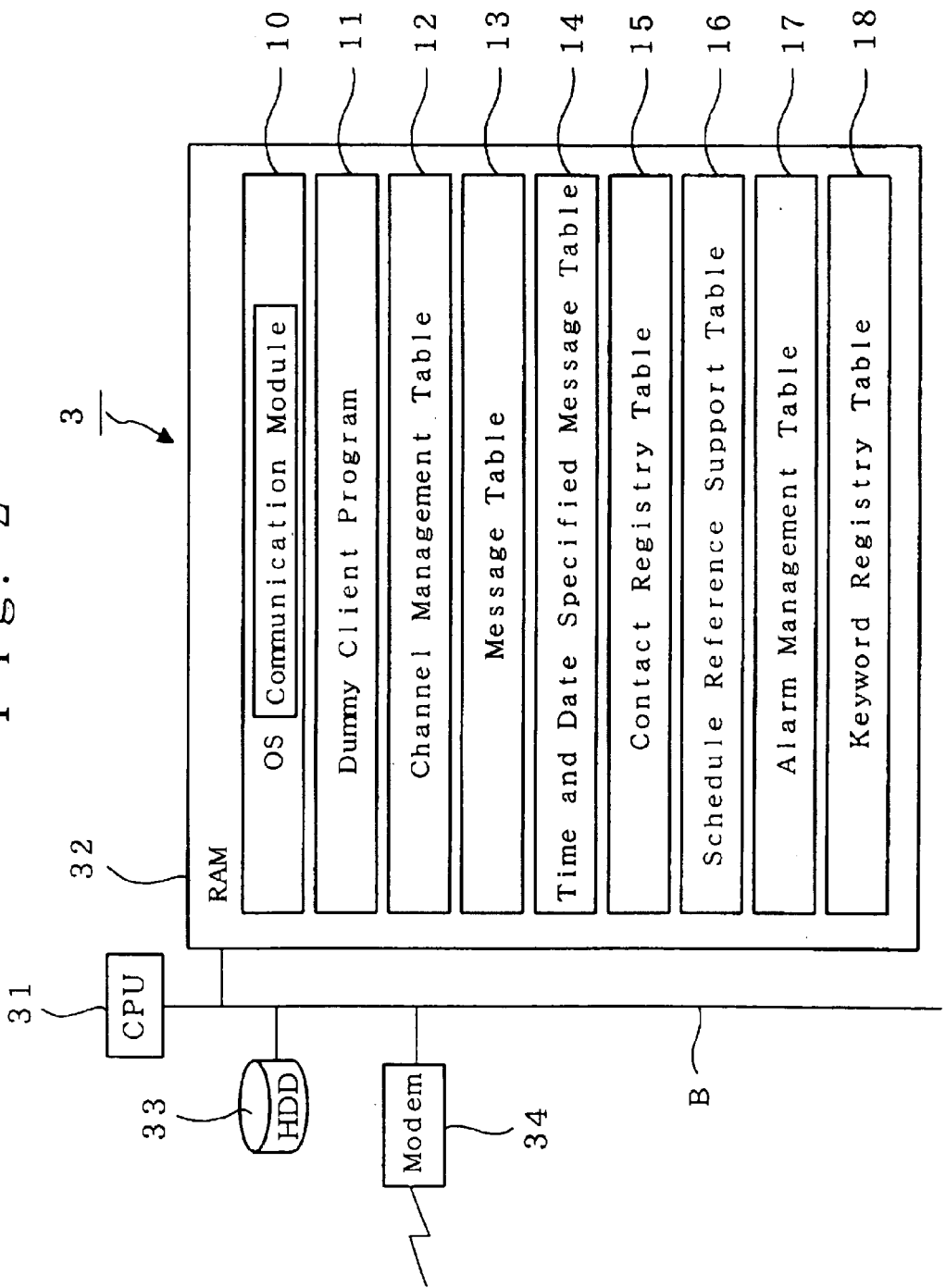
FIG. 2 is a block diagram showing an internal configuration of a dummy client device.

Next, a configuration of the dummy client device 3 is explained with reference to a block diagram of FIG. 2. As described above, the hardware of dummy client device 3 is that for a general-purpose computer (a personal computer or server computer) having a CPU 31, a RAM 32, an HDD 33, and a modem 34. These components are connected though a bas B.

A hard disk 33 is a computer-readable medium that stores an operating system program 10 including a communication module (Microsoft Windows® 95 or 98, for example) and a dummy client program 11, which is an application program.

By reading out the operating system program 10 and the dummy client program 11 from the hard disk 33 and executing them, the CPU 31 can execute operations that have been programmed by the dummy client program 11 in advance.

Upon receiving data that are to be transmitted through the Internet N form the CPU 31, the modem 34 modulates the data into signals of transmittable form. In accordance with instructions from the CPU 31, upon receiving data through the Internet N, the modem 34 demodulates the data into signals that can be processed by the CPU 31. Here, this modem 34 may be substituted with a DSU (Digital Signal Unit) and an TA (Terminal Adapter), or other communication device, depending upon the form of the communication medium connecting the Internet N to the dummy client device 3.

The RAM 32 functions as providing storage spaces where a paging of a module of the program 11 is performed when the CPU 31 executes the programs 10 and 11, where data received through the Internet N are temporarily saved, and where data generated when the CPU 31 executes each of the programs 10 and 11 are temporarily saved. FIG. 2 shows a part of data and programs 10 and 11 existing in the RAM 32 at any moment within a certain time period. Because dummy client program 11 will be explained in detail later, a channel management table 12, a message table 13, a time and date specified message table 14, a contact registry table 15, a schedule reference support table 16, an alarm management table 17, and a keyword registry table 18 are explained next. These tables are generated when the CPU 31 executes the dummy client program 11.

As shown in FIG. 3, the channel management table 12 registers, for each channel and for each of the users connecting to that channel, the user's nickname (handle names), the last spoken time (the time the last message is sent), and keywords in the last utterance (which is, particular keywords extracted from the last utterance) in its table. Here, the particular keywords correspond to words indicating disconnection from that channel, such as "Good bye", "I will go home" and "Bye-bye", etc. These words are pre-defined by the dummy client program 11.

As shown in FIG. 4, the message table 13 stores a notification message(s) to be forwarded to a designated person(s) who has a title to connect to a channel, as requested by a user connecting to any channel of the chat server 1. This message table 13 stores, for each message, the nickname of the requesting user as the forwarding address, and the date and time the notification message was received.

As shown in FIG. 5, the date and time specified message table 14 stores a notification message that is to be forwarded to a designated person who has a title to connect to the channel at specified date and time, as requested by a person connecting to any channel of the chat server 1. This date and time specified message table 14 also stores, for each notification message to be forwarded, the requesting user's nickname, the addressee's nickname, and the specified date and time.

As shown in FIG. 6, the contact registry table 15 registers the contact information of users. Specifically, the nicknames, the types of communication method, the contact addresses, the name of a registering user, and the time of registration as a set of information for each user registering.

As shown in FIG. 7, the schedule reference support table 16 stores user's nickname, the real name and the department name to which the user belongs, as one set of information.

As shown in FIG. 8, the alarm management table 17 stores the content of alarm that is to be sent to the registering user. Specifically, it stores a nickname of the registering user, designated time, and the content of the notification message that is to be notified to the user as an alarm, as one set of information.

As shown in FIG. 9, the keyword registry table 18 stores a correspondence between a keyword or a combination of multiple keywords and a predetermined character strings. The keyword registry table 18 stores, for each of the character string, one keyword or a set of plural keywords, which corresponds to the character string, the nickname of the registering user, and the channel on which the correspondence is effective.

Each of the tables 12 through 18 is stored in the respective predetermined folder in the hard disk 33. Every time the CPU 31 activates the dummy client program 11, the CPU 31 reads out each of the tables 12 through 18 that have been updated and stored in the hard disk 33 at the time of previous execution, and temporarily stores them in the RAM 32.

Processing in Accordance with a Dummy Client Program

Figure 10:
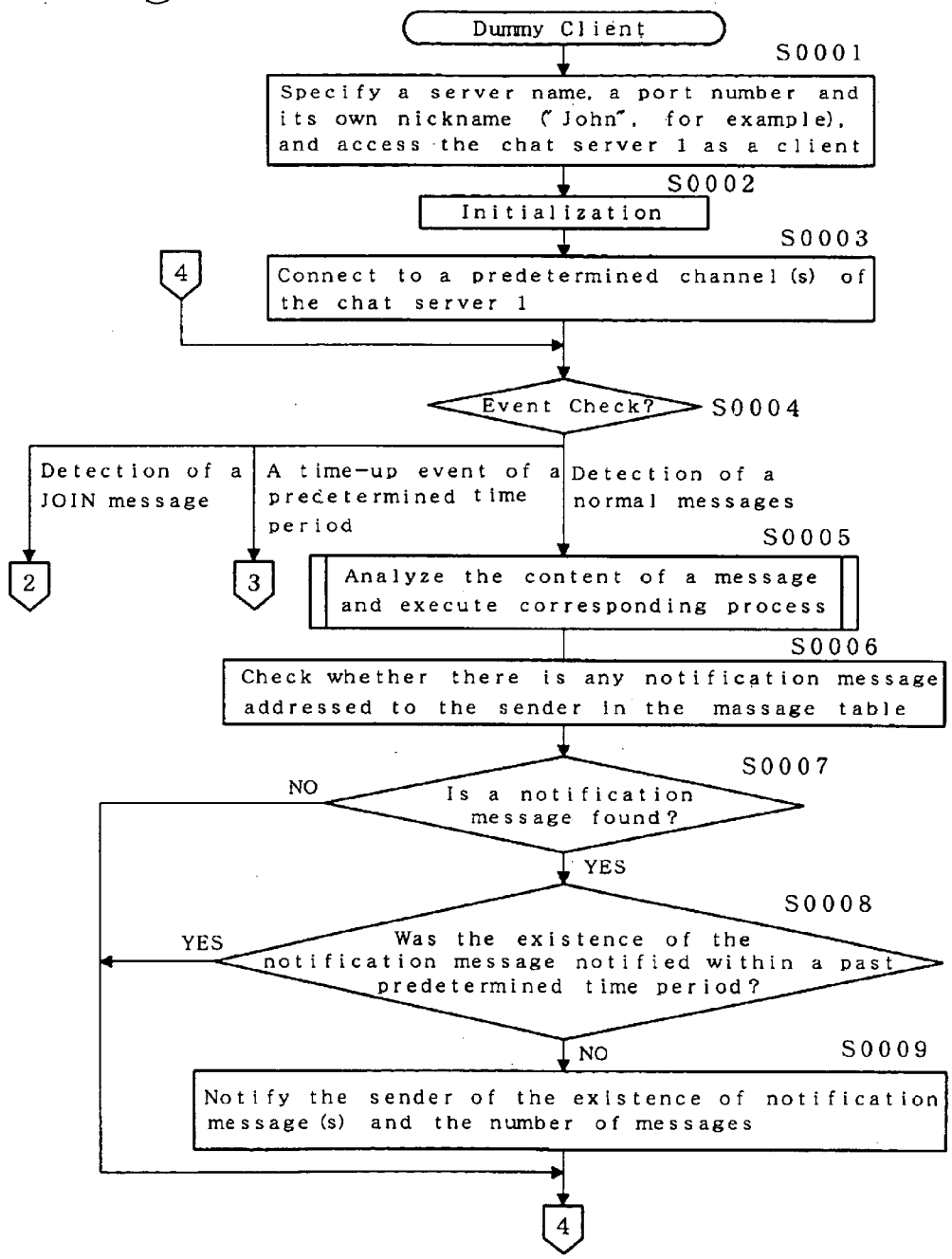
FIG. 10 is a flow chart showing a main routine of processes, which a CPU executes in accordance with a dummy client program.
Figure 11:
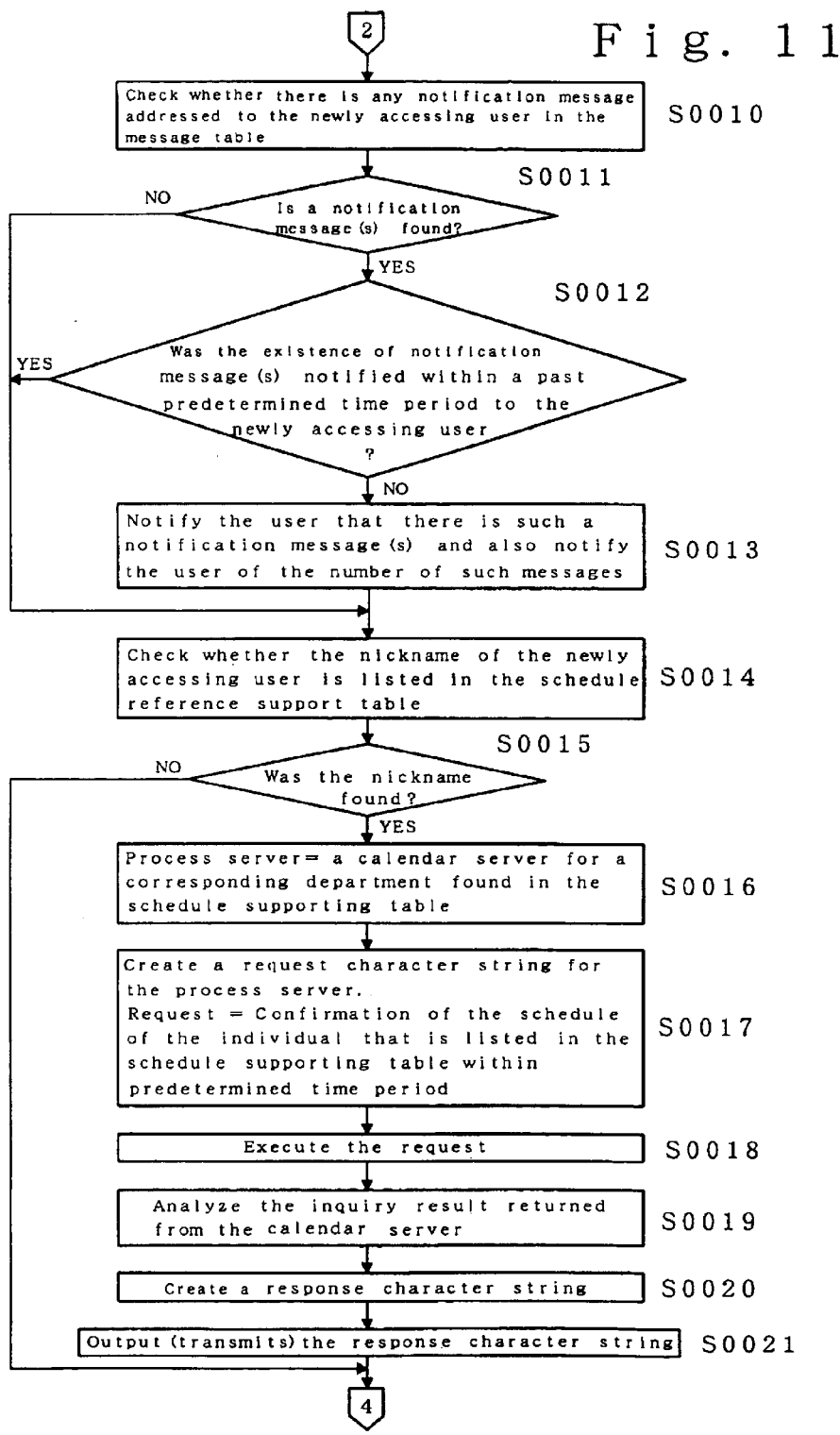
FIG. 11 is a flow chart showing the sequel of the main-routine.
Figure 12:
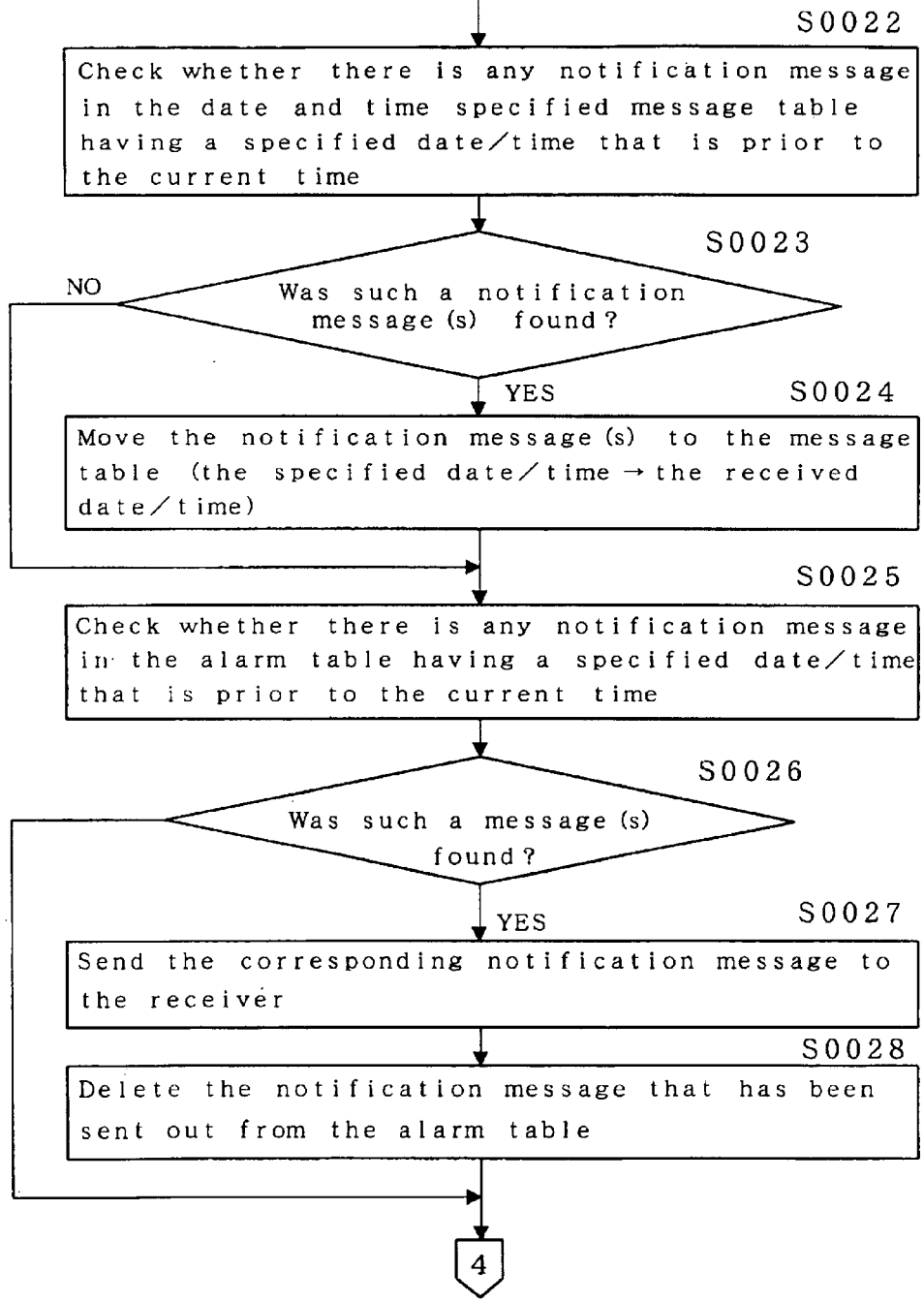
FIG. 12 is a flow chart showing the sequel of the main-routine.

Next, processes executed by the CPU 31 in accordance with the dummy client program 11, which is read out from hard disk 33 to RAM 32, is explained with reference to the flow charts of FIGS. 10 to 36. The main routine of FIG. 10 is initiated by the event that the dummy client 3 inputs a specified start command. At the first step S0001, the CPU 31 specifies the server name of chat server 1, a port number, and its own nickname ("John", for example), and connects to the chat server 1 as a client.

At the next step S0002, the CPU 31 executes an itializing process.

At the next step S0003, the CPU 31 connects to a predetermined one or more of channels, or even all the channels, of the chat server 1. That is, the CPU 31 sends the "JOIN-message" to each of the channels to which it attempts to connect.

Next, in order to detect messages flowing through all the connected channels, the CPU 31 executes loop processing of steps S0004 through S0028. At step S0004 that is the first process of this loop processing, CPU 31 checks whether one of the pre-determined events (detection of a JOIN message, detection of a normal message, a time-up of a processing period) occurred. If a normal message is detected, the CPU 31 advances its process to step S0005. If a JOIN message is detected, the CPU 31 advances its process to step S0010. If the CPU 31 determines that a time-up event of a predetermined period (passing of a predetermined time) occurred, the CPU 31 advances process to step S0022. The time-up event of the pre-determined period is generated one (1) minute after the execution of the initializing process at step S0002, and every time one minute period is elapsed after the previous time-up event.

Figure 13:
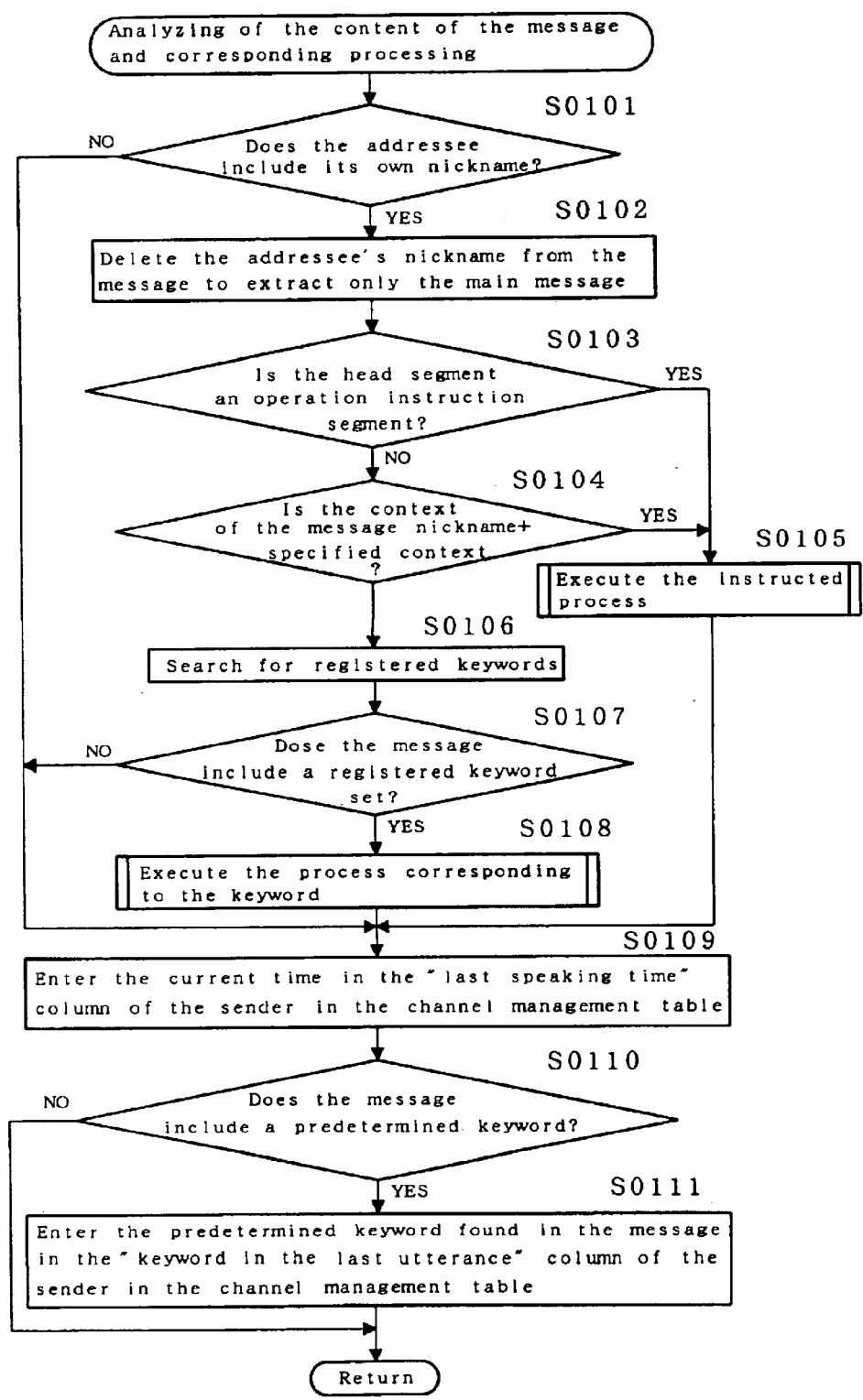
FIG. 13 is a flow chart showing the subroutine executed at S0005 of FIG. 10.

At step s0005, the CPU 31 analyzes the words in the normal message that has been detected (referred to as "message to be processed" hereinafter), and performs processes corresponding thereto. FIG. 13 shows a flow chart showing a subroutine to be executed at step S0005. At the first step S1101, the CPU 31 checks whether its own nickname (John) is included as an addressee's nickname in the message to be processed, which corresponds to the monitoring part). If its own nickname (John) is not included in the message to be processed, the CPU 31 advances the process to step S0109. On the other hand, if its own nickname is included in the message to be processed, at step S0102, the CPU 31 deletes the addressee's nickname from the detected message to be processed, extracts only the main message, and then advances the process to step S0103. The processes performed at steps S0104, S0106, and S0107 after the step S0103 correspond to the determination part which determines whether the content of the utterance satisfies predetermined sentence conditions.

At step S0103, the CPU 31 checks whether the head segment (a word at a specified position) in the message extracted at step S0102 is a specified operation instruction segment (specified word). Here, the "segment" is defined as a unit consisting of one or more of words, which is isolated by 2 or more spaces at the front and back from the rest of the massage. The specified "operation instruction segments" are "message", "show me the message", "is there a message?", "has the message read yet?", "specified message", "notify", "alarm", "memo", "memo outlook", "dict", "find", "conference room reference", "reserve a conference room", "schedule reference", and "contact". If the CPU 31 detects one of the pre-determined "operation instruction segments" at the head segment of the main message, the CPU 31 advances the process to step S0105.

On the other hand, if the head sentence segment of the main message is not any one of the specified "operation instruction segments", the CPU 31 checks whether the context at the head of the main message is in the form of "specified context+nickname" at step S0104. That is, the CPU 31 checks whether there is a predetermined segment at a predetermined position. Here, the "specified context" is "its contact address is", "are you there?", "the name is", "its calendar server is", or "where are you?". If the context at the head of the main message is not in the form of "nickname+specified context," the CPU 31 advances its process to step S0106. On the other hand, if the context at the head of the main message is in the form of "nickname+specified context," CPU 31 advances its process to step S0105.

Figure 14:
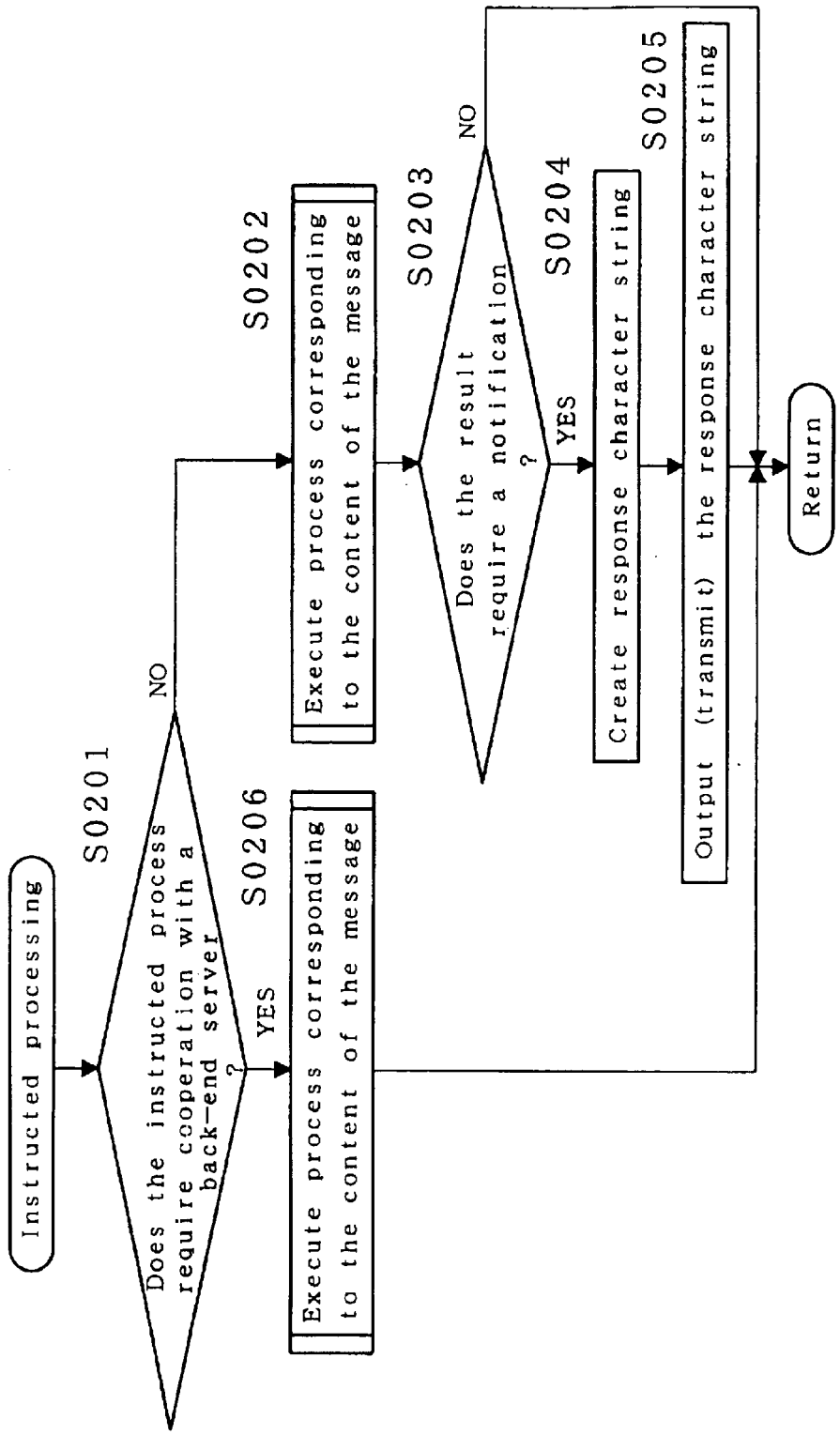
FIG. 14 is a flow chart showing a subroutine executed at S0105 of FIG. 13 or S0308 of FIG. 15.

At step S0105, the CPU 31 executes the processes instructed by the "operation instruction segment" or the "specified context" (which corresponds to process execution part). FIG. 14 is a flow chart showing a subroutine executed at step S0105. At step S0201, which is the first step of this subroutine, based on the "operation instruction segment" or "specified context" of the main message, the CPU 31 checks whether the corresponding process requires cooperation with the back-end server(s) 4. If the "operation instruction segment" is one of "message", "show me the message", "is there a message?", "has the message read yet?", "specified message", "notify", "alarm", "memo", and "memo outlook", or if the "specified context" is one of "its contact address is", "are you there?", "'s name is", and "s' calendar server is", the CPU 31 determines that the corresponding process does not require cooperation with the back-end server(s) 4, and advances its process to step s0202.

On the other hand, if the "operation instruction segment" is one of "dict", "find", "conference room reference", "reserve a conference room", "schedule reference", and "contact", or if the "specified context" is "where are you", the CPU 31 determines that the corresponding process requires cooperation with the back-end server(s) 4, and advances its process to step S0206.

At step S0202, the CPU 31 executes process corresponding to the main message by itself without any help from the back-end servers 4. Specifically, if the "operation instruction segment" is "message", the CPU 31 executes the subroutine shown in FIG. 16. If the "operation instruction segment" is "is there a message?", the CPU 31 executes the subroutine shown in FIG. 17. If the "operation instruction segment" is "show me the message", the CPU 31 executes the subroutine shown in FIG. 18. If the "operation instruction segment" is "has the message read yet?", the CPU 31 executes the subroutine shown in FIG. 19. If the "operation instruction segment" is "specified message", the CPU 31 executes the subroutine shown in FIG. 20. If the "operation instruction segment" is "notify", the CPU 31 executes the subroutine shown in FIG. 25. If the "operation instruction segment" is "alarm", the CPU 31 executes the subroutine shown in FIG. 34. If the "operation instruction segment" is "memo", the CPU 31 executes the subroutine shown in FIG. 35. If the "operation instruction segment" is "memo outlook", the CPU 31 executes the subroutine shown in FIG. 36. If the "specified context" is "contact address is", the CPU 31 executes the subroutine shown in FIG. 21. If the "specified context" is "are you there?", the CPU 31 executes the subroutine shown in FIG. 23. If the "specified context" is "s' name is", the CPU 31 executes the subroutine shown in FIG. 32. If the "specified context" is "s' calendar server is", the CPU 31 executes the subroutine shown in FIG. 33. These subroutines will be explained below. First, the subroutine shown in FIG. 16, which is the case where the "operation instruction segment" is "message", is explained. Once entering this subroutine, the CPU 31 checks whether the second segment of the main message is a nickname (which should be an addressee's nickname at the first step S0401. If the second segment is not a nickname, the CPU 31 determines that the main message does not satisfy a predetermined grammatical condition, terminates this subroutine without processing any further, and returns the process to the routine shown in FIG. 14.

On the other hand, if the second segment is a nickname, the CPU 31 checks whether the third segment of the main message is "delete". If the third segment is not "delete", the CPU 31 determines that the message to be processed is requesting that the third segment of the main message be registered in the message table 13 as a notification massage, and advances the process to step S0403. At step S0403, the CPU 31 writes the second segment of the main message into an "addressee" column of the message table 13, the third segment into its "notification message" column, the current time into its receiving "date and time" column, and the sender's nickname into its "requesting user" column, respectively. The sender here corresponds to the client 2 that sent out the message to be processed. Once step S0403 is completed, the CPU 31 terminates this subroutine, and returns the process to the routine shown in FIG. 14.

On the other hand, if the third segment of the main message is determined to be "delete" at step S0402, the CPU 31 determines that the message to be processed is to request that the corresponding notification message be deleted from the message table 13, and advances its process to step S0404. At step S0404, the CPU 31 checks whether a notification message, which was previously requested by the sender and was addressed to the addressee specified by the second segment exists in the message table 13. That is, the CPU 31 checks if there is a row in the table, which lists the nickname of the sender in the "requesting user" column and the nickname specified in the second segment of the main message in the "addressee" column.

At the next step S0405, the CPU 31 determines whether such a notification message is found in step S0404. If there is no such notification message in the table, the CPU 31 terminates this subroutine, and returns the process to the routine shown in FIG. 14. On the other hand, if there is a corresponding notification message(s) in the table, at step S0406, the CPU 31 notifies the sender of all of such corresponding notification messages (i.e., the contexts stored in the "notification message" columns of all the rows that have the nickname of the sender in the "requesting user" column and the nickname identified by the second segment of the main message in the "addressee" column).

At the next step S0407, the CPU 31 deletes all the corresponding notification messages from the message table 13 (i.e., the messages notified to the sender at step S0406). After completing step S0407, the CPU 31 terminates this subroutine, and returns the process to the routine shown in FIG. 14.

Figure 17:
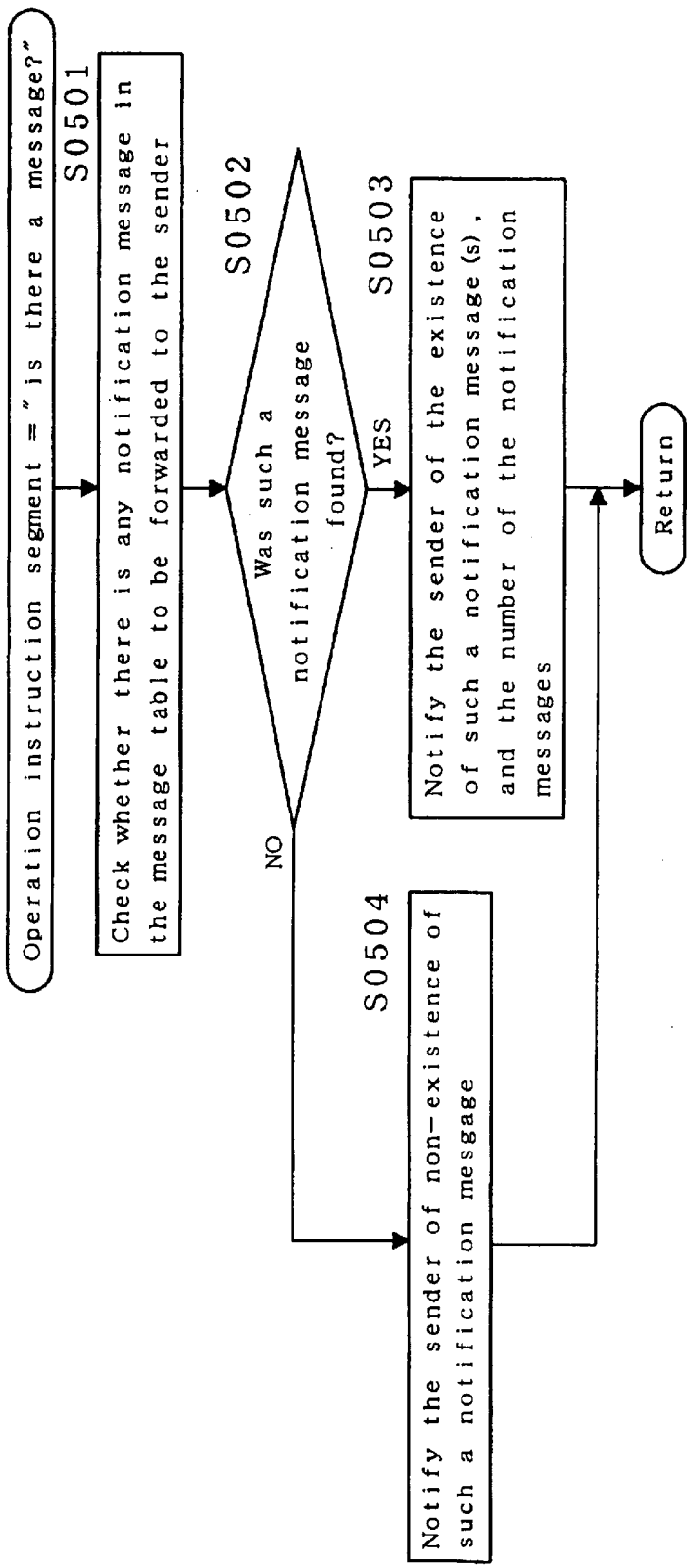
FIG. 17 is a flow chart showing a subroutine executed at S0202 of FIG. 14 in the case of the operation instruction segment="Is there a message?"

Next, the subroutine of FIG. 17, which is executed at step S0202 in the case where the "operation instruction segment" is "is there a message?", is explained. Upon entering this subroutine, the CPU 31 checks whether there is a notification message to be forwarded to the sender in the message table 13 at the first step S0501. That is, the CPU 31 searches for rows that have the sender's nickname in the "address" column.

At the next step S0502, the CPU 31 determines whether such a notification message is found at step S0501. If there is such a notification message(s), the CPU 31 decides to notify the sender of the existence of such a notification message(s), and the number of the notification messages at step S0503. On the other hand, if there is no such notification message, the CPU 31 decides to notify the sender of non-existence of such a notification message at step S0504. When step S0503 or step S0504 is completed, the CPU 31 terminates this subroutine, and returns the process to the routine shown in FIG. 14.

Figure 18:
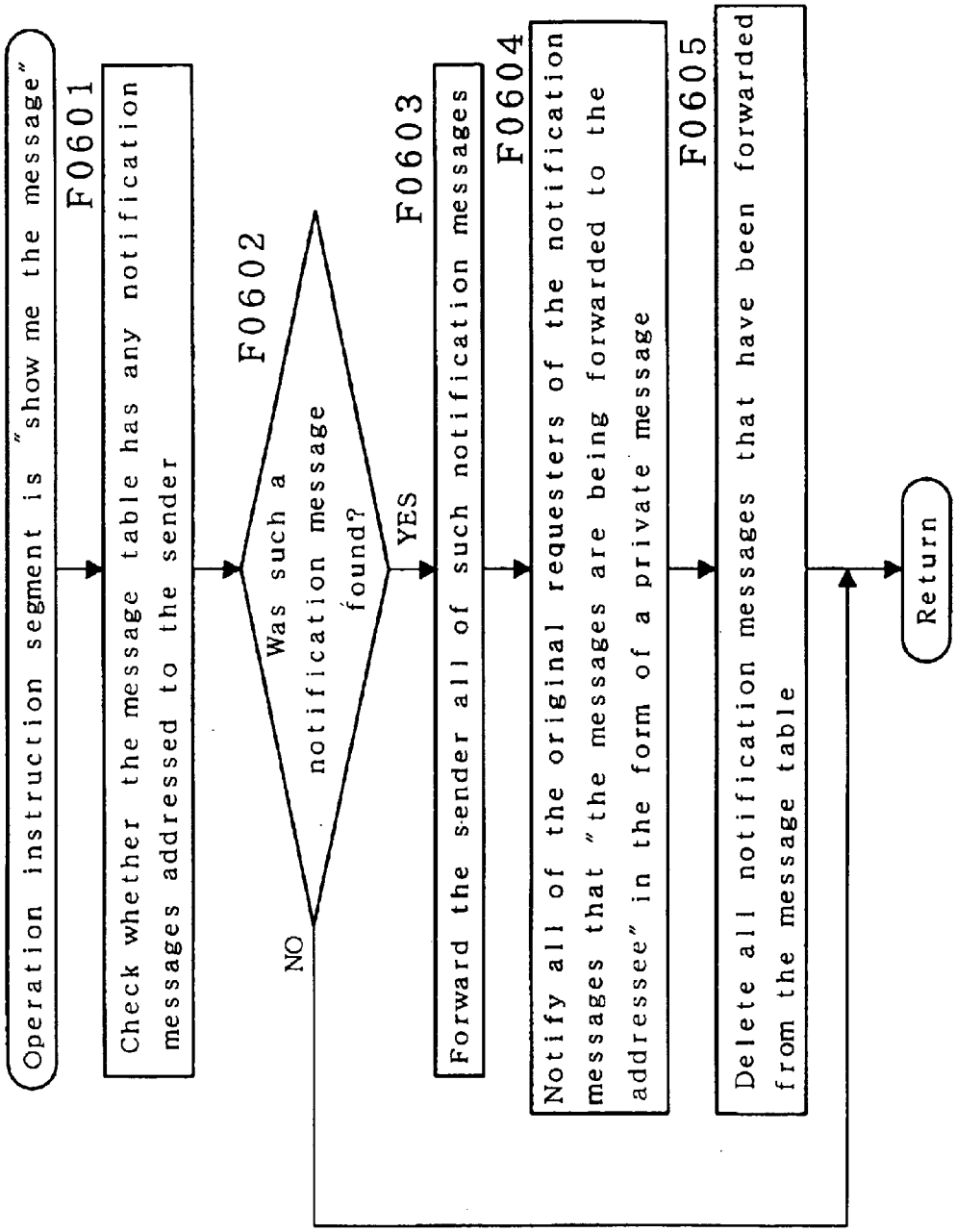
FIG. 18 is a flow chart showing a subroutine executed at S0202 of FIG. 14 in the case of the operation instruction segment="Show me the message"

Next, the subroutine shown in FIG. 18, which is the case where the "operation instruction segment" is "show me the message", and which is to be executed at step S0202, is explained. Upon entering this subroutine, the CPU 31 checks whether the message table 13 has any notification messages addressed to the sender at the first step S0601. That is, the CPU 13 searches for any rows that have the nickname of the sender in the "addressee" column.

At the next step S0602, the CPU 31 determines whether such a notification message is found in step S0601. If there is no such notification message, the CPU 31 terminates this subroutine, and returns the process to the routine shown in FIG. 14. On the other hand, if there is such a notification message(s), the CPU 31 forwards the sender all of such notification messages (i.e., the content in the "notification message" column, of all the rows that have the sender's nickname in the "addressee" column, at step S0603.

At the next step S0604, the CPU 31 decides to notify all of the original requesters whose nicknames are listed in the "requesting users column in the rows that have the sender's nickname in the "addressee" column of that "the messages are being forwarded to the addressee" as a form of private message.

At the next step S0605, the CPU 31 deletes all corresponding notification messages (i.e., the notification messages that have been forwarded to the sender at step S0603) from the message table 13. When this step S0605 is completed, the CPU 31 terminates this subroutine, and returns the process to the routine shown in FIG. 14.

Figure 19:
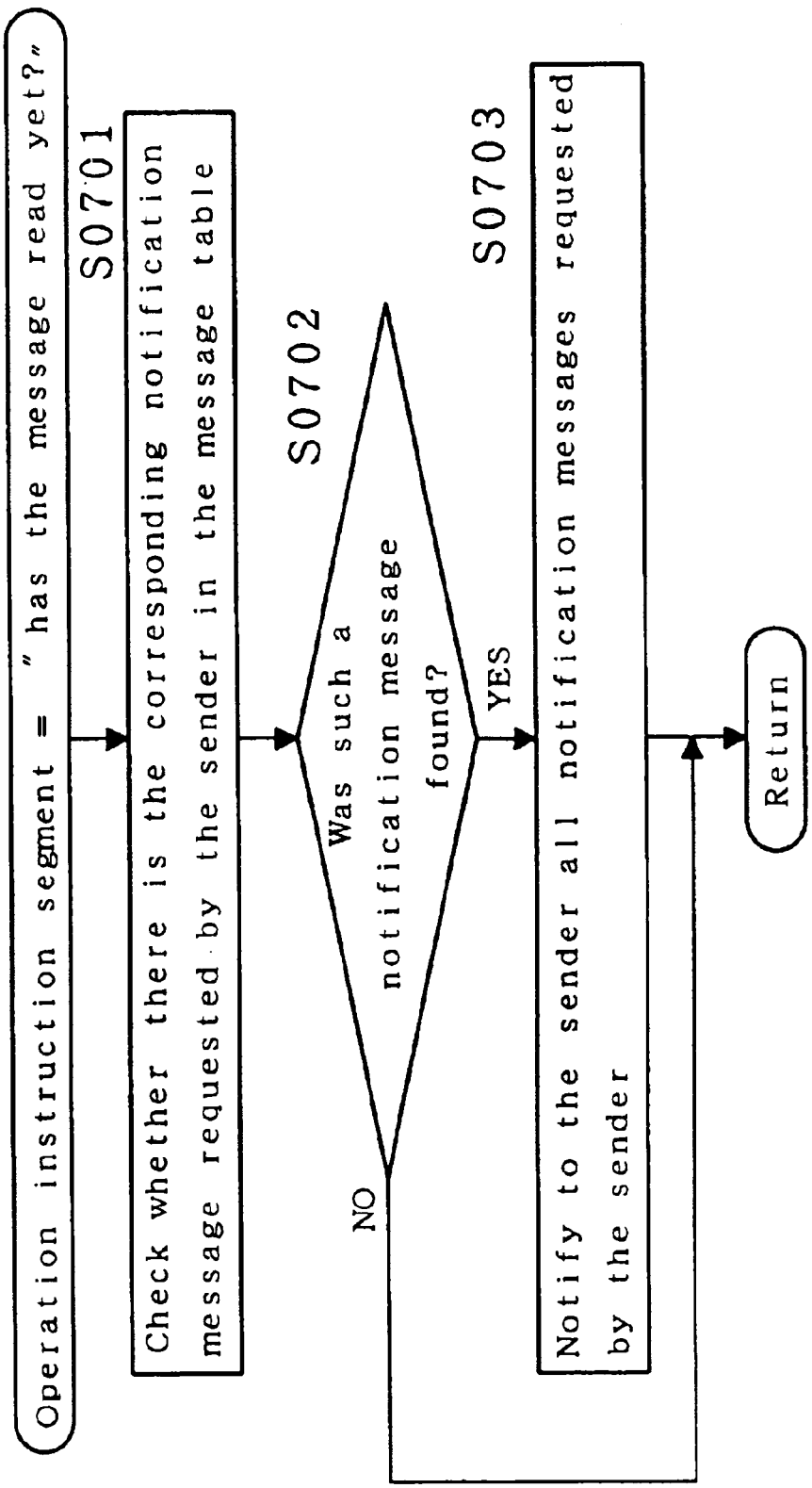
FIG. 19 is a flow chart showing a subroutine executed at S0202 of FIG. 14 in the case of the operation instruction segment="Has the message read yet?"

Next, the subroutine shown in FIG. 19, which is executed at step S0202 when the "operation instruction segment" is "has the message read yet?", is explained. Upon entering this subroutine, at the first step S0701, the CPU 31 checks whether there is the corresponding notification message requested by the sender in the message table 13. That is, the CPU 31 checks whether there is a row that have the sender's nickname in the "requesting user" column.

At the next step S0702, the CPU 31 determines whether a corresponding notification message was found at step S0701. If there is such notification message, the CPU 31 terminates this subroutine, and returns the process to the routine shown in FIG. 14. On the other hand, if there is such a notification of notification message(s), the CPU 31 notifies the sender of all such notification messages (i.e., the content in the "notification message" column in all the rows that have the sender's nickname in the "requesting user" column) as step S0703. When this step S0703 is completed, the CPU 31 terminates this subroutine, and returns the process to the routine in FIG. 14.

Figure 20:
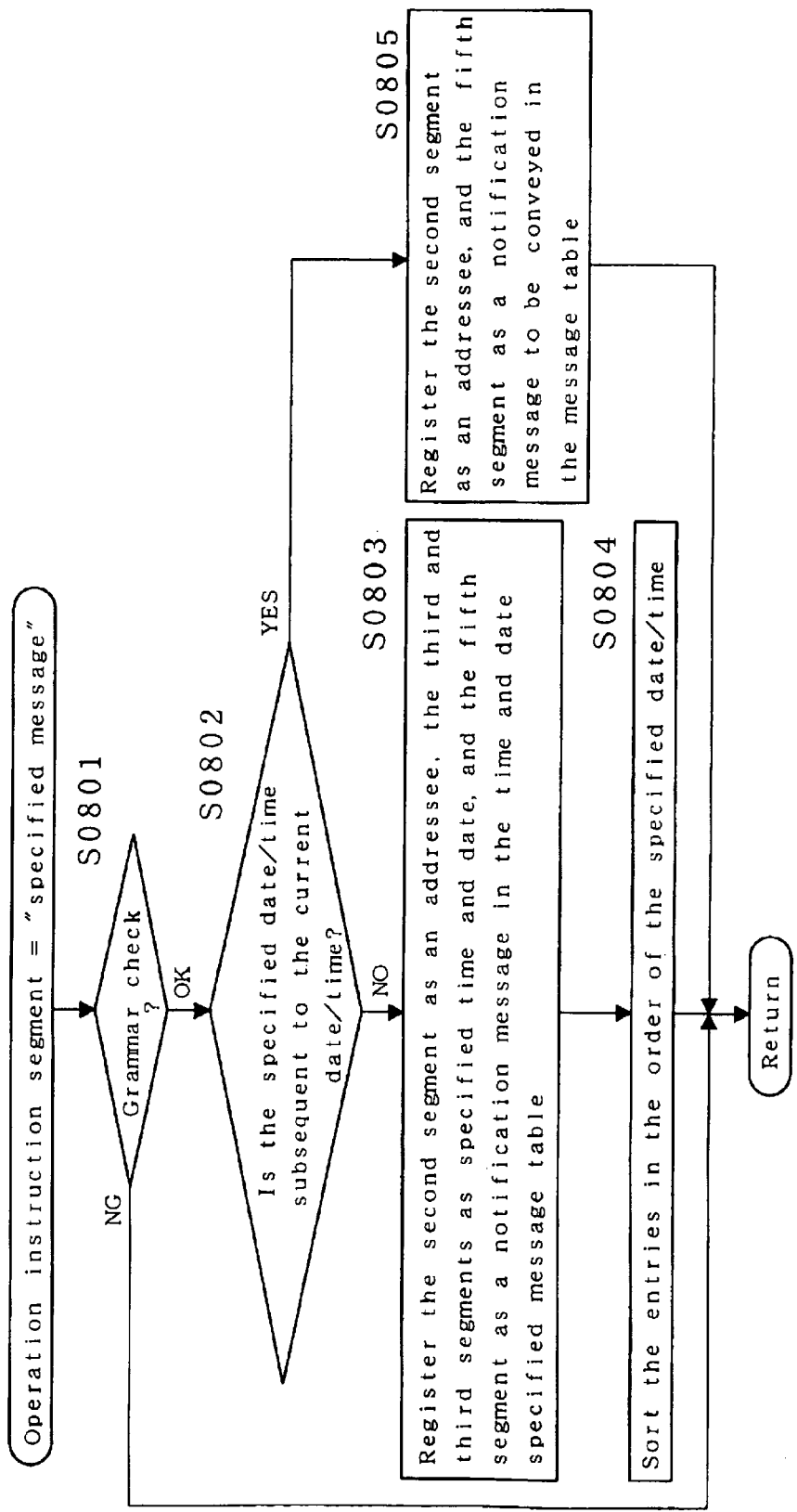
FIG. 20 is a flow chart showing a subroutine executed at S0202 of FIG. 14 in the case of the operation instruction segment="specified message"

Next, the subroutine in FIG. 20, which is executed when the "operation instruction segment" is "specified message", is explained. When the CPU 31 enters this subroutine, at the first step S0801, the CPU 31 checks whether the content of the main message conforms to a grammatical structure corresponding to "operation instruction segment"= "specified message". That is, the CPU 31 checks whether the character strings in the second, third, fourth, and fifth segments correspond to a nickname, year/month/date, time, and a notification message, respectively. If the content of the main message does not conform to the grammatical structure corresponding to "operation instruction segment"= "specified message", the CPU 31 terminates this subroutine, and returns the process to the routine shown in FIG. 14. On the other hand, if the content of the main message is in accordance with the grammatical structure corresponding to "operation instruction segment"="specified message", the CPU 31 advances its process to step S0802.

At step S0802, the CPU 31 checks whether the date and time specified by the third segment and the fourth segment are earlier than the current date and time. When the CPU 31 determines that the specified date/time is subsequent to the current date/time at step S0802, the CPU 31 enters the second segment of the main message in the "addressee" column of the date and time specified message table 14, the third and fourth segments in the "specified date and time", column, and the fifth segment in the "notification message" column, respectively, at step S0803. At the next step S0803, the CPU 31 sorts rows of the date and time specified table 14 in the order of earlier date and time in accordance with the date and time described in the "specified date and time" column. Once this step S0803 is completed, the CPU 31 terminates this subroutine, and returns the process to the routine shown in FIG. 14.

On the other hand, when the CPU 31 determines that the specified date and time is prior to the current date and time at step S0802, the CPU 31 determines that the requested notification message can be treated as a normal notification message, and advances its process to step S0805. At step S0805, the CPU 31 enters the second segment of the main message in the "addressee" column, the fifth segment in the "notification message" column, the current time in the "received date and time" column, and the sender's nickname in the "requesting user" column, respectively. When this step S0805 is completed, the CPU 31 terminates this subroutine, and returns the process to the routine shown in FIG. 14.

Figure 21:
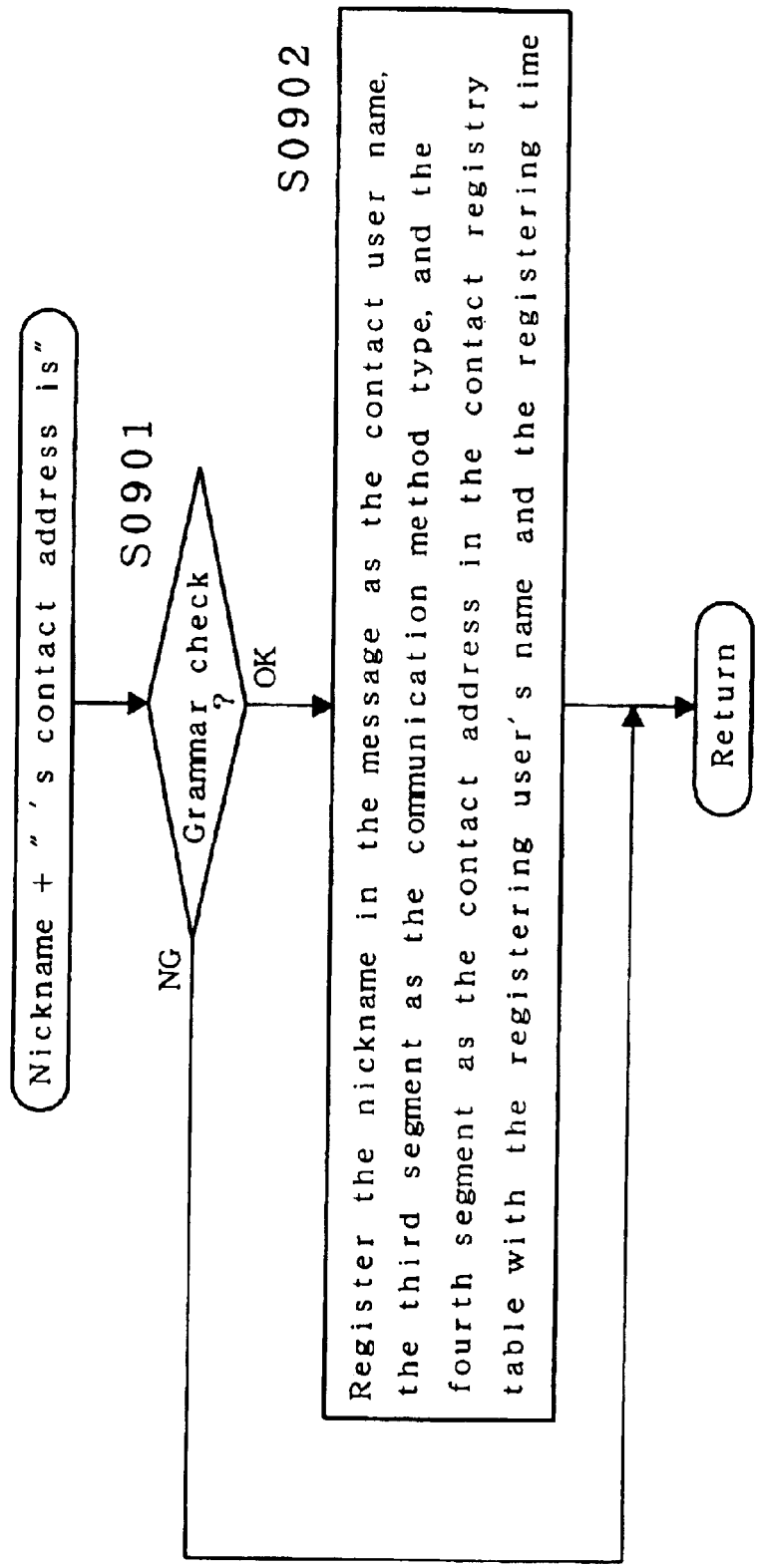
FIG. 21 is a flow chart showing a subroutine executed at S0202 of FIG. 14 in the case of the specified context="its contact address is"

Next, the subroutine of FIG. 21, which is executed in the case where the "specified context" is "s' contact address is", is explained. When the CPU 31 enters this subroutine, at the first step S0901, the CPU 31 checks whether the main message conforms to a grammatical structure corresponding to "specified context"="'s contact address is". That is, the CPU 31 checks whether the third segment that follows the "specified context" is a character string corresponding to a type of communication method, and whether the fourth segment is a character string corresponding to the contact address. If the main message does not conform to the grammatical structure corresponding to "specified context"= "'s contact address is", the CPU 31 terminates this subroutine, and returns the process to the routine shown in FIG. 14. On the other hand, the main message conforms to the grammatical structure corresponding to "specified context"="'s' contact address is", at step S0902, the CPU 31 enters the third segment of the main message in the "type of communication method" column of the contact registry table 15, the fourth segment in the "contact address" column, the nickname indicated by the first segment in the "contact user name" column, the sender's nick name in the "name of the registering user" column, and the current time in the "time registered" column, respectively.

Figure 23:
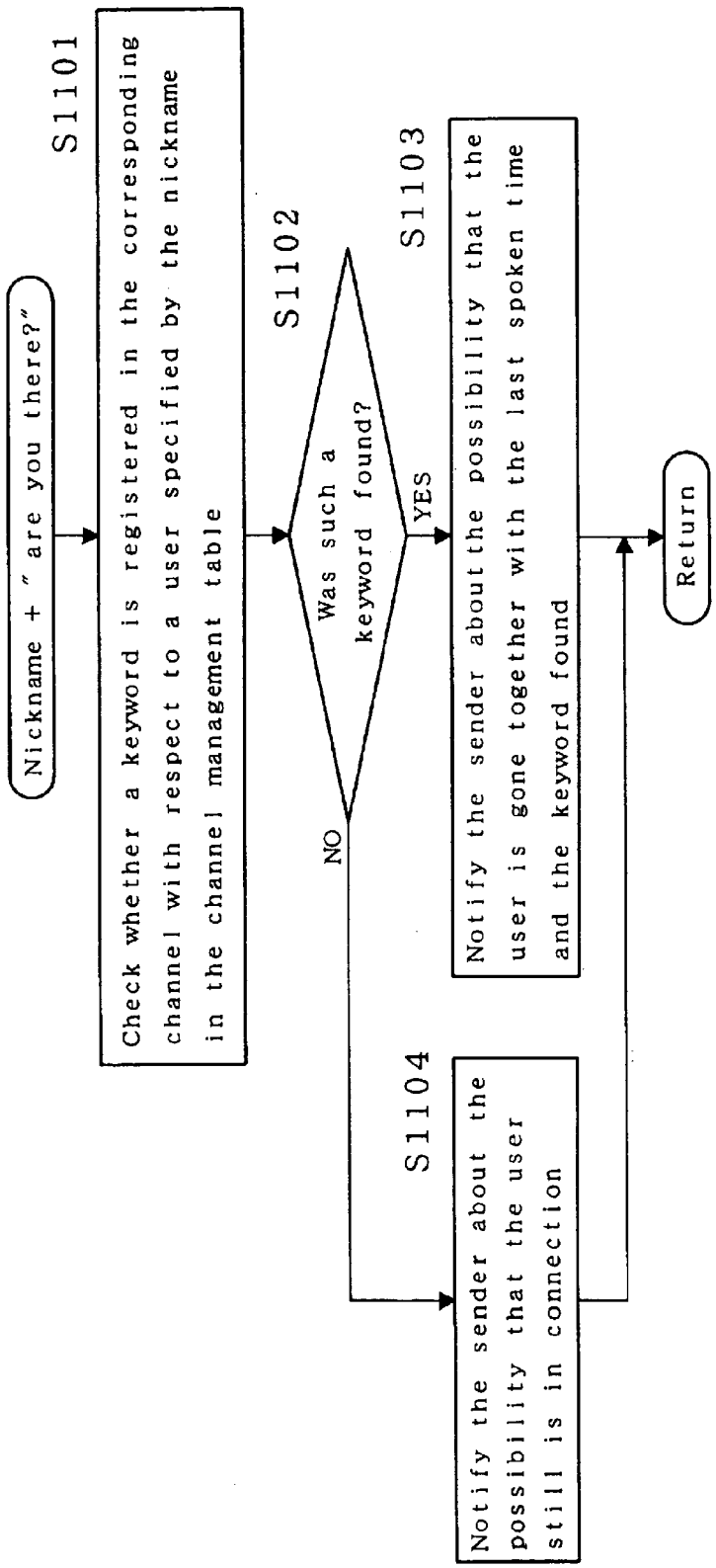
FIG. 23 is a flow chart showing a subroutine executed at S0202 of FIG. 14 in the case of the specified context="Are you there?"

Next, the subroutine of FIG. 23, which is executed in the case where the "specified context" is "are you there?", is explained. When the CPU 31 enters this subroutine, at the first step S1101, the CPU 31 checks whether the nickname designated in the first segment is registered as "user" in an order corresponding to the present channel (channel in which the message to be processed is detected) in the channel management table 12 and particular keywords are registered with respect to the nickname (user). Here, the particular keywords are registered in the channel management table 12 by the process at step S0111, which will be described later.

At the next step S1102, the CPU 31 checks whether the particular keyword(s) that satisfies pre-determined conditions is found at step S1101. If the particular keyword(s) is registered, at step S1103, the CPU 31 decides to notifies the sender of the possibility that the user corresponding to the nickname withdraws from the channel (no longer in the channel) with contents of the "last spoken time" column and the "keywords in the last utterance" column, which are registered in the channel management table 12 with respect to the corresponding nickname. On the other hand, if a keyword that satisfies the predetermined conditions is not found, at step S1104, the CPU 31 decides to notify the sender of the possibility that the user designated by the nickname still exists in the channel, with content of the previous spoken time" column, which is registered in the channel management table 12 for the corresponding nickname. When step S1103 or step S1104 is completed, the CPU 31 terminates this subroutine, and returns its process to the routine shown in FIG. 14.

Figure 25:
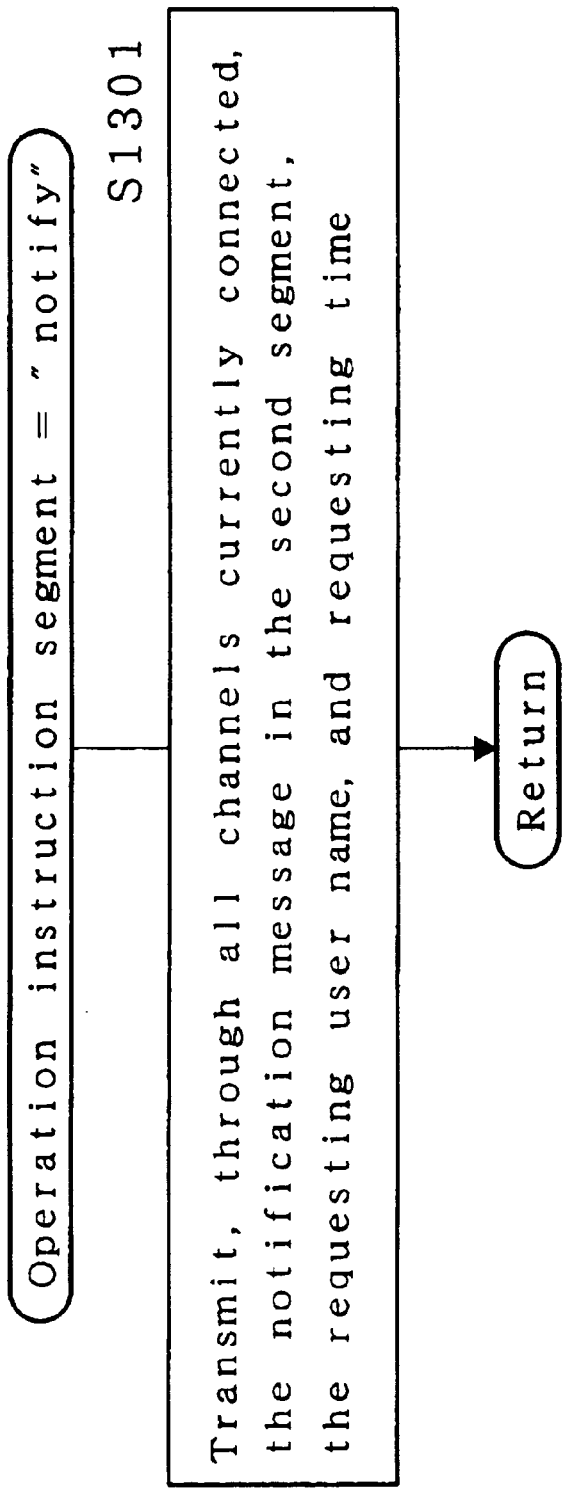
FIG. 25 is a flow chart showing a subroutine executed at S0202 of FIG. 14 in the case of the operation instruction segment="Notify"

Next, the subroutine of FIG. 25, which is executed in the case where the "operation instruction segment" is "notify", is explained. When the CPU 31 enters this subroutine, at the first step S1301, the CPU 31 decides to notify all the channels, with which the CPU 31 is currently in connection in the chat server 1, of the notification message that is after the first segment of the main massage, the requesting user's name (i.e., the nickname of the sender of the message to be processed), and the requesting time. When this step S1301 is completed, the CPU 31 terminates this subroutine, and returns its process to the routine shown in FIG. 14.

Figure 32:
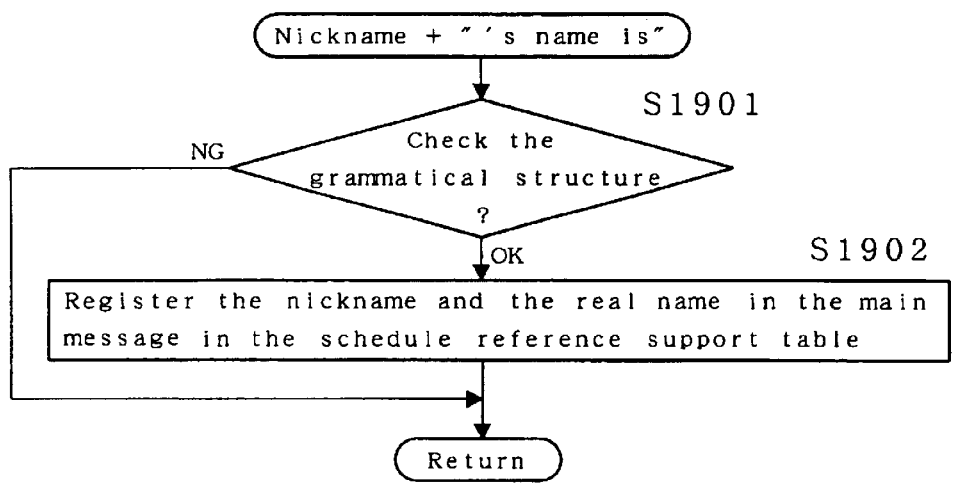
FIG. 32 is a flow chart showing a subroutine executed at S0202 of FIG. 14 in the case of the designation context="s' name is"

Next, the subroutine of FIG. 32, which is executed in the case where the "specified context" is "s' name is", is explained. When the CPU 31 enters this subroutine, at the first step S1901, CPU 31 checks whether the main message conforms to a grammatical structure corresponding to "specified context"="s' name is". That is, the CPU 31 checks whether the context that follows "nickname+'s+name+is" is a character string corresponding to the real name of the user. If the main message does not conform to the grammatical structure corresponding to "specified context"="s' name is", the CPU 31 terminates this subroutine, and returns its process to the routine shown in FIG. 14.

On the other hand, if the main message conforms to the grammatical structure corresponding to "specified context"="s' name is", at step S1902, the CPU 31 enters the nickname prior to the "specified context" in the main message and the real name that follows "is" in the schedule reference support table 16 with then associated with each after. At that time, if the nickname has already been registered in correspondence with a particular department name in the "department name" column (see step S2002), the CPU 31 enters the real name in the "real name" column in the same row as that listing the particular department name in the "department name" column. On the other hand, if the nickname in question is nowhere listed in the schedule reference support table 16, the CPU 31 enters the nickname in the "nickname" column, and enters the corresponding real name in the "real name" column. When this step S1902 is completed, the CPU 31 terminates this subroutine, and returns the process to the routine shown in FIG. 14.

Figure 33:
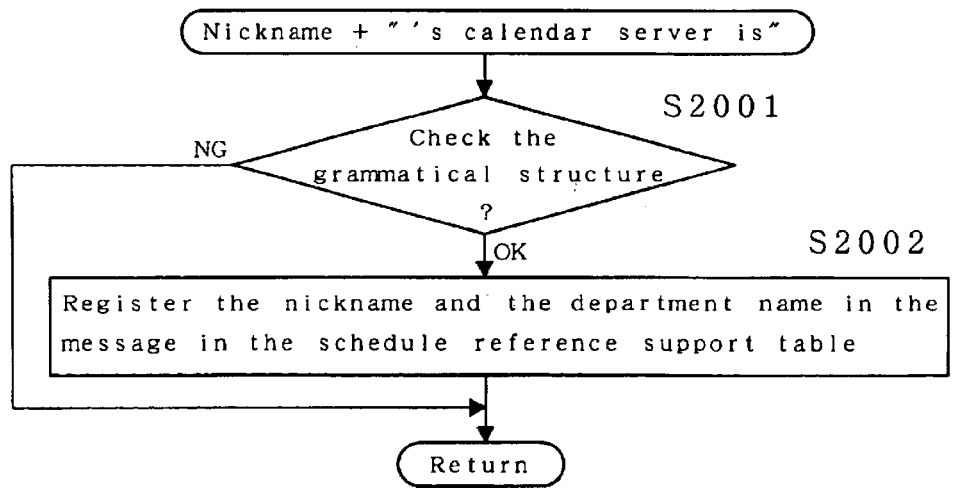
FIG. 33 is a flow chart showing a subroutine executed at S0202 of FIG. 14 in the case of the designation context="s' calendar server is"

Next, the subroutine of FIG. 33, which is executed in the case where the "specified context" is "s' calendar server is", is explained. When the CPU 31 enters this subroutine, at the first step S2001, the CPU 31 checks whether the main message conforms to a grammatical structure corresponding to "specified context"="s' calendar server is". That is, the CPU 31 checks whether the context that follows "nickname+'s+calendar server+is" is a character string corresponding to the department name. If the main message does not conform to the grammatical structure corresponding to "specified context" ="'s calendar is", the CPU 31 terminates this subroutine, and returns the process to the routine shown in FIG. 14.

On the other hand, if the main message conforms to the grammatical structure corresponding to "specified context"="s' calendar server is", at step S2002, the CPU 31 enters the nickname prior to the "specified context" in the main message and the department name that follows "is" in the schedule reference support table 16 with them associated with each other. At that time, if the nickname has already been registered in correspondence with a particular real name in the "real name" column (see step S1902), the CPU 31 enters the department name in the "department name" column in the same row as that listing the particular real name in the "real name" column. On the other hand, if, the nickname is nowhere registered in the schedule reference support table 16, the CPU 31 enters the nickname in the "nickname" column, and enters the corresponding department name in the "department name" column. When this step S2002 is completed, the CPU 31 terminates this subroutine, and returns its process to the routine shown in FIG. 14.

Figure 34:
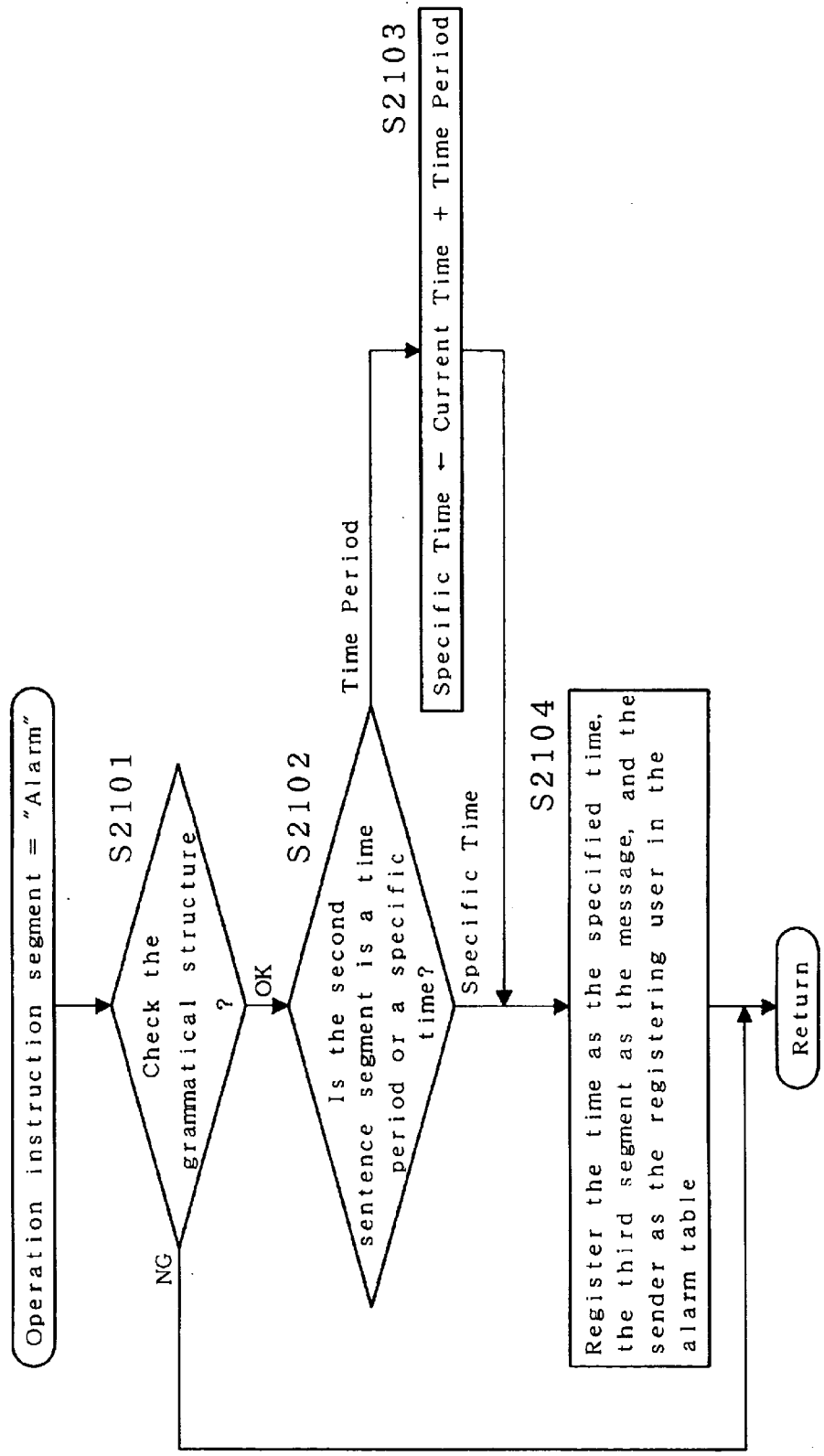
FIG. 34 is a flow chart showing a subroutine executed at S0202 of FIG. 14 in the case of the operation instruction segment="Alarm"

Next, the subroutine of FIG. 34, which is executed in the case where the "operation instruction segment" is "alarm", is explained. When the CPU 31 enters this subroutine, at the first step S2101, the CPU 31 checks whether the main message conforms to a grammatical structure corresponding to "operation instruction segment"="alarm". That is, the CPU 31 checks whether the second segment is a character string corresponding to time and the third segment is a character string corresponding to a message or not. If the main message does not conform to the grammatical structure corresponding to "operation instruction segment"="alarm", the CPU 31 terminates this subroutine, and returns its process to the routine shown in FIG. 14. On the other hand, if the main message conforms to the grammatical structure corresponding to "operation instruction segment"="alarm", the CPU 31 advances its process to step S2102.

At step S2102, CPU 31 checks whether the second segment of the main message is a time period (60 minutes, for example), or a specific time ("17:00", for example). If it is a time period, at step S2103, the CPU 31 adds the time period designed by the second segment to the current time to convert the designated time period to a specific time, and advances its process to step S2104. On the other hand, if the second segment is determined to be a specific time at step S2102, the CPU 31 advances its process to step S2104.

At step S2104, the CPU 31 enters the time designated by the second segment or the converted time obtained at step S2103 in the "specified time" column of the alarm management table 17, the third segment in the "notification message" column, and the nickname of the sender to the "registering user" column". When this step S2104 is completed, the CPU 31 terminates this subroutine, and returns its process to the routine shown in FIG. 14.

Figure 35:
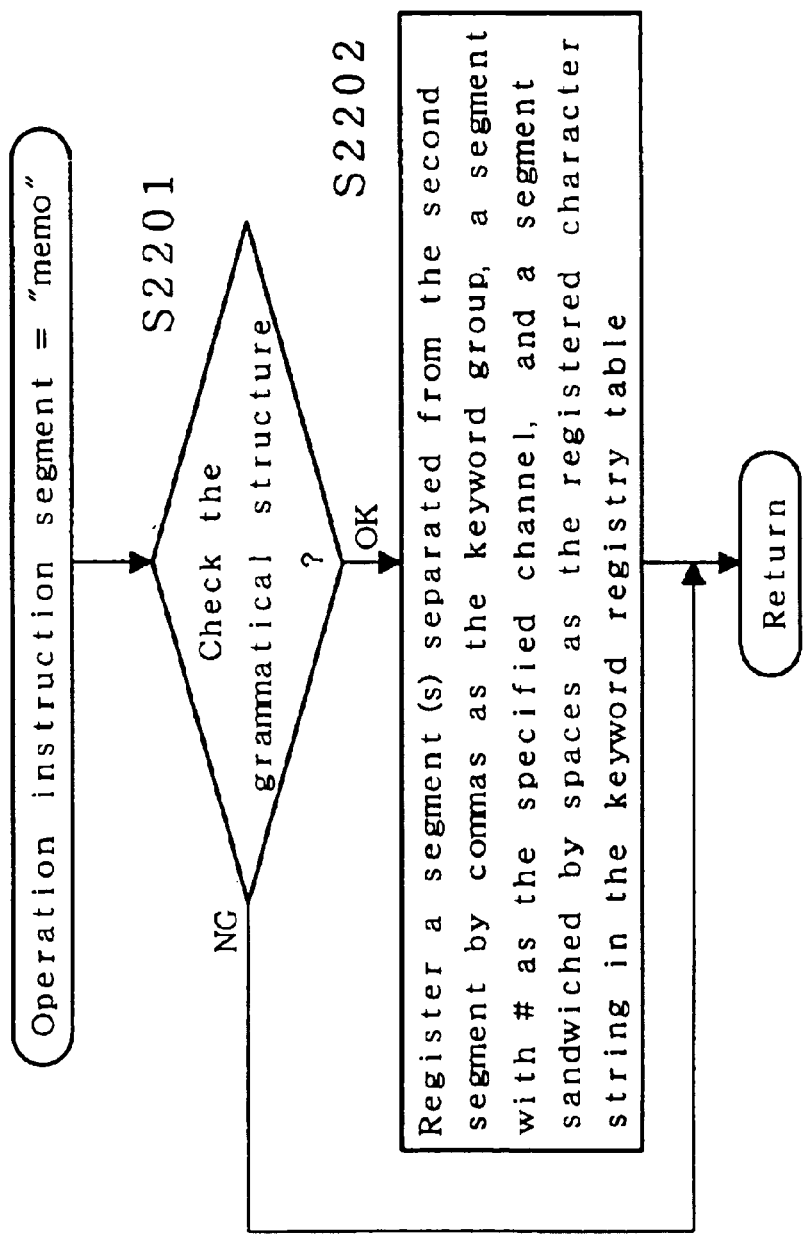
FIG. 35 is a flow chart showing a subroutine executed at S0202 of FIG. 14 in the case of the operation instruction segment="Memo"

Next, the subroutine of FIG. 35, which is executed in the case where the "operation instruction segment" is "memo", is explained. When the CPU 31 enters this subroutine, at the first step S2201, the CPU 31 checks whether the main message conforms to a grammatical structure corresponding to "operation instruction segment"="memo". That is, the CPU 31 checks whether one or more of sentence segments that follow the second segment is separated by commas and thereafter segments consisting of character strings follows. If the main message does not conform to the grammatical structure corresponding to "operation instruction segment"="memo", the CPU 31 terminates this subroutine, and returns its process to the routine shown in FIG. 14. On the other hand, if the main message conforms to the grammatical structure corresponding to "operation instruction segment"="memo", at step S2202, the CPU 31 enters one or more of the sentence segments that are separated by commas from each other after the second segment of the main message (excluding the sentence segment having "#" at its head) in the "registered keyword" column in the keyword registry table 18. If there is a sentence segment(s) starting with "#" after a comma, such a sentence segment(s) is entered in the "channel designation" column, and the sender's nickname is entered in the "registering user" column, respectively. If there is no comma in the main message, the CPU 31 determines that only the second segment corresponds to a keyword, and executes steps S2201 and S2202. When this step S2202 is completed, the CPU 31 terminates this subroutine, and returns its process to the routine shown in FIG. 14.

Figure 36:
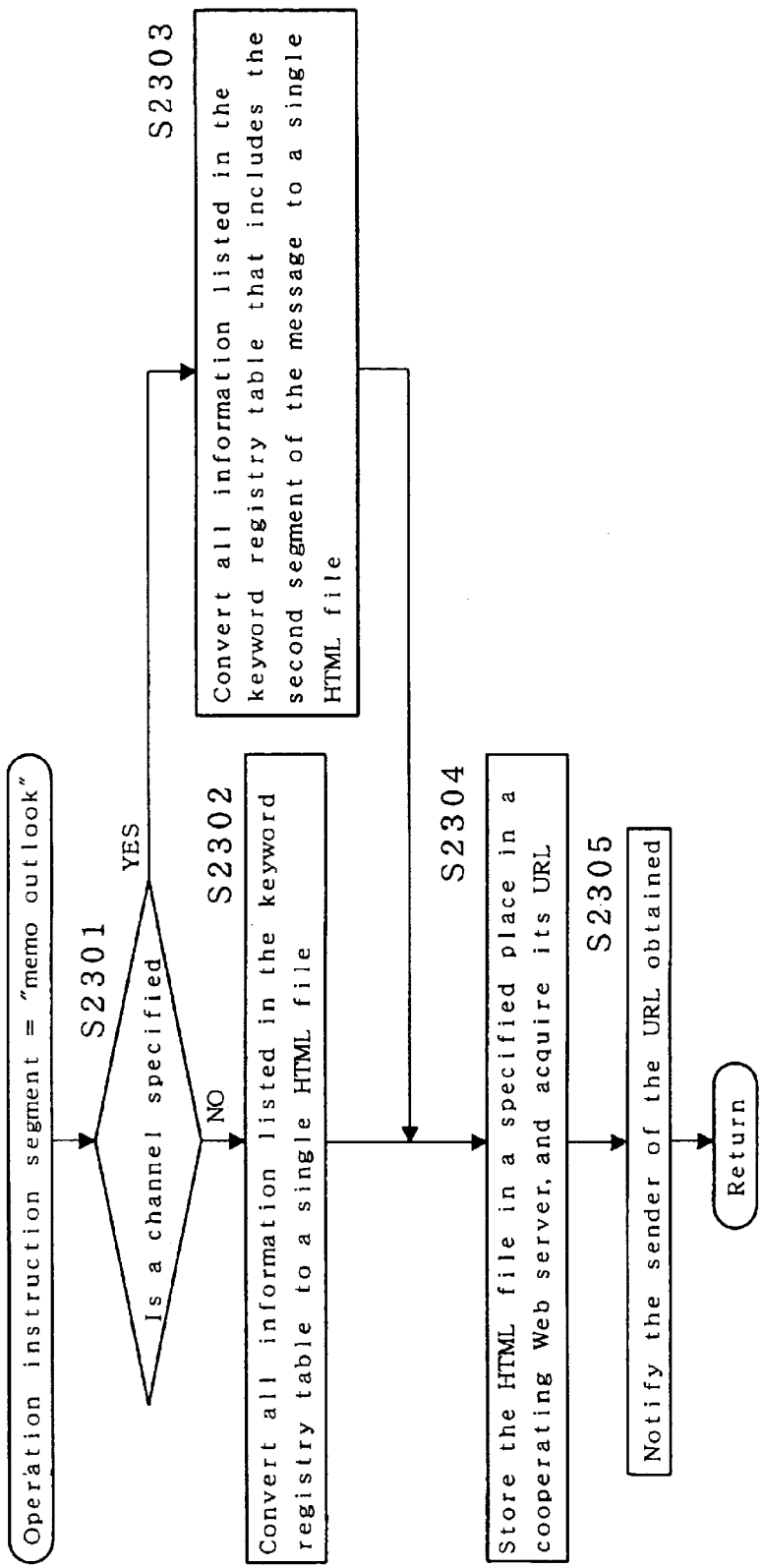
FIG. 36 is a flow chart showing a subroutine executed at S0202 of FIG. 14 in the case of the operation instruction segment="Memo outlook"
Figure 37:
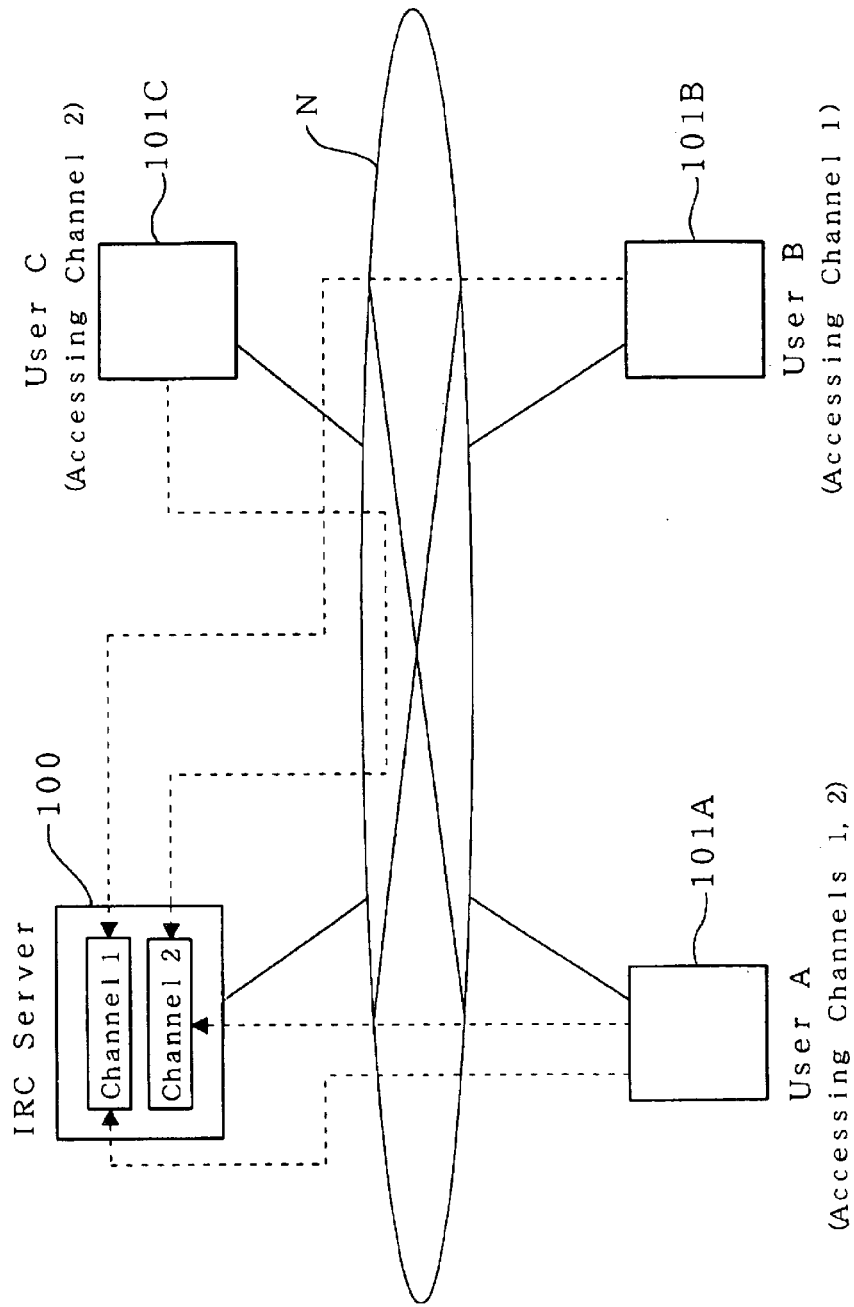
FIG. 37 is an explanatory diagram of a concept of chat.

Next, the subroutine of FIG. 36, which is executed in the case where the "operation instruction segment" is "memo outlook", is explained. Upon entering this subroutine, at the first step S2301, the CPU 31 checks whether the main message includes designation of a channel. That is, the CPU 31 checks whether there is a segment starting with "#" as the second segment. Here, the character string that follows "#" is a name of the designated channel. If the main message does not include a channel designation (that is, there is no sentence segment starting with "#" of in the main message), the CPU 31 converts all information listed in the keyword registry table 18 to a single HTML file at step S2302. On the other hand, if the CPU 31 determines that the main message includes a channel designation at step S2301 (i.e., the segment starting with "#" is included in the main message), at step S2303, the CPU 31 reads out all information listed in the row(s) where segment starting with "#" is registered in its "specified channel" column from the keyword registry table 18, and convert it to a single HTML file. In either case, at the next step S2304, the CPU 31 stores the HTML file created at step S2302 or step S2303 in a specified place in a cooperating web server, and retrieves the URL indicating the specified place.

At the next step S2305, the CPU 31 decides to notify the sender of the URL obtained in step S2304. Once this step S2305 is completed, the CPU 31 terminates this subroutine, and returns its process to the routine shown in FIG. 14.

Returning to FIG. 14, once the process at step S0202 is completed, the CPU advances its process to step S0203. At step S0203, the CPU 31 checks whether the result at step S0202 is to conduct notification. If notification is not to be conducted, the CPU 31 terminates this subroutine, and returns its process to the routine shown in FIG. 13.

On the other hand, if the notification is to be conducted, the CPU 31 creates a character string (that is, message information) including information to be notified and the nickname(s) of the user(s) to be notified at step S0204. At the next step S0205, the CPU 31 outputs (sends to chat server 1) the character string created at step S0204. Here, in this preferred embodiment, the character string (that is, message information) including the information to be notified and the addressee information is, in principle, sent to the channel to which the addressee is connecting. However, in the case of step S0604, because it is determined to notify as a private message, the message is not forwarded through a channel, but is directly sent to the addressee. After step S0205 is completed, the CPU 31 terminates this subroutine of FIG. 14, and returns its process to the routine shown in FIG. 13.

On the other hand, at step S0206, the CPU 31 cooperates with some of the back-end servers 4 to perform the processes designed by the content of the main message. Specifically, if the "operation instruction segment" is "contact", the CPU 31 executes the subroutine shown in FIG. 22. If the "operation instruction segment" is "dict", the CPU 31 executes the subroutine shown in FIG. 26. If the "operation instruction segment" is "find", the CPU 31 executes the subroutine shown in FIG. 27. If the "operation instruction segment" is "reserve a conference room", the CPU 31 executes the subroutine shown in FIG. 29. If the "operation instruction segment" is "conference room reference", the CPU 31 executes the subroutine shown in FIG. 30. If the "operation instruction segment" is "refer to a schedule", the CPU 31 executes the subroutine shown in FIG. 31. If the "specified context" is "where are you?", the CPU 31 executes the subroutine shown in FIG. 24. These subroutines will be explained below.

Figure 22:
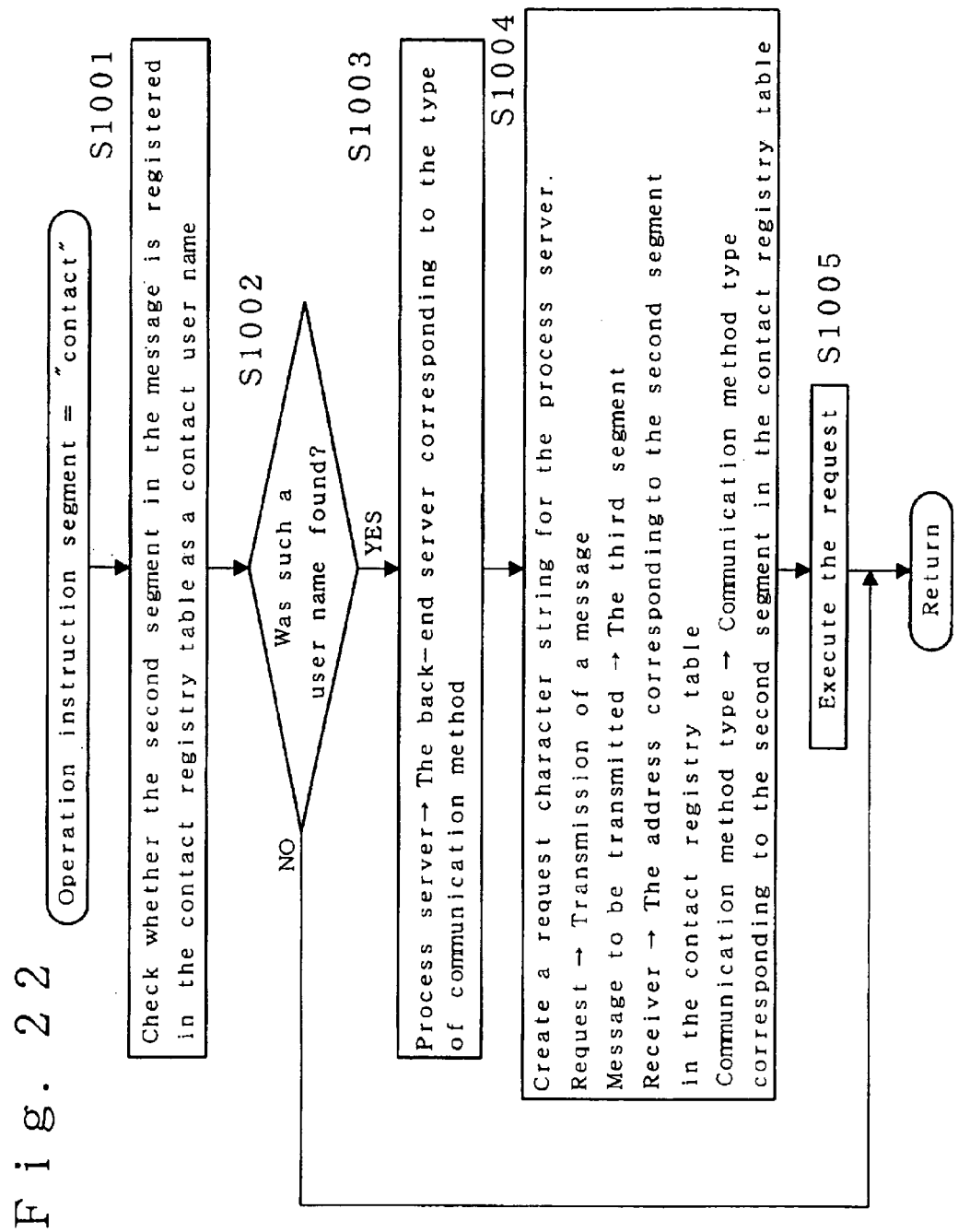
FIG. 22 is a flow chart showing a subroutine executed at S0202 of FIG. 14 in the case of the operation instruction segment="Contact"

First, the subroutine of FIG. 22, which is executed in the case where the "operation instruction segment"="contact", is explained. When the CPU 31 entered this subroutine, at the first step S1001, the CPU 31 checks whether the user name (nickname) designated by the second segment of the main message has already been registered in the "contact user name" column of the contact registry table 15.

At the next step S1002, the CPU 31 checks whether the user name designated by the second segment is found in the contact registry table 15 at step S1001. If the user name is not registered, the CPU 31 terminates this subroutine, and returns its process to the routine shown in FIG. 13. On the other hand, if the user name has already been registered, at step S1003, the CPU 31 reads out the type of communication method corresponding to the user from the contact registry table 15, and designates a back-end server 4 as the process server in accordance with the type of communication method (i.e., as a cooperating back-end server).

At the next step S1004, the CPU 31 creates a request character string for the process server. Specifically, the CPU 31 creates the request character string by regarding the content of the third segment of the main message as a message to be communicated, regarding the contact address in the contact registry table 15 corresponding to the user name designated by the second segment as a party to be communicated, and by regarding the type of communication method in the contact registry table 15 corresponding to the user name designated by the second segment as the type of communication method. Thus, the request character string is an instruction to convey the message to the receiver through the specified communication method.

At the next step S1005, the CPU 31 executes the request by transmitting the request character string created at step S1004 to the process server. Once this step S1005 is completed, the CPU 31 terminates this subroutine, and returns its process to the routine in FIG. 14.

Figure 24:
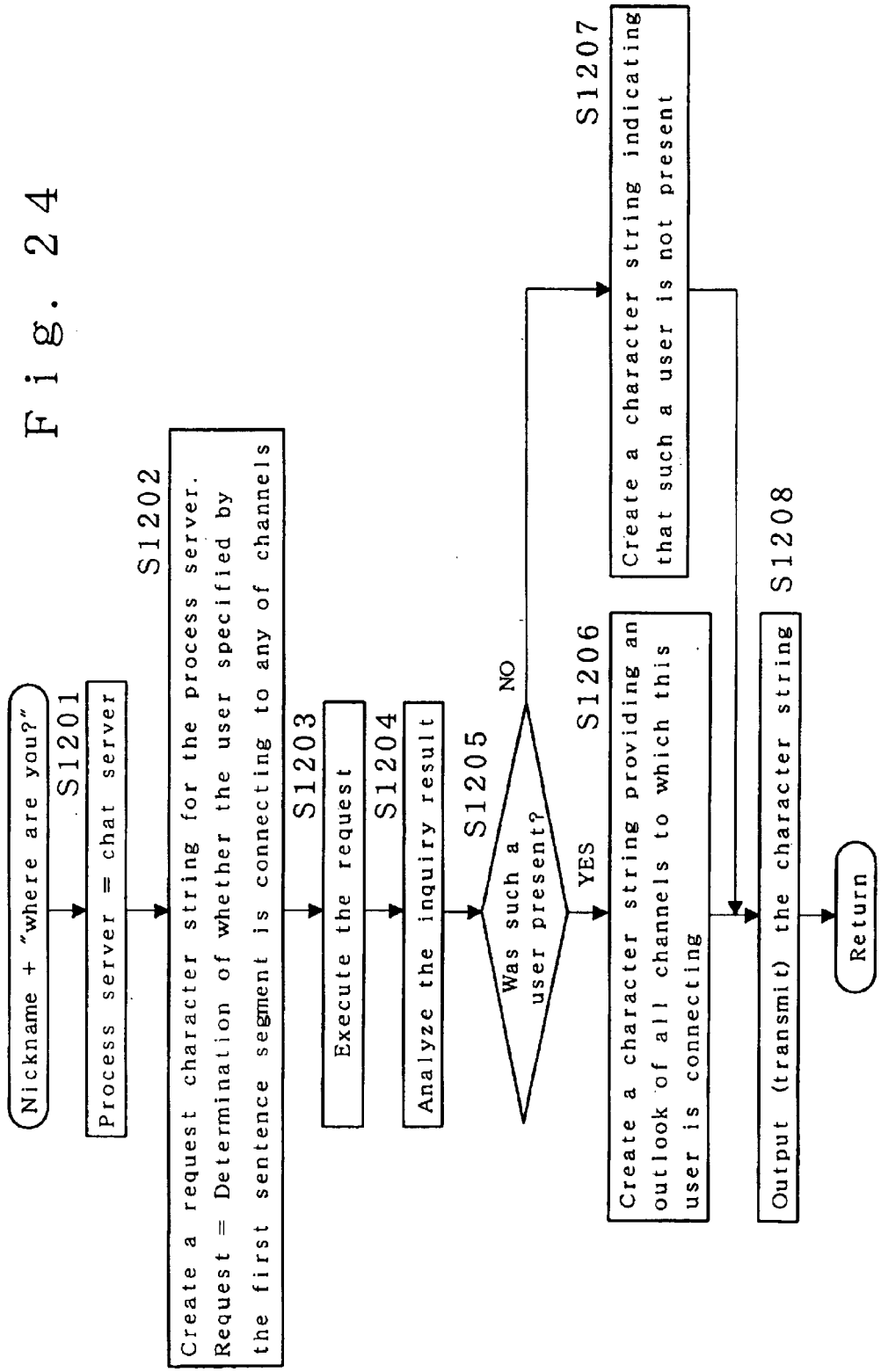
FIG. 24 is a flow chart showing a subroutine executed at S0202 of FIG. 14 in the case of the specified context="Where are you?"

Next, the subroutine of FIG. 24, which is executed in the case where the "specified context"="where are you", is explained. When the CPU 31 enters this subroutine, at the first step S1201, the CPU 31 determines the chat server 1 itself as a process server (i.e., as a cooperating back-end server).

At the next step S1202, the CPU 31 creates request character string for the process server. Specifically, the CPU 31 creates a request character string providing an instruction to determine whether the user designated by the nickname in the first segment of the main message is connecting to any of the channels, and if so, to which channel such a user is connecting.

At the next step S1203, the CPU 31 executes the request by sending out the request character string created at step S1202 to the process server. The chat server 1 that has received the request character string checks whether the user having the nickname contained in the request character string is connecting to any of the channels, and if so, to which channel such a user is connecting. Then the chat server 1 returns the result to the dummy client 3.

At the next step S1204, the CPU 31 analyzes the result returned from the chat server 1, which acted as the process server.

At the next step S1205, based on the analyzed result produced at step S1204, the CPU 31 checks whether the user having the nickname designated in the first segment of the main message is connecting to any of the channels of the chat server 1, and if so, checks to which channel such a user is connecting. If such a user exists in any of the channels, at step S1206, the CPU 31 creates a response character string (that is, message information) providing an outlook of all channels to which this user is connecting. On the other hand, if that user is not connecting to any of the channels, at step S1207, the CPU 31 creates a response character string (that is, message information) indicating that such a user does not exist. Once step S1206 or step S1207 is completed, at step S1208, the CPU 31 outputs the response character string created at step S1206 or at step 1207 to the chat server 1. Once this step S1208 is completed, the CPU 31 terminates this subroutine, and returns its process to the routine shown in FIG. 14.

Figure 26:
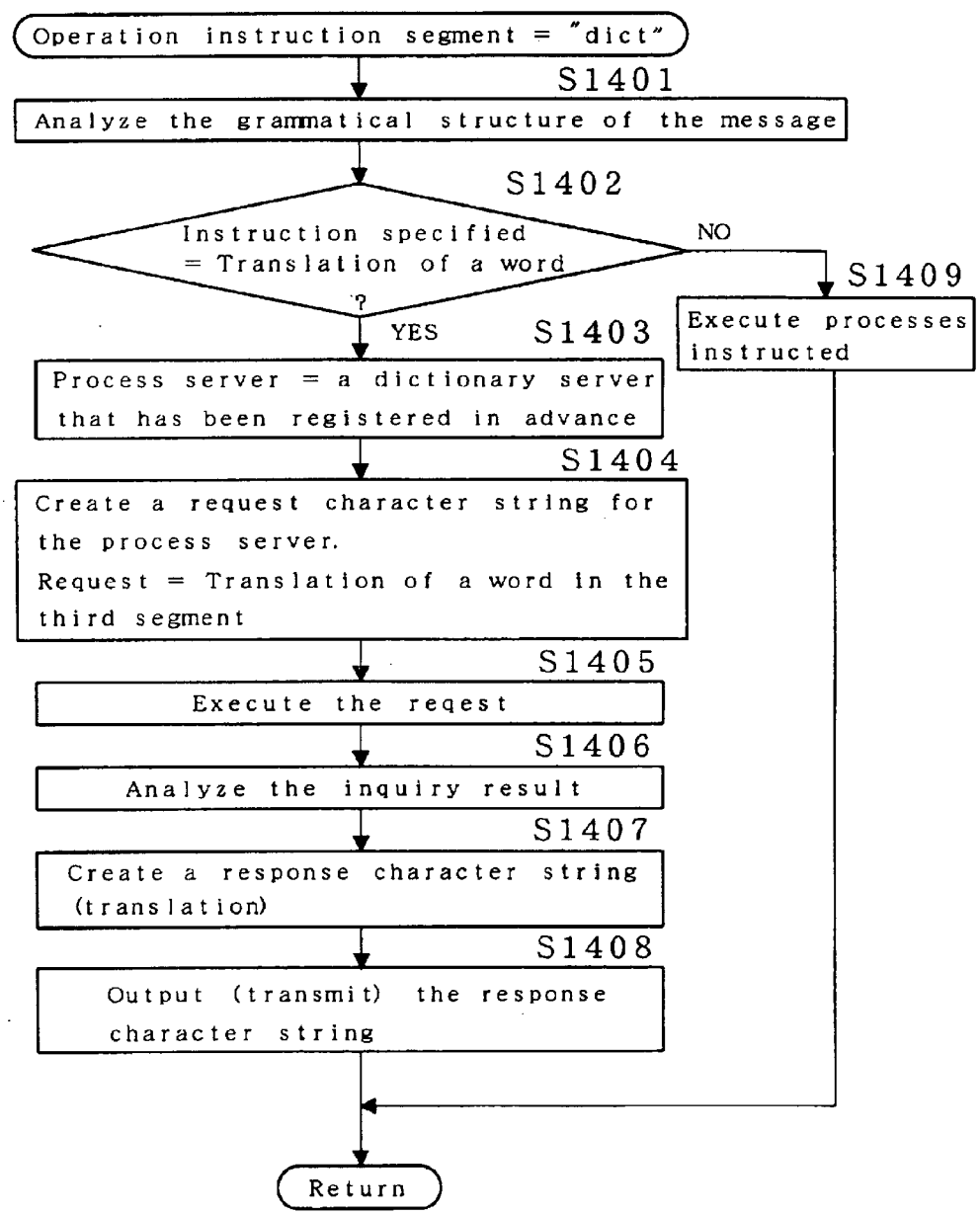
FIG. 26 is a flow chart showing a subroutine executed at S0202 of FIG. 14 in the case of the operation instruction segment="dict"

Next, the subroutine of FIG. 26, which is executed in the case where the "operation instruction segment"="dict", is explained. When the CPU 31 enters this subroutine, at the first step S1401, the CPU 31 analyzes the grammatical structure of the main message. That is, the CPU 31 identifies the type of dictionary specified by the second segment, and subject characters specified in the third segment, respectively.

At the next step S1402, the CPU 31 checks whether an instruction specified in the second segment of the main message is "–t", which indicates translation of a word". If the instruction specified by the second segment is not "–t", which indicates "translation of a word", at step S1409, the CPU 31 executes the process instructed by the second segment. For example, if the instruction is "search for the meaning", the CPU 31 cooperates with a server having a database of encyclopedia or the like (not shown in the figures) to check the meaning of the subject word designated by the third segment, and returns the result to the sender. Once step S1409 is completed, the CPU 31 terminates this subroutine, and returns its process to the routine shown in FIG. 14.

On the other hand, if the instruction specified by the second segment of the main message is "–t" indicating "translation of a word", at step S1403, the CPU 31 assigns a dictionary server that has been registered for processing "translation of a word" as the process server (i.e., a cooperating back-end server).

At the next step S1404, the CPU 31 creates a request character string for such a process server. Specifically, the CPU 31 creates a request character string instructing translation of subject characters designated by the third segment of the main message.

At the next step S1405, the CPU 31 executes the request by sending out the request character string created at step S1404 to the process server.

At the next step S1406, the CPU 31 analyzes the result returned from the dictionary server, which has acted as the process server, to extract a translation of the subject characters.

At the next step S1407, the CPU 31 creates a response character string (message information) representing the translation of the subject characters extracted at step S1406.

At the next step S1408, the CPU 31 outputs to send out the response character string (that is, message information) created at step S1407 to the chat server 1. Once this step S1408 is completed, the CPU 31 terminates this subroutine, and returns its process to routine shown in FIG. 14.

Figure 27:
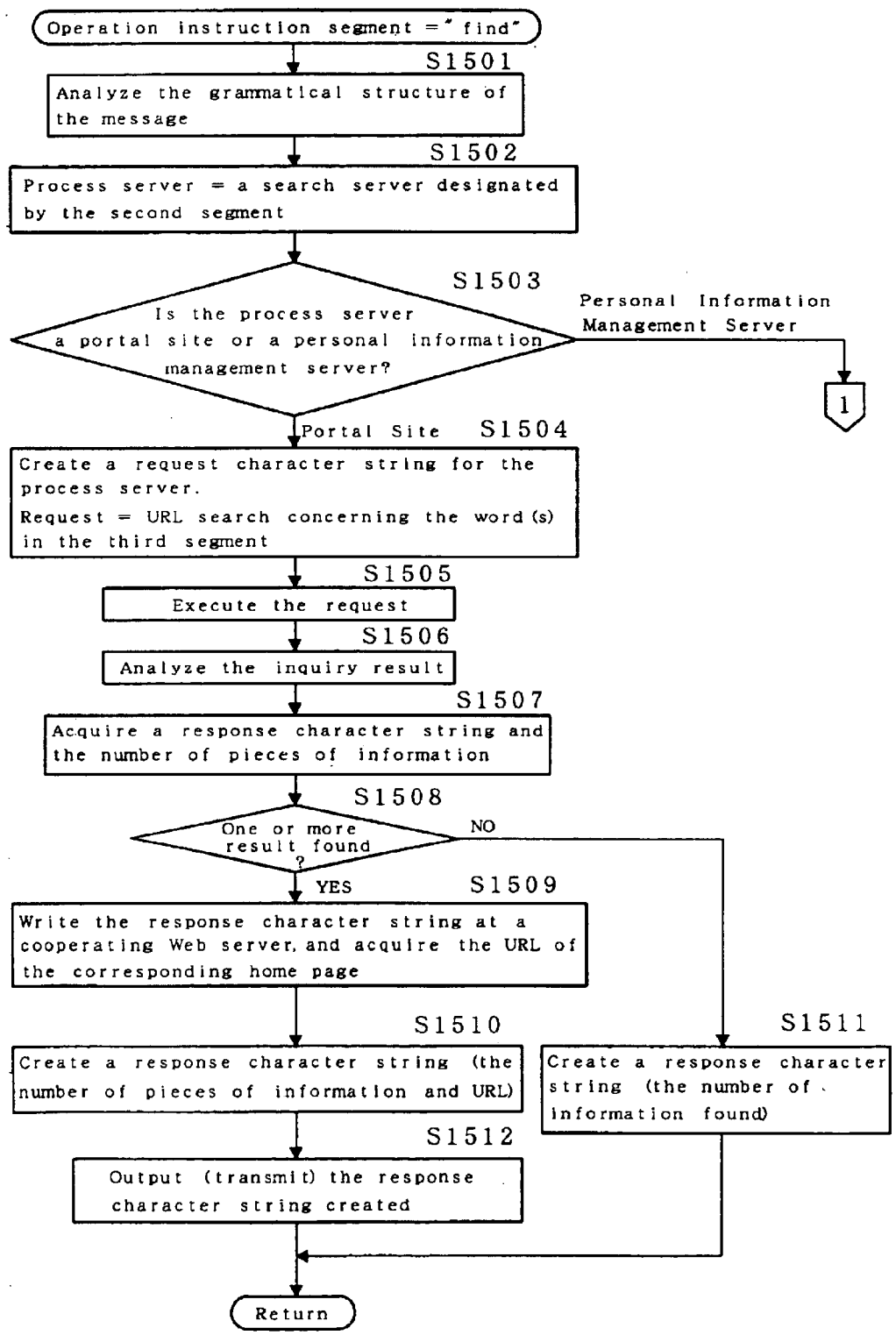
FIG. 27 is a flow chart showing a subroutine executed at S0202 of FIG. 14 in the case of the operation instruction segment="find"
Figure 28:
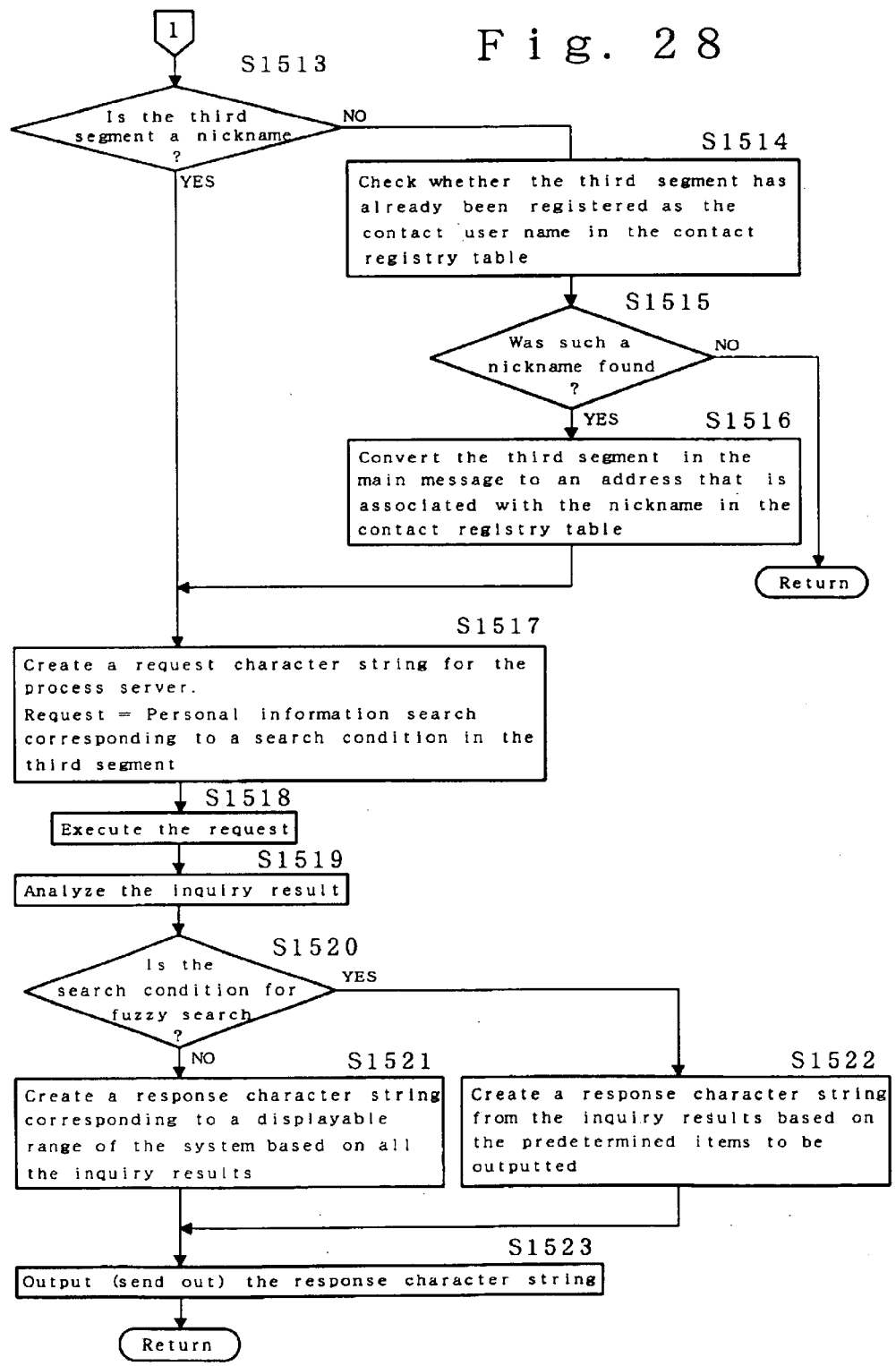
FIG. 28 is a flow chart showing a subroutine executed at S0202 of FIG. 14 in the case of the operation instruction segment="find"

Next, the subroutine of FIGS. 27 and 28, which is executed in the case where the "operation instruction segment"="find", is explained. When the CPU 31 enters this subroutine, at the first step S1501, the CPU 31 analyzes the grammatical structure of the main message. That is, the CPU 31 identifies the name of a search server designated by the second segment, and subject characters to be searched that is designated by the third segment.

At the next step S1502, the CPU 31 assigns a search server designated by the second segment of the main message as the process server (i.e., the cooperating back-end server).

At the next step S1503, the CPU 31 checks whether the process server assigned at step S1502 is a portal site or a personal information management server. If the process server is a portal site, the CPU 31 advances its process to step S1504. If the process server is a personal information management site based on the standards, such as whois, X. 500, LDAP or the like, the CPU 31 advances its process to step S1513.

At the step S1504, which is a step executed when the process server is a portal site, the CPU 31 creates a request character string for the process server. Specifically, the CPU 31 creates a request character string instructing to search for Internet home pages relating to a subject character designated by the third sentence segment of the main message.

At the next step S1505, the CPU 31 executes the request by sending out the request character string created at step S1504 to the process server.

At the next step S1506, the CPU 31 analyzes the result returned from the portal site, which acted as the process server.

At the next step S1507, based on the result of the analyzing at step S1506, the CPU 31 obtains a response character string (the schematics of the home page found) and the number of pieces of information (the number of the home pages found).

At the next step S1508, the CPU 31 checks whether the number of pieces of the information obtained at step S1507 (the number of home pages found) is one or more. If the number is zero, the CPU 31 creates a response character string (that is, message information) indicating that the number of pieces of information obtained is zero at step S1511, and outputs the created response character string to the chat server 1 at step S1512. Then, the CPU 31 terminates this subroutine, and returns its process to the routine shown in FIG. 14.

On the other hand, if the number of pieces of information obtained at step S1507 is determined to be one or more at step S1508, at step S1509, the CPU 31 enters the response character string obtained at step S1507 at a specified location in a cooperating Web server, and Obtains the URL of the corresponding home page. At the next step S1510, the CPU 31 creates a response character string (that is, message information) indicating the number of pieces of information obtained at step S1507 and the URL obtained at step S1509. At the next step 51512, the CPU 31 outputs the response character string created at step S1510 to the chat server 1. Once this step S1512 is completed, the CPU 31 terminates this subroutine, and returns its process to routine shown in FIG. 14.

On the other hand, at step S1513, which is a step executed when the process server is a personal information management server, the CPU 31 checks whether the third segment of the main message is a nickname or invariant information of a person (for example, the real name, mailing address, etc.). If the third segment of the main message is invariant information of a person, the CPU 31 advances its process to step S1517. On the other hand, if the third segment of the main message is a nickname, at step S1514, the CPU 31 checks whether the nickname designated by the third segment has already been registered in the "user" column of the contact registry table 15. If the nickname is not registered, the CPU 31 determines that the search is impossible, terminates this subroutine, and returns its process to the routine shown in FIG. 14. On the other hand, if the nickname designated by the third segment has already been registered in the contact registry table 15, at step S1516, the CPU 31 converts the content of the third segment of the main message to an contact address that is associated with the nickname in the contact registry table 15, and advance its process to step S1517.

At step S1517, the CPU 31 creates a request character string for the process server. Specifically, the CPU 31 creates a request character string instructing to search for personal information corresponding to search condition designated by the third segment of the main message which is invariant personal information. Here, the search conditions designated by the third segment may include a wild card (*). In that case, based on logical ANDs of search conditions except the portion designated by the wild card (*), fuzzy search is executed.

At the next step S1518, the CPU 31 executes the request by sending out the request character string created at step S1517 to the process server.

At the next step S1519, the CPU 31 analyzes a result of the search from the personal information management server, which acts as the process server. This result includes information corresponding to all the items that are regarded as the search conditions by the personal information management server.

At the next step S1520, the CPU 31 checks whether the search conditions in the request character string created at step S1517 are for fuzzy search. If the search conditions are not for fuzzy search—i.e., if the search conditions do not include a wild card (*), the CPU 31 advances its process to step S1521. At this step S1521, the CPU 31 creates a response character string (message information) based on the analyzed results with respect to all the searched items analyzed at step S1519. However, if the system of client 2 of the sender cannot display all the items of the searched results, the CPU 31 creates a response character string (message information) based on the limited items, which the system can display. On the other hand, if the search conditions are for fuzzy search—i.e., if the wild card (*) is included in the search conditions, the CPU 31 advances its process to step S1522. At this step S1522, based on the subject items that are predetermined to be outputted among all the items of the searched results analyzed at step S1519, the CPU 31 creates a response character string.

After step S1521 or step S1522 is completed, at step S1523, the CPU 31 outputs (sends out) the response character string created at step S1521 or step S1522 to the chat server 1, then terminates this subroutine, and returns its process to the routine shown in FIG. 14.

Figure 29:
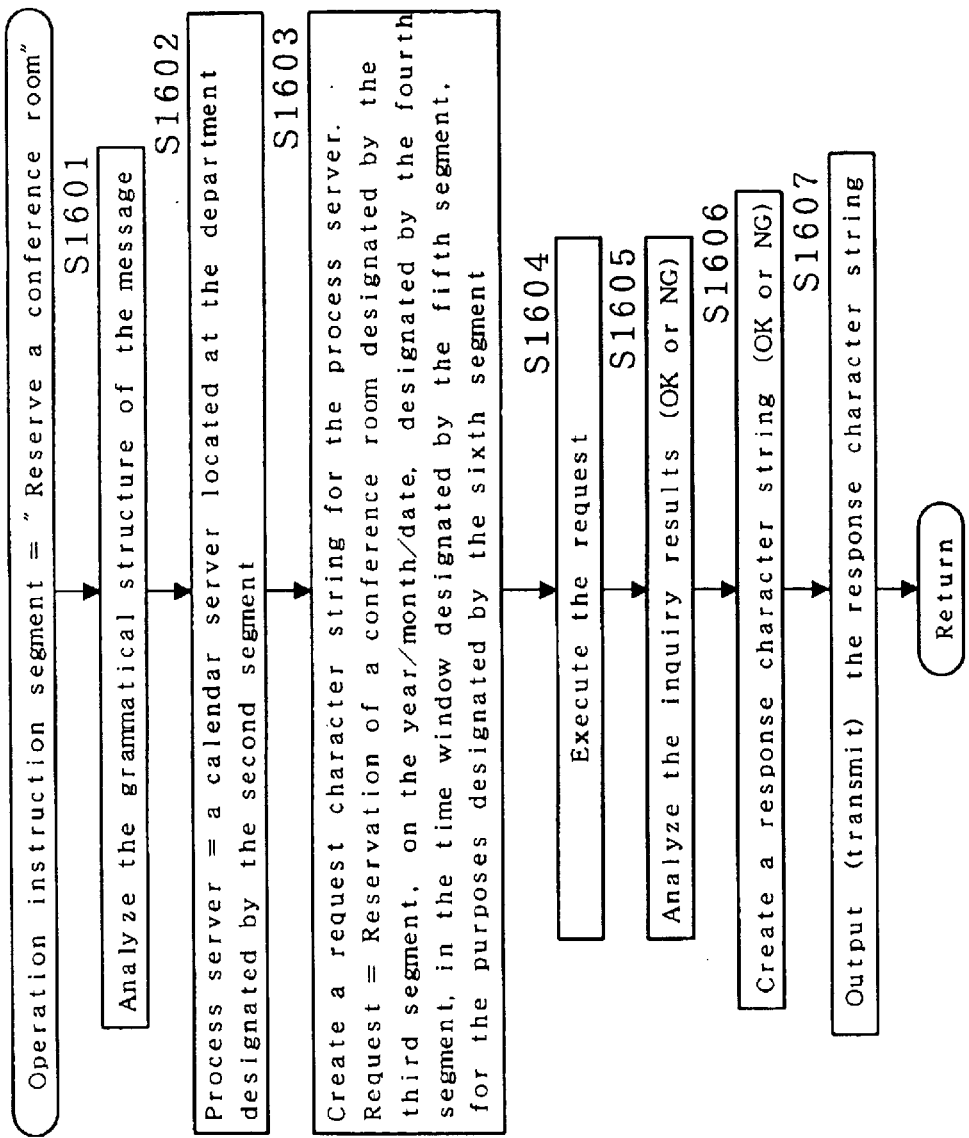
FIG. 29 is a flow chart showing a subroutine executed at S0202 of FIG. 14 in the case of the operation instruction segment="Conference room reservation"

Next, the subroutine of FIG. 29, which is executed in the case where the "operation instruction segment"="reserve a conference room", is explained. When the CPU 31 enters this subroutine, at the first step S1601, the CPU 31 analyzes the grammatical structure of the main message. That is, the CPU 31 identifies the department name designated by the second segment, the conference room name (place) designated by the third segment, the year/month/date designated by the fourth segment, the time window designated by the fifth segment, and the agenda designated by the sixth segment, respectively.

At the next step S1602, the CPU 31 assigns a calendar server located at the department designated by the second segment of the main message as the process server (i.e., as the cooperating back-end server).

At the next step S1603, the CPU 31 creates a request character string for the process server. Specifically, the CPU 31 creates a request character string instructing to reserve a conference room designated by the third segment, on the year/month/date designated by the fourth segment, in the time window designated by the fifth segment, for the purposes designated by the sixth segment under the sender's name.

At the next step S1604, the CPU 31 executes the request by sending out the request character string created at step S1603 to the process server.

At the next step S1605, the CPU 31 analyzes the results of the request returned from the calendar server, which acts as the process server. Here, the result is either reservation made", or "reservation not made".

At the next step S1606, the CPU 31 creates a response character string (message information indicating whether the reservation was made or not) based on the result analyzed at step S1605.

At the next step S1607, the CPU 31 outputs (transmits) the response character string created at step S1606 to the chat server 1. Once the step S1607 is completed, the CPU 31 terminates this subroutine, and returns its process to the routine shown in FIG. 14.

Figure 30:
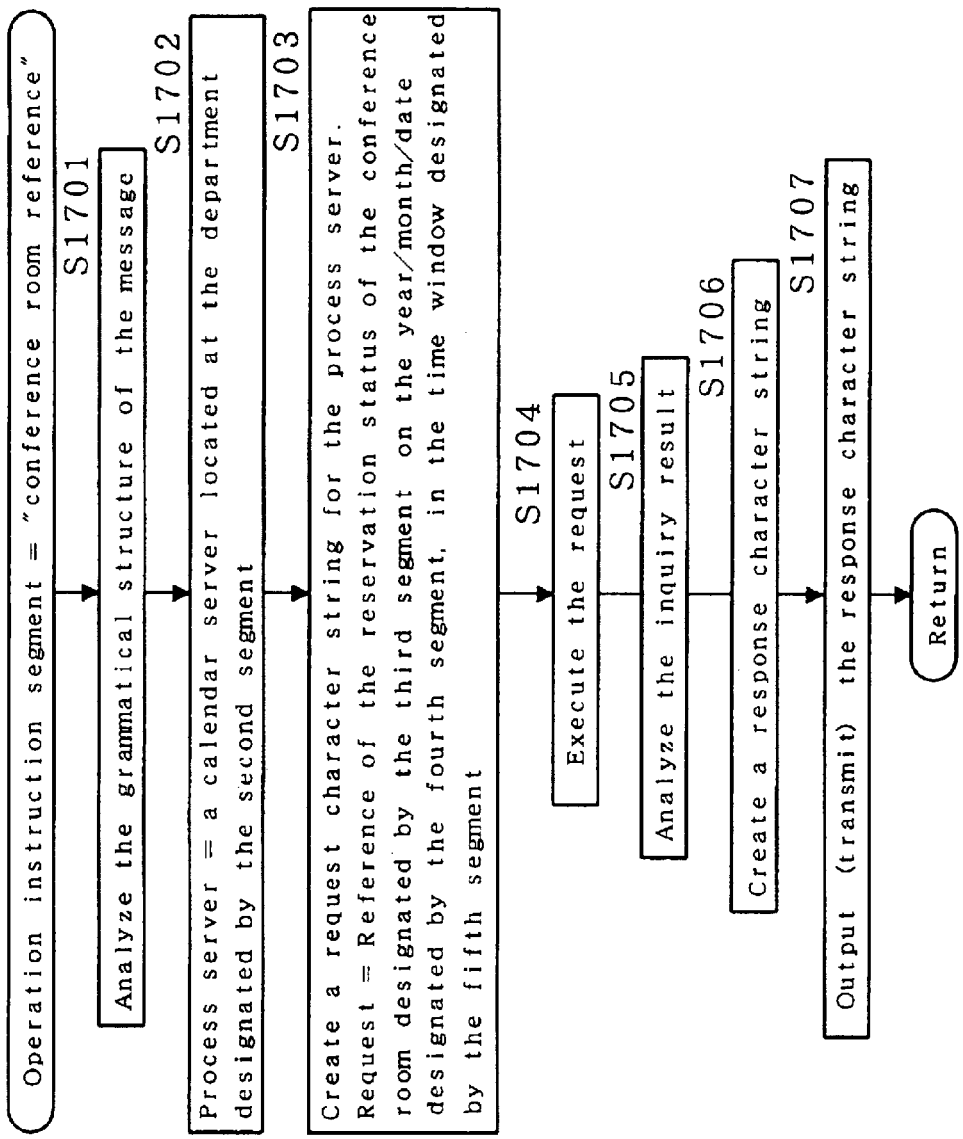
FIG. 30 is a flow chart showing a subroutine executed at S0202 of FIG. 14 in the case of the operation instruction segment="Conference room reference"

Next, the subroutine of FIG. 30, which is executed in the case where the "operation instruction segment"= "conference room reference", is explained. When the CPU 31 enters this subroutine, at the first step S1701, the CPU 31 analyzes the grammatical structure of the main message. That is, the CPU 31 identifies the department name designated by the second segment, the conference room name (place) designated by the third segment, the year/month/date designated by the fourth segment, and the time window, designated by the fifth sentence segment, respectively.

At the next step S1702, the CPU 31 assigns a calendar server located at the department designated by the second segment of the main message as the process server (i.e., as the cooperating back-end server).

At the next step S1703, the CPU 31 creates a request character string for the process server. Specifically, the CPU 31 creates a request character string instructing to confirm that the conference room designated by the third segment is reserved on the year/month/date designated by the fourth segment, in the time window designated by the fifth segment.

At the next step S1704, the CPU 31 executes the request by sending out the request character string created at step S1703 to the process server.

At the next step S1705, the CPU 31 analyzes the results of the request returned from the calendar server, which acts as the process server. Here, the result indicates either "reservation not confirmed", or "who made the reservation for what purpose."

At the next step S1706, the CPU 31 creates a response character string (message information) based on the result analyzed at step S1705.

At the next step S1707, the CPU 31 outputs (transmits) the response character string created at step S1706 to the chat server 1. Once the step S1707 is completed, the CPU 31 terminates this subroutine, and returns its process to the routine shown in FIG. 14.

Figure 31:
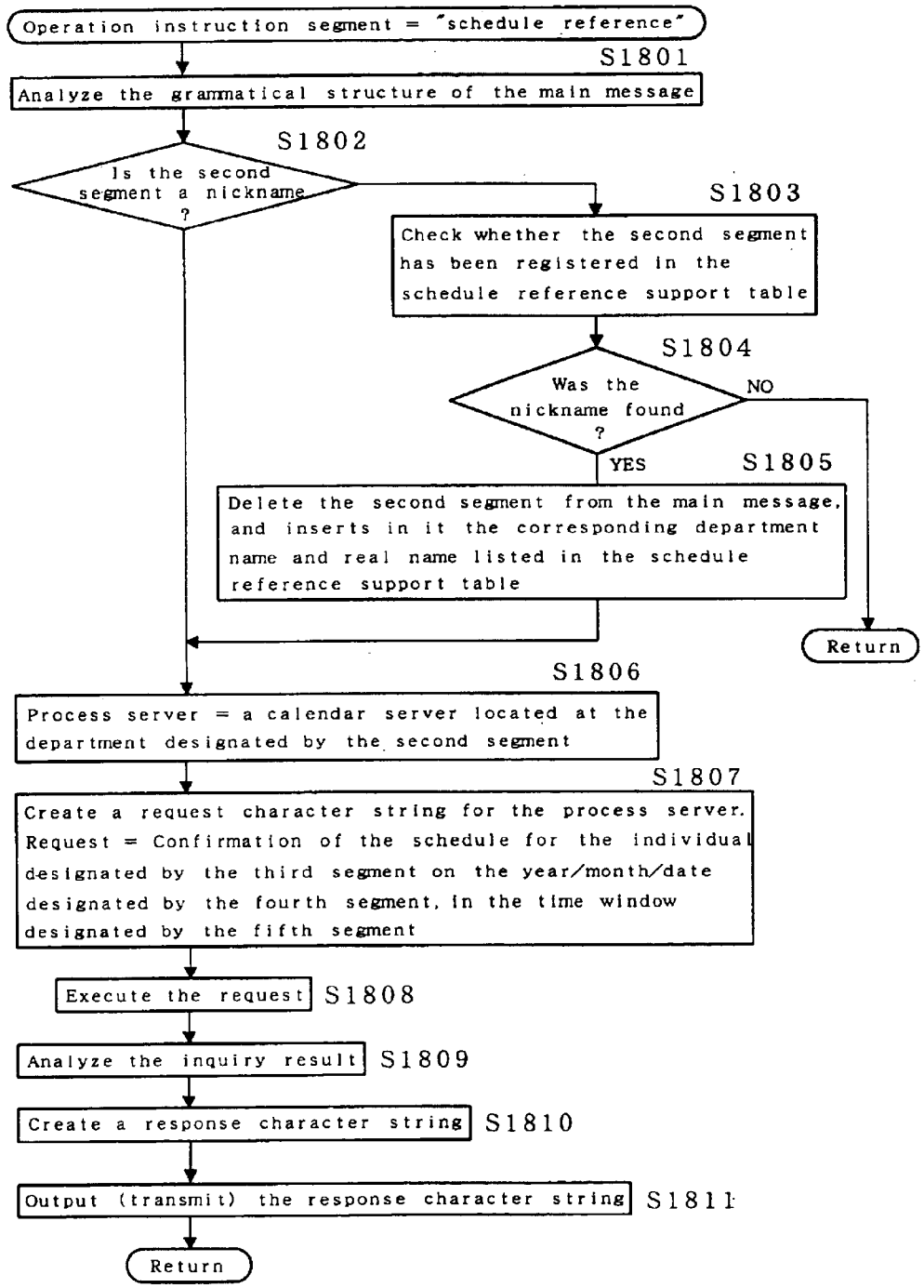
FIG. 31 is a flow chart showing a subroutine executed at S0202 of FIG. 14 in the case of the operation instruction segment="Schedule reference"

Next, the subroutine of FIG. 31, which is executed in the case where the "operation instruction segment"="schedule reference", is explained. When the CPU 31 enters this subroutine, at the first step S1801, the CPU 31 analyzes the grammatical structure of the main message. That is, the CPU 31 identifies the department name designated by the second segment, the personal name designated by the third segment, the year/month/date designated by the fourth segment, and the time window designated by the fifth segment, respectively. Alternatively, the CPU 31 identifies the nickname designated by the second sentence segment, the year/month/date designated by the third sentence segment, and the time window designated by the fifth segment, respectively.

At the next step S1802, the CPU 31 checks whether the second segment of the main message is a nickname. If the second segment of the main message is not a nickname (that is, if it is the department name), the CPU 31 advances its process to step S1806. On the other hand, if the second segment of the main message is a nickname, at step S1803, the CPU 31 checks whether the nickname designated by the second segment has already been registered in the "nickname" column of the schedule reference support table 16. At the next step S1804, the CPU 31 checks whether the nickname is found at step S1803. If it is not registered, the CPU 31 determines that it cannot be searched, terminates this subroutine, and returns its process to the routine shown in FIG. 14. On the other hand, if the nickname designated by the second segment has been registered in the schedule reference support table 16, at step S1805, the CPU 31 deletes the second segment from the main message, and inserts in it the "department name" and "real name" as separate segments, which are listed in the row listing the corresponding nickname from the schedule reference support table 16. The CPU 31 then advances the process to step S1806.

At the next step S1806, the CPU 31 assigns a calendar server located at the department designated by the second segment of the main message as the process server (i.e., as the cooperating back-end server).

At the next step S1807, the CPU 31 creates a request character string for the process server. Specifically, the CPU 31 creates a request character string instructing to confirm the schedule for the individual designated by the third segment of the main message, on the year/month/date designated by the fourth segment, in the time window designated by the fifth segment.

At the next step S1808, the CPU 31 executes the request by sending out the request character string created at step S1807 to the process server.

At the next step S1809, the CPU 31 analyzes the results of the reeqest returned from the calendar server, which acts as the process server.

At the next step S1810, the CPU 31 creates a response character string (message information) based on the result analyzed at step S1809.

At the next step S1811, the CPU 31 outputs (transmits) the response character string created at step S1810 to the chat server 1. Once the step S1811 is completed, the CPU 31 terminates this subroutine, and returns its process to the routine shown in FIG. 14.

Returning to FIG. 14, once the process at step S0206 is completed, the CPU 31 terminates this subroutine, and returns the process to the routine shown in FIG. 13.

Returning to FIG. 13, once the process at step S0105 is completed, the CPU 31 advances the process to step S0109.

On the other hand, at step S0106, the CPU 31 searches for each of keywords listed in the "registered keyword" column in the keyword registry table 18 within the main message.

At the next step S0107, the CPU 31 checks whether combinations of the keywords listed in any of the rows of the "registered keyword" column in the keyword registry table 18 are included in the main message.

If the main message does not include keywords singly or in combination, the CPU 31 advances its process to step S0109. On the other hand, if any combination of the keywords is included in the main message, the CPU 31 executes the process corresponding to the keyword(s) at step S0108, which corresponds to process execution part.

Figure 15:
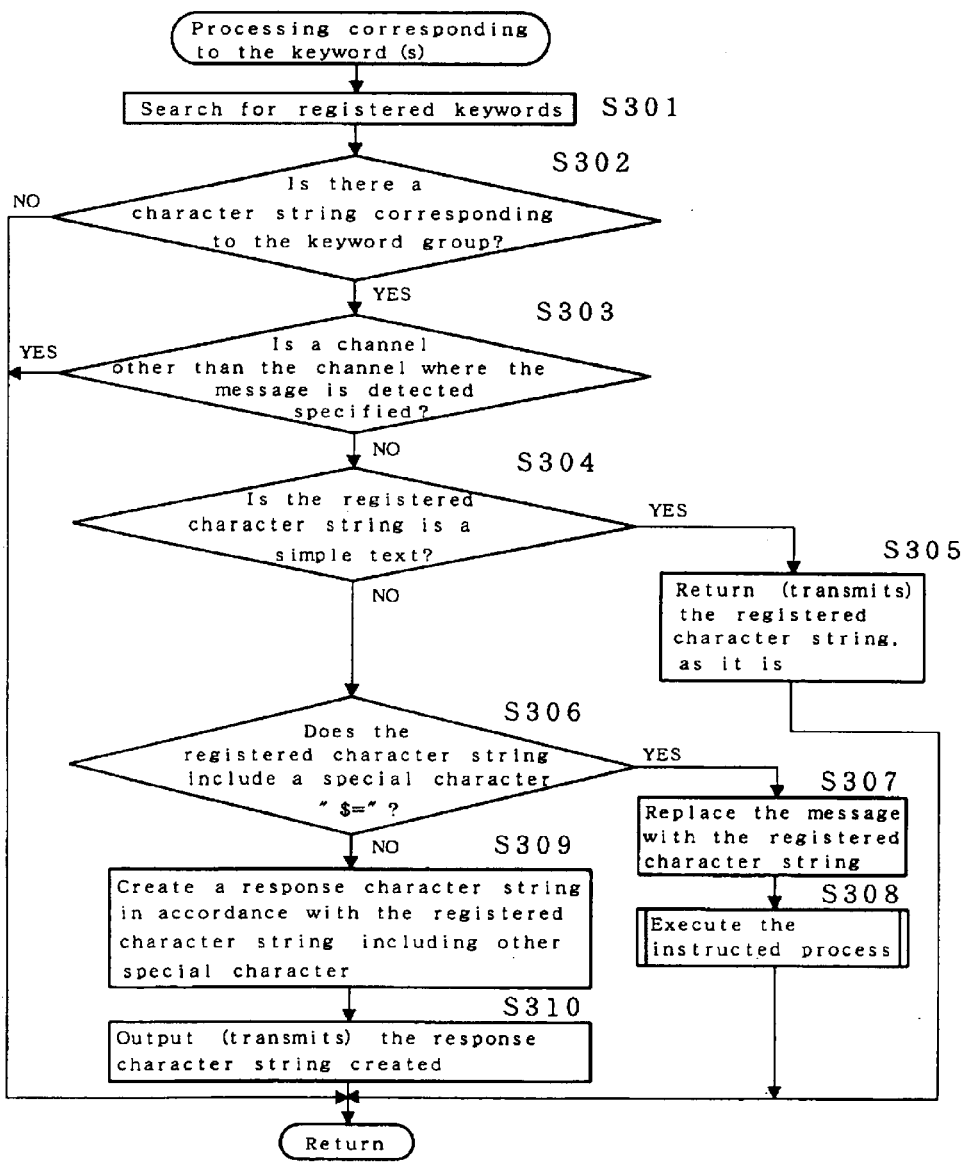
FIG. 15 is a flow chart showing a subroutine executed at S0108 of FIG. 13.
Figure 16:
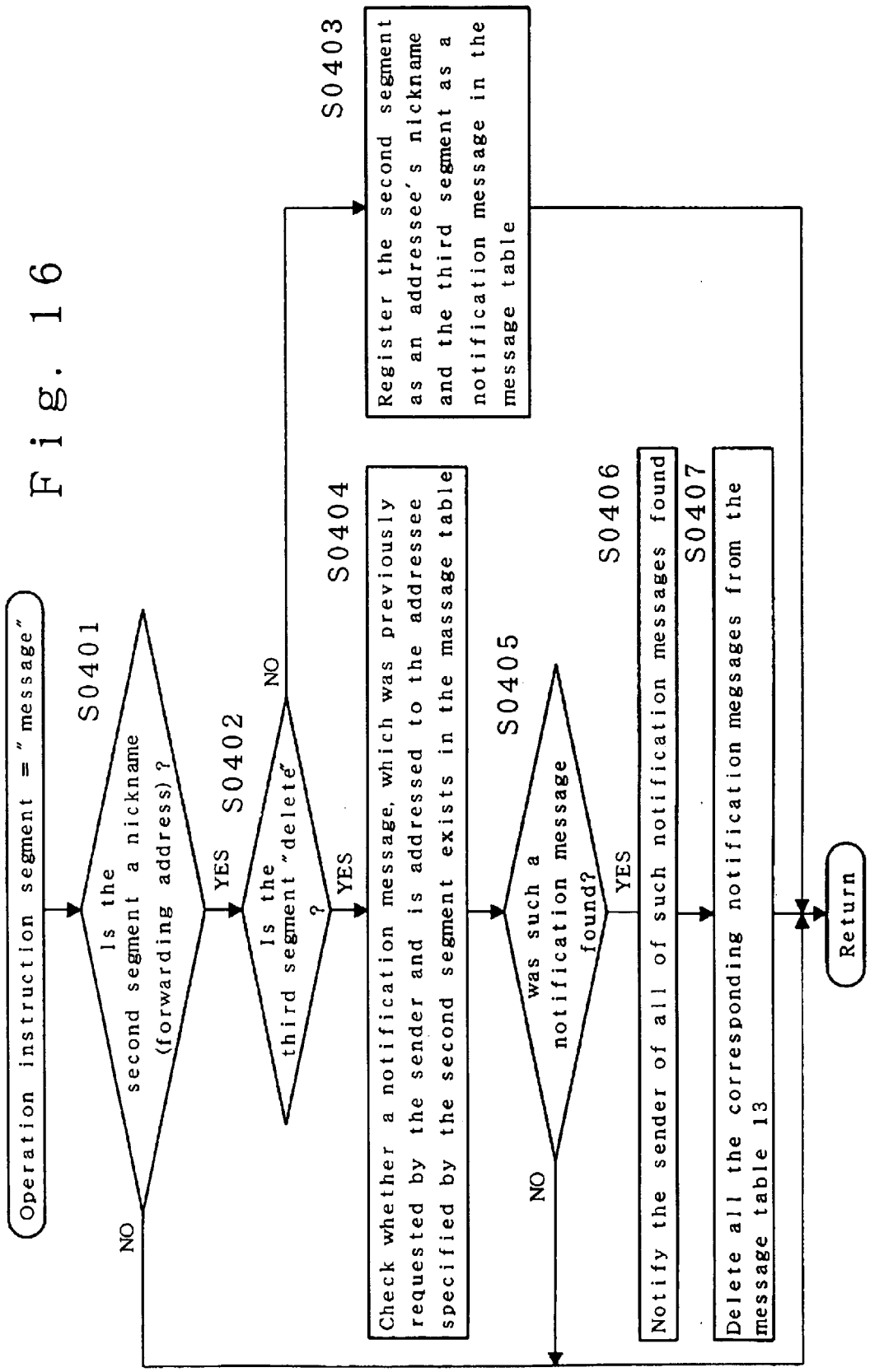
FIG. 16 is a flow chart showing a subroutine executed at S0202 of FIG. 14 in the case of the operation instruction segment="Message"

FIG. 15 is a flow chart showing the subroutine executed at this step S0108. When the CPU 31 enters this subroutine, at the first step S0301, the CPU 31 searches for rows that have keywords and any combinations thereof, which are included in the main message, in their "registered keyword" column within the keyword registry table 18.

At the next step S0302, the CPU 31 checks whether the character string has already been registered in the "registered character string" column of the row(s) that has found at step S0301. If the "registered character string" column of the corresponding row(s) is empty, the CPU 31 terminates this subroutine, and returns its process to the routine shown in FIG. 13. On the other hand, if a character string (referred to as "registered character string" hereinafter) has been registered in the "registered character string" column of the corresponding row(s), the CPU 31 advances its process to step S0303.

At step S0303, the CPU 31 checks whether the channel name other than the channel in which the message to be processed was detected is listed in the "specified channel-"column of the row(s) that has been detected at step S0301. If any channel name is listed in the "specified channel" column of the row(s) found at step S0301, and if that channel name does not correspond to the channel in which the message to be processed was detected, the CPU 31 determines that the registered character string is not effective, and terminates this subroutine. The CPU 31 then returns the process to routine shown in FIG. 13. On the other hand, if the "specified channel" column of the row(s) found at step S0301 includes the channel name of the channel in which the message to be processed was detected, or if the "specified channel" column of the row(s) found at step S0301 is empty, the CPU 31 advances its process to step S0304.

At step S0304, the CPU 31 checks whether the registered character string listed in the "registered character string" column of the row(s) found at step S0301 is a simple text, or includes special character string ("$=", "$@" or "$%"). If the registered character string is a simple text, at step S0305, the CPU 31 returns (transmits) the registered character string to chat server 1, as it is, and terminates this subroutine. The CPU 31 then returns the process to FIG. 13.

On the other hand, if the registered character string includes the special character string, the CPU 31 advances its process to step S0306. At step S0306, the CPU 31 checks whether a special character "$=" is included in the registered character string. If the special character "$=" is included in the registered character string, at step s0307, the CPU 31 replaces the content of the main message with the registered character string excluding the special character at step S0307, and executes the instructed process at step S0308. Because the specification of the instructed process to be executed at step S0308 is completely the same as the one executed at step S0105 in FIG. 14, its explanation is omitted here. Once this step S0308 is completed, the CPU 31 terminates this subroutine, and returns its process to the routine shown in FIG. 13. On the other hand, if the registered character string includes a special character other than "$=n", the CPU 31 advances its process to step S0309.

At step S0309, the CPU 31 creates a response character string (message information) in accordance with the content of the registered character string including the special character string ("$@" or "$%"). Specifically, because the part of the registered character string excluding the special character string is a text file name, if the special character string is "$@" the CPU 31 creates a response character string (message information) showing an arbitrarily selected one row from the text file. If the special character string is "$%" instead, the CPU 31 creates a response character string (message information) showing only one arbitrarily selected sentence which is one or two rows defined by delimiters from the periphery from the text file.

At the next step S0310, the CPU 31 outputs (transmits) the response character string created at step S0309 to the chat server 1. Once this step S0310 is completed, the CPU 31 terminates this subroutine, and returns its process to FIG. 13.

Returning to FIG. 13, once the process at step S0108 is completed, the CPU 31 advances its process to step S0109.

At step S0109, the CPU 31 enters (overwrites) the current time in the "last spoken time" column of the row corresponding to the sender in the channel in which the message to be processed was detected in the channel management table 12.

At the step S0110, the CPU 31 checks whether the above mentioned specified keyword is included in the main message. If the specified keyword is not included in the main message, the CPU 31 terminates this subroutine, and returns its process to the main routine shown in FIG. 10. On the other hand, if the specified keyword is included in the main message, at step S0111, the CPU 31 enters the specified keyword included in the main message into "keyword in the last message" column of the row for the sender in the channel in which the message to be processed was detected in the channel management table 12 which corresponds to the management part. Once step S0111 is completed, the CPU 31 terminates this subroutine, and returns its process to the main routine shown in FIG. 10.

Returning to FIG. 10, once the process at step S0005 is completed, the CPU 31 advances its process to step S0006.

At step S0006, the CPU 31 checks whether there is any notification message addressed to the sender in the message table 13. That is, the CPU 31 searches for rows that have the nickname of the sender in the "addressee's nickname" column. At the next step S0007, the CPU 31 determines whether such a notification message is found at step S0006. If there is such notification message, the CPU 31 returns its process to step S0004, and awaits the next event. On the other hand, if such a notification message is found, the CPU 31 advances its process to step S0008.

At step S0008, the CPU 31 checks whether the notification message(s) found at step S0006 is notified, within a past predetermined time period (e.g., within the last three minutes), to the sender of the message to be processed who is the addressee of the notification message(s) through any of the channels. If such notification has been made, the CPU 31 determines that it is not necessary to send such a notice again, and returns its process to step S0004. The CPU 31 then awaits the next event. On the other hand, if no notice has been sent within the past predetermined time period, the CPU 31 advances its process to step S0009.

At step S0009, the CPU 31 notifies the sender of the message to be processed who is the addressee of the notification message(s) that there is such a notification message (s) and also notifies the sender of the number of such notification messages. The CPU 31 transmits a character string including these information pieces to the chat server 1. Once this step S0009 is completed, the CPU 31 returns the process to step S0004, and awaits the next event.

On the other hand, at step S0010, which is to be executed when the "JOIN" message is detected, the CPU 31 checks whether there is any notification message addressed to the newly connected user, who is the sender of the "JOIN" message, in the message table 13. That is, the CPU 31 checks whether there is any row(s) that has the nickname of the newly connected user in its "addressee's nickname" column.

At the next step S0011, the CPU 31 checks whether such a notification message(s) is found in step S0010. If there is no such notification message, the CPU 31 advances the process to step S0014. On the other hand, if there is such a notification message(s), the CPU 31 advances its process to step S0012.

At step S0012, the CPU 31 checks whether the notification message(s) found at step S0010 is notified, within a past predetermined time period (e.g., within the last three minutes), to the sender of the message to be processed who is the addressee of the message(s) through any of the channels. If such notification has been made, the CPU 31 determines that it is not necessary to send such a notice again, and returns its process to step S0014. On the other hand, if no notice has been sent within the past predetermined time period, the CPU 31 advances its process to step S0013.

At step S0013, the CPU 31 notifies the newly connected user that there is such a notification message(s) and also notifies the user of the number of such notification messages. The CPU 31 transmits a character string including these information pieces to the chat server 1. Once this step S0013 is completed, the CPU 31 advances the process to step S0014.

At step s0014, the CPU 31 checks whether the nickname of the newly connected user is listed in the "nickname" column of the schedule reference support table 16, and if so, it checks which row the nickname is listed.

At the next step S0015, the CPU 31 checks whether the nickname is found at step S0014. If the nickname has not been registered, the CPU 31 returns the process to step S0004 without conducting any further processes, and awaits the next event. On the other hand, if the nickname already registered, the CPU 31 advances its process to step S0016.

At step S0016, the CPU 31 assigns a calendar server located at a department listed in the "department name" column of the row that has been found at step S0014, which is the department corresponding to the nickname as a process server (i.e., a cooperating back-end server).

At the next step S0017, the CPU 31 creates a request character string for the process server. Specifically, the CPU 31 create a request character string instructing to confirm the schedule of the individual that is listed in the "real name" column of the row found at step S0014 (i.e., the individual corresponding to the nickname) within a predetermined time period from the current time (e.g., within 24 hours).

At the next step S0018, the CPU 31 transmits the request character string created at step S0017 to the process server to execute the request.

At the next step S0019, the CPU 31 analyzes the result of the request returned from the calendar server, which acts as the process server.

At the next step s0020, the CPU 31 creates a response character string based on the analysis result produced at step S0019.

At the next step S0021, the CPU 31 outputs (transmits) the response character string created at step S0020 to the chat server 1. Once this step S0021 is completed, the CPU 31 returns its process to step S0004, and awaits a new event.

On the other hand, at step S0022, which is to be executed every time a time-up event occurs within a predetermined time cycle (one minute cycle, for example), the CPU 31 checks whether there is any notification message, in the date and time specified message table 14, whose specified date/time listed in the "specified date and time" column is prior to the current time.

At the next step S0023, the CPU 31 checks whether such a notification message(s) is found at step S0022, and if not, advances the process to step S0025. On the other hand, if such a notification message(s) is found, the CPU 31 advances its process to step S0024. At step S0024, the CPU 31 moves the content of the row(s) in the date and time specified message table 14, which has the specified date and time (listed in the "specified date and time" column) prior to the current time, to the message table 13. At that time, the CPU 31 enters the date and time listed in the "specified date and time" column in the date and time specified message table 14 into the "received date and time" column of the message table 13. Once this step S0024 is completed, the CPU 31 advances its process to step S0025. At step S0025, the CPU 31 checks whether there is any notification message, in the alarm management table 17, whose specified date/time listed in the "specified date and time" column is prior to the current time.

At the next step S0026, the CPU 31 checks whether such a message(s) is found at step S0025, and if not, advances the process to step S0004. The CPU 31 then awaits a new event. On the other hand, if such a message(s) is found, the CPU 31 advances its process to step S0027. At step S0027, the CPU 31 transmits a character string (message) listed in the "message" column of the row(s) in the alarm management table 17, which has the specified date and time listed in the "specified date and time" column prior to the current time towards the addressee specified by the nickname listed in the "registering user" column of the same row(s). The CPU 31 transmits the character string including these pieces of the information to the chat server. At the next step S0028, the CPU 31 deletes the content of the row(s) that listing the notification message that has been sent out at step S0027 from the alarm management table 17. Once this step S0028 is completed, the CPU 31 returns its process to step S0004, and awaits a new event.

The Operation of the Dummy Client

The conversations between the dummy client 3 according to this embodiment and arbitrary client(s) 2 will be explained in more detail.

Notification Messages

If a user accesses to a channel in order to initiate conversation with another user, but does not find the user in the channel, or if a user has something to be conveyed to another user who has already disconnected his or her client 2 from the channel, the user sends to the channel a main message in the following format attached with the nickname (John) of the dummy client 3 as the addressee.

"Message user02: The meeting on next Friday has been canceled"

Here, "Message" is the operation instruction segment, "user02" is the nickname of an addressee and "The meeting on next Friday has been canceled" is the content of the notification message.

After detecting this message, dummy client 3 registers the nickname of the addressee and content of the notification message to the message table 13 (step S0403).

When the addressee accesses to any one of the channels after these events, the dummy client 3 detects the "JOIN" message from the newly connected user (addressee), and searches for a notification message(s) addressed to the addressee from the message table 13. If there is such a notification message(s), the CPU 31 notifies the addressee that there is such a notification message(s) in the following format, for example (S0013).

"Message waiting>user02 (you can read the message by typing "show me the message")"

Here, if the addressee accesses another channel within a predetermined time period (three (3) minutes, for example) from the time the addressee received such a notice in the original channel, the addressee will not receive the notice again through the new channel. Only if the addressee accesses another channel after the pre-determined time period is elapsed, the notice is retransmitted (S0013).

Also, when a notification message(s) is waiting, the notice is transmitted even after the addressee has accessed any one of the channels. That is, whenever the addressee sends a message to some user, the dummy client 3 detects the message transmission, and searches for messages addressed to the addressee. The dummy client 3 then notifies the addressee that there is a notification message(s) waiting for the addressee (S0009). However, if such a notice has already been made to the addressee in a past predetermined time period (three (3) minutes, for example), the dummy client 3 will not transmit the notice (S0008). Thus, the dummy client 3 sends out the notice only when it detects such a notification message after the predetermined time period has been passed since the notice was sent last. Accordingly, even if a sender requests to forward a notification message unconsciously to that its addressee actually accesses the channel, or even if the addressee accidentally ignores the notice which the addressee receives upon its accessing, the fact that the receiver has a notification message(s) waiting can securely be notified to the addressee. Furthermore, each of the users can inquire the dummy client 3 whether there is any notification message(s) waiting for the user at any time. In such a case, the user making such a inquiry sends to the channel a main message in the following format attached with the nickname (John) of the dummy client 3 as the addressee.

"Is there a message?"

The dummy client 3 that has detected this message searches for notification messages addressed to the sender of this message from the message table 13, and, if the message (s) is found, notifies the sender that there is a notification message(s) for the sender, in the following format, for example (S0503).

"You have one message waiting."

On the other hand, in case that no notification message is found for the sender, the dummy client 3 notifies the sender of such a status in the following format, for example (S0504).

"There is no message"

The user, who has been notified of the existence of notification message(s) in this way, can request transmission of the notification message(s) addressed to himself or herself at any time. In this case, such a user sends to the channel a main message in the following format attached with the nickname (John) of the dummy client 3 as the addressee.

"Show me the message."

The dummy client 3 that has received such a message searches corresponding notification message(s) addressed to that user from the message table 13, and sends out all notification messages it finds to that user in the following format attached with the requesting user's name(s) (S0603).

"user01 (received date and time): the meeting on next Friday has been canceled."

Here, "user01" indicates the nickname of the requesting user of the notification message (the creator of the message). Subsequently, the dummy client 3 notifies the requesting user(s) of the fact that the notification message is being forwarded to the addressee in the following format, for example (S0604).

"user02 is currently reading your message."

Here, "user02" indicates the nickname of the addressee of the message. Subsequently, the dummy client 3 deletes all the notification messages that have been sent out from the message table 13 (S0605).

Here, if the requesting user disconnects from the channel after making a request to forward a notification message to the dummy client 3, such a requesting user cannot read the above-mentioned notice that the notification message being forwarded to the addressee. Accordingly, the present embodiment provides means for allowing the requesting user who has requested to forward the notification message to inquire whether the notification message has been forwarded to the addressee. Specifically, the user who has requested to forward a notification message sends to the channel a main message in the following format attached with the nickname (John) of the dummy client 3 as the addressee.

"Has the message read yet?"

The dummy client 3 that has detected this message presents to the requesting user all notification messages that have been requested by this user, but still are left in the message table 13 (the notification messages that have not been forwarded to their addressee) in the following format, for example (S0703).

"user02 (received date and time): the meeting on next Friday has been canceled
There is a message not read"

Here, "user02" indicates the nickname of the addressee of the notification message. Further, if a requesting user would like to cancel its previous request made to the dummy client 3 to forward a notification message, the requesting user can cancel the notification message. In that case, such a user sends to the channel a main message in the following format attached with the nickname (John) of the dummy client 3 as the addressee.

"message user02 delete"

Here, "user02" indicates the nickname of the addressee of the notification message. The dummy client 3 that has detected this notification message presents to that user all notification messages that have been previously requested by this user, but still are left in the message table 13 (the notification messages that have not been forwarded to their addressee) in the following format, for example (S0406), and deletes all of such notification messages from the message table 13 (S0407).

"user02 (received date and time): the meeting on next Friday has been canceled
Deleted"

Here, "user02" indicates the nickname of the addressee of the notification message.

Specified Messages

For example, a birthday message and a season's greeting, etc., need to be forwarded to an addressee on a specified date/time, not immediately after the request to forward it made. Thus, the present embodiment provides means for delivering the notification message to the addressee on a specified date/time.

Specifically, a user requesting to forward a notification message on a specified date/time sends to the connecting channel a main message in the following format attached with the nickname (John) of the dummy client 3 as the addressee.

"Specified message user03 2000/02/03 10:00 Happy birthday"

Here, the "specified message" is an operation instruction segment. The "user03" is the nickname of the addressee. The "2000/02/03" is a specified year/month/date. The "10:00" is a specified delivery time. The "Happy birthday" is the content of the notification message to be conveyed. The dummy client 3 that has received this message treats this message as a normal message if the specified year/month/date/time is prior to the current date/time (S0805). However, if the specified year/month/date/time is subsequent to the current date/time, the dummy client 3 registers the nickname of the addressee, the specified date/time (the specified year/month/date and time), and the content of the notification message into the date and time specified message table 14 (S0803). Thereafter, the dummy client 3 checks whether the current date/time has passed the specified date/time registered in the date and time specified message table 14 every time a predetermined time period (one minute, for example) has passed (S0022). If it finds that the current date/time passed the specified date/time, the dummy client 3 regards the specified date/time as the received date/time, and moves the notification message corresponding to the specified date/time to the message table 13 (s0024). Then, this message is being treated as a normal notification message as if it has been requested at the specified date/time in a manner similar to above. Accordingly, its addressee recognizes that the message is requested to be forwarded at the specified date/time.

Contacts

For example, if a user has an urgent need to contact another user who is not accessing any of the channels, a normal message forwarding procedure in which the notification message is being sent to the addressee after the addressee accesses any one of the channels is not suitable to guarantee timely receipt of such a notification message. To obviate this problem, the present embodiment provides means for sending such an urgent message directly to the addressee via E-mail, means for forwarding the message to a portable terminal having an IP address, such as a cellular phone or beeper, and means for transmitting the message in the form of a facsimile message.

As a prerequisite to providing such means, information regarding media through which the addressee is contacted (type of communication method) and the contact address needs to be registered in the contact registry table 15 in advance. For that purpose, users who wish to have the benefit of this service need to send to a channel a main message in the following format attached with the nickname (John) of the dummy client 3 as the addressee.

"user04's contact address is e-mail 09012345678@emil-.phone.co.jp"

Here, the "user04" is the nickname of the user whose contact address is to be registered. The "email" is a type of communication method (electric mail). The "09012345678@email.phone.co.jp" is a contact address (the electric mail address of a cellular phone).

The dummy client 3 that has received this message enters the nickname, the type of communication method, and the contact address specified by the message into the contact registry table 15 with them associated with one another (S0902).

When another user wishes to contact this user whose type of communication method and contact address have been registered in the contact registry table 15 in this way, such a user sends to a channel a main message in the following format attached with the nickname (John) of the dummy client 3 as the addressee.

"contact user04" please call me at home immediately"

Here, the "contact" is an operation instruction segment. The "user04" is the nickname of the addressee. The "please call me at home immediately" is the notification message to be forwarded.

The dummy client 3 that has received this message searches the contact registry table 15 to read out the type of communication method and the contact address corresponding to this nickname (S1001). Then, the dummy client 3 requests a back-end server corresponding to the thus read-out type of communication method "email" (mail server) to transmit the notification message to the contact address (S1003 to S1005). As a result, the notification message to be forwarded is securely transmitted to the addressee by this back-end server (mail server).

Monitoring of Connection Status of Users

The above-mentioned message forwarding and contact can be achieved through a regular message transmission scheme of chat if the addressee is accessing a channel. Accordingly, a user who is about to request of the forwarding and/or the contacting needs to know whether the addressee is accessing a channel or whether the addressee is connecting to the chat server 1. However, in a chat system, each user does not possess accurate information regarding who is currently accessing the channel of the chat server 1 which the user is accessing. To obviate this problem, the present embodiment provides two types of means for allowing each user to inquire the dummy client 3 about the accessing status of other users.

One of them has a relatively less accuracy, but provides a prompt response to such an inquiry because it requires involvement of only the dummy client 3. To provide a response to such an inquiry, the dummy client 3 is constantly monitoring messages sent to each channel from all users, and records transmitting time of the last message sent to each channel from each user, and specified keywords indicating termination of the accessing the channel extracted from such messages in the channel management table 12 (S0111). When a user wishes to know whether another particular user is accessing the channel which the user is accessing, such a user sends to the channel a main message in the following format attached with the nickname (John) of the dummy client 3 as the addressee.

"user05 are you there?"

Here, the "user05" is the nickname of the user who is the subject of the inquiry.

The dummy client server 3 that has received this message searches the channel management table 12 to determine whether such a user exists in that channel (S1101).

Specifically, if a keyword that was extracted from the last utterance transmitted by that user is found in the channel management table 12, the dummy client 3 provides a response to the inquiry in the following format, for example (S1103).

"There is a possibly that the user is gone (10:00 Bye-bye)"

Here, the "10:00%" is the time the user last sent a massage. The "Bye-bye" is a specified keyword extracted from the last message. On the other hand, if no specified keyword is found, the dummy client 3 provides a response to the inquiry in the following format, for example (S1104).

"That user is here"

Another means by which a user can inquire the dummy client 3 about the accessing status of other users can provides a more accurate response, and requires cooperation between the dummy client 3 and the chat server 1. To provide a response to this inquiry, the chat server 1 is constantly monitoring information regarding clients 2, which is accessing each channel. When a user wishes to know whether another particular user is accessing any one of the channels of the chat server 1, such a user sends to a channel a main message in the following format attached with the nickname (John) of the dummy client 3 as the addressee.

"user06 where are you?"

Here, the "user06" is the nickname of the user who is the subject of the inquiry.

The dummy client 3 that has received this message requests the chat server 1 to determine to which channel the user is accessing, using a "who is" command or the like (S1201–S1203). The chat server 1 that has received such a request responds to the request by providing identification information regarding all channels which that user is currently accessing, or stating that that user is not accessing any of the channels. Receiving this response, the dummy client 3 provides the following answer to the original inquiry if that user is found to be accessing any of the channels (S1206).

"that user is in #patent, #planning"

Here, "#patent" and "#planning" are the names of the channels.

Notify

For example, when a system manager of the chat server 1 wishes to send notices relating to management of the system to all users accessing each channels, the system manager needs to send the same message to every channel. To alleviate this inconvenience, the present embodiment provides means for forwarding the message to all the channels simply by sending the message to the dummy client 3 only once. Specifically, when a user utilizes such a service, the user sends to a channel a main message in the following format attached with the nickname (John) of the dummy client 3 as the addressee.

"Notice: System will be down due to maintenance"

Here, the "Notice" is an operation instruction segment, and "System will be down due to maintenance" is a notification message to be conveyed.

The dummy client 3 that has detected this message refers to the channel management table 12, and sends out the message, the requesting user name and the requesting time to all the channels which the dummy client 3 is currently accessing (S1301). In this way, all users accessing each channel can read the notice.

Dictionary Search

In the present embodiment, if the dummy client 3 receives an utterance requesting dictionary search during a chat, the dummy client 3 requests a dictionary server, which is a back-end server, to conduct the requested search on behalf of the requesting user. Accordingly, a dictionary search can be performed without providing any search tool. In this case, when a user wishes to utilize this dictionary search service, such a user sends to a channel a main message in the following format attaching the nickname (John) of the dummy client 3 as the addressee.

"dict −t sample"

Here, the "dict" is an operation instruction segment for calling the dictionary function, the "−t" is a parameter for searching a translation of the word to be translated, and the "sample" is the word to be translated. The dummy client 3 that has received this message determines that this is a request for translating a word, "sample", by analyzing its grammatical structure (S1401, S1402). Through a network interface or API, the dummy client 3 then transmits the corresponding inquiry to a dictionary server, which is a back-end server 4 that has been registered in the system as the dictionary server in advance, (S1403 to S1405). Having received a response from the dictionary server, the dummy client 3 provides the original requester with the following answer to the original inquiry in the following format, for example (S1408).

[sample] sample. n
  mihon, hyohon, shikyohin
  one item is found"

Home Page Search

In the present embodiment, if the dummy client 3 receives an utterance requesting home page search during a chat, the dummy client 3 requests a portal site, which is a back-end server, to conduct the requested search on behalf of the requesting user. Accordingly, home page searches can be performed without activating a browser. In this case, when a user wishes to utilize this home page search service, such a user sends to a channel a main message in the following format attached with the nickname (John) of the dummy client 3, as the addressee.

"find search: chat system"

Here, the "find" is an operation instruction segment for calling the search function, the "search" is the name of the portal site, and the "chat system" is the words to be searched.

The dummy client 3 that has received this message determines that this is a request to search the keyword, "chat system" with a postal site identified as "search" by analyzing its grammatical structure (S1501–S1503). Through a network interface or API, the dummy client 3 then transmits the corresponding inquiry to the postal site "search", which is a back-end server 4 that has been registered in the system in advance (S1504, S1505), and writes a searched result onto a cooperating Web server. The dummy client 3 then provides the original requester with the URL information of the Web server and the number of items found in the following format, for example (S1506–S1510, S1512).

="The result is summarized at http://www.John.server.ne.jp/John/sample/1.html.
123 items are found."

If the response from the back-end server does not include any item, the dummy client 3 notifies the requester that the number of items that matches the inquiry parameters is zero in the following format, for example (S1511, S1512).

"0 found"

Personal Information Search

In the present embodiment, if the dummy client 3 receives an utterance requesting personal information search during a chat, the dummy client 3 requests a personal information management server, which is a back-end server, to conduct the requested search on behalf of the requesting user. Accordingly, personal information searches can be performed without activating any tool. In this case, when a user wishes to utilize this personal information search service, such a user sends to a channel a main message in the following format attached with the nickname (John) of the dummy client 3 as the addressee.

"find ldap mail=tyamada@bld-z.John.co.jp"

Here, the "find" is an operation instruction segment for calling the search function, the "ldap" is the name of the search server, and the "mail=tyamada@bld-z.John.co.jp"the search condition.

The dummy client 3 that has received this message determines that this is a request to search personal information of a person having the mail address of "tyamada@bld-z.John.co.jp" with the "ldap" server by analyzing its grammatical structure (S1501–S1503). Through a network interface or API, the dummy client 3 then transmits the corresponding inquiry to the "ldap" server, which is a back-end server 4 that has been registered in the system in advance, (S1517, S1518), and provides the original requester with the items that can be displayed by the client 2 of the requester among all the items in the inquiry result (S1521, S1523).

"Company name=John Corporation
Division=Software development department
Name=Taro YAMADA
Mail=tyamada@bld-z.John.co.jp
Location=Building-Z
Tel: 1234-5678 (extension), 03-9876-5432 (outside line)
FAX: 123 1234-6789 (extension), 03-9876-4321 (outside line)
END"

Here, the above-mentioned search condition may include a wild card (*). In such a case, the search condition is equivalent to all possible logical ANDs of the keywords except the part designated by the wild card. Accordingly, the result of such a search may include a large number of items. Thus, in responding to such a fuzzy search, the dummy client 3 provides the requester with only items that corresponding to the predetermined output items among all search results (S1522, S1523). For example, suppose that the search request message is as follows:

"find ldap mail=suzuki@*"

In this case, the character string to be forwarded to the requester becomes as follows, for example.

"Taro SUZUKI Department A 03-5678-1234 suzuki@bld-a.John.co.jp
Jiro SUZUKI Department B 044-432-9876 suzuki@bld-b.John.co.jp
Hanako SUZUKI Department C 045-478-1234 suzuki@bld-c.John.co.jp
There are three items as listed above"

Also, with respect to a user whose nickname and contact address are registered in the contact registry table 15 in a manner described above, even if the nickname of such a user is given as a search condition, the dummy client 3 can make an appropriate request to the search server by looking up the contact registry table 15 to convert the nickname to its contact address (S1514–S1516). For example, if "tyamada@bld-z.John.co.jp" is registered as the contact address of the nickname, "user07" in the contact registry table 15, an appropriate inquiry can be dispatched in response to the following search request message.

"find ldap user 07"

Conference Room Reservation

In the present embodiment, if the dummy client 3 receives an utterance requesting to reserve a conference room or to confirm reservation of the conference room during a chat, the dummy client 3 makes a reservation or confirmation of the reservation of the conference room to a calendar server located at every department, which is a back-end server 4 on behalf of the requesting user. Accordingly, conference room reservation can be performed without preparing a separate tool. Specifically, when a user wishes to reserve a conference room through this system, such a user sends to a channel a main message in the following format attached with the nickname (John) of the dummy client 3 as the addressee.

"Conference room reservation Department A 1152 conference room 2000/02/03 13:00–18:00 Patent meeting"

Here, the "conference room reservation" is an operation instruction segment for calling the corresponding information search function. The "Department A" designates a calendar server to be used. The "1152 conference room" designates the conference room to be reserved. The "2000/02/03 is the year/month/date on which the conference room to be reserved. The "13:00–18:00" is a time window in which the conference room is to be reserved. The "Patent meeting" is the purpose of the conference room reservation.

The dummy client 3 that has received this message determines, by analyzing its grammatical structure, that this is a request to the calendar server located at the "department A" for reserving the "1152 conference room" on "2000/02/03" at "13:00–18:00" for "patent meeting" (S1601). Through a network interface or API, the dummy client 3 then transmits the corresponding inquiry to the calendar server at the department A, which is a back-end server 4, (S1602–S1604), and provides the original requester with the resultant response in the following format, for example (S1605–S1607).

"Calendar server=Department A

Reserved place=1152 conference room

Reserved date/time=2000/02/03 13:00–18:00

Memo=Patent meeting

The reservation was made as shown above"

Furthermore, when a user wishes to inquire the status of conference room reservation, such a user sends to a channel a main message in the following format attached with the nickname (John) of the dummy client 3 as the addressee.

"Conference room reference Department A 1152 conference room 2000/02/03 13:00–18:00"

Here, the "conference room reference" is an operation instruction segment for calling the corresponding information search function. The other sentence segments are the same as in the case of the conference room reservation above.

The dummy client 3 that has received this message determines, by analyzing its grammatical structure, that this is a request to the calendar server located at the "department A" for confirming the reservation status of the "1152 conference room" on "2000/02/03" at "13:00–18:00" (S1701). Through a network interface or API, the dummy client 3 then transmits the corresponding inquiry to the calendar server at the department A, which is a back-end server 4, (S1702–S1704), and provides the original requester with the resultant response in the following format, for example (S1705–S1707).

"Calendar server=Department A

Reserving person: Taro YAMADA

2000/02/03 13:00–18:00: Patent meeting

END"

If the calendar server responds to the above-mentioned inquiry for confirming the reservation statue by notifying that the corresponding conference room has not been reserved, the result is being forwarded to the requester in the following format, for example.

"It is not reserved"

Schedule Reference

In the present embodiment, if the dummy client 3 receives an utterance requesting to refer the schedule of a particular individual during a chat, the dummy client 3 requests a calendar server at the corresponding department, which is a back-end server, to refer the schedule of the individual that is managed by that calendar server on behalf of the requesting user. Accordingly, schedule reference can be performed without preparing a separate tool. Specifically, when a user wishes to request the schedule reference of a particular individual, such a user sends to a channel a main message in the following format attached with the nickname (John) of the dummy client 3 as the addressee.

"Schedule reference Department A Employee B 2000/02/03 13:00–18:00"

Here, the "Schedule reference" is an operation instruction segment for calling the corresponding information search function. The "Department A" designates a calendar server to be used. The "Employee B" is the real name of the individual whose schedule is to be referred. The "2000/02/03 is the year/month/date on which the schedule is to be referred. The "13:00–18:00" is a time window in which the schedule is to be referred.

The dummy client 3 that has received this message determines, by analyzing its grammatical structure, that this is a request to the calendar server located at the "department A" for referring the schedule of "employee B" on "2000/02/03" at "13:00–18:00" (S1801). Through a network interface or API, the dummy client 3 then transmits the corresponding inquiry to the calendar server at the department A, which is a back-end server 4, (S1806–S1808), and provides the original requester with the resultant response in the following format, for example (S1809–S1811).

"Calendar server=Department A

2000/02/03 13:00–18:00: Patent meeting

END"

Here, the real names of individuals whose schedules are to be referred and the name of the departments at which their corresponding calendar servers are located may be registered in the schedule reference support table 16 with associated with the nicknames of such individuals. In such a case, the user who requests this schedule reference may simply specify the nickname (user08) instead of the real name (Employee B) and the calendar server (department A). Specifically, the requester sends to a channel the following two main messages each attached with the nickname (John) of the dummy client 3 as the addressees.

"user08's name is Employee B"

"user08's calendar server is Department A"

The dummy client server 3 that has received these messages enters "Employee B", "Department A" and "user08" into the schedule reference support table 16 with them associated with one another (S1902, S2002). Once this is done, a user requesting to refer the schedule of employee B may send a main message in the following format instead of the above format.

"Schedule reference user08 2000/02/03 13:00–18:00"

The dummy client server 3 that has detected this message refers the schedule reference support table 16 and replaces "user08" with "Department A" and "Employee B" (S1803–S1805). Then, performing the same process as described above, the dummy client 3 notifies the requester with the same inquiry result (S1806–S1811).

Furthermore, as described above, the schedule reference support table 16 stores the nickname "user08", the real name "Employee B", and the name of the department at which the assigned calendar server is located "department A" for at least some of the users. If any one of such users accesses to any of the channels, the dummy client device 3 receives the "JOIN" message from the newly connected user and recognizes that the real name and the assigned calendar server of the user corresponding to its nickname "user08" are "Employee B" and "Department A", respectively (S0014). Then, through a network interface or API, the dummy client 3 transmits an inquiry to the calendar server at the department A, which is a back-end server 4 to refer the schedule of the employee B for the next 24 hours (S0016–S0018), and provides the newly connected user with the inquiry result in the following format, for example (S0019–S0021).

"m=user08=Today's schedule
=user08=13:00–18:00: Patent meeting
=user08=END"

Alarm

The above-mentioned specified messages are mainly addressed to a user other than the requesting user, and are not being read unless the intended receiver newly connects to a channel, or sends some type of massage. However, if a message can be transmitted to the intended receiver immediately after a specified time comes, the requesting user can utilize such a message as an alarm. Accordingly, the present preferred embodiment provides means for providing such an alarm. Specifically, when a user wishes to request alarm setting, such a user sends to a channel a main message in the following format attached with the nickname (John) of the dummy client 3 as the addressee.

"Alarm 17:00 time to go to Dentist"

Here, the "Alarm" is an operation instruction segment for calling the time notification function. The "17:00" designates a time when the alarm is made. The "time to go to Dentist" is a notification message to be conveyed.

The dummy client server 3 that has received this message enters the specified time (17:00) and the message (time to go to Dentist) into the alarm management table 17 with them associated with the nickname of the requesting user (user09) (S2104).

Here, the requesting user may specify time period after which since current time the alarm is made, instead of the specified time. In such a case, the format of the main message is as follows.

"Alarm 60 time to go to Dentist"

Here, the "60" is the specified time period.

The dummy client server 3 that has detected this message adds sixty minutes designated by the specified time period "60" to the current time to convert the time period to the specified time (S2103). Then, performing the process similar to above, the dummy client 3 performs registration with respect to the alarm management table 17 (s2104).

Then, the dummy client 3 checks whether the current time reaches the specified time (17:00) every time a predetermined period (one minute, for example) has passed (S0025). If the dummy client 3 determines that the current time reaches the specified time (17:00), the dummy client 3 forwards the notification message (it is time to go to Dentist) corresponding the specified time (17:00) to a user having the corresponding nickname (user09) in the following format, for example (S0027).

"It's time to go to Dentist>user09"

The dummy client 3 then deletes these items that have been forwarded to the addressee from the alarm management table 17 (S0028).

Keyword Processing

In the present embodiment, some groups of keywords have associations with respective response character strings. Thus, a character string corresponding to the keywords included in an utterance can be transmitted to a channel as a responding utterance by the dummy client 3.

Specifically, as a prerequisite to such keyword processing service, a user accessing a channel transmits to the channel a main message in the following format attached with the nickname (John) of the dummy client 3 as the addressee in order to request registration of the "memo" that provides a correspondence between a group of keywords and a character string.

"Memo user10, home page http://www.foo.bar.ne.jp/home/user10"

Here, the "Memo" is an operation instruction segment for information registration. The "user10" and "home page", which are separated by a comma, constitutes a group of keywords that are to be registered. The "http://www.foo.bar.ne.jp/home/user10" that follows the keywords with a space is a character string to be associated with the keyword group.

The dummy client server 3 that has detected this message registers, through grammar analysis, the keyword group of "user10" and "home page", and the character string "http://www.foo.bar.ne.jp/home/user10" in the keyword registry table 18 in an associated manner (S2201, S2202).

On the other hand, the dummy client 3 is constantly monitoring all utterances sent to each channel from each user (S0107). Once the dummy client 3 detects an utterance (a message) that includes all of the constituent keywords of a group listed in the keyword registry table 18, it sends out a corresponding character string that is associated with the keyword group in the keyword registry table 18 to that channel (S0309, S0310). Suppose that the following utterance (message) is detected after the above-mentioned "memo" is constructed.

"What is the home page address of user10?"

Then, the dummy client 3 detects that this utterance (message) includes the keyword group ("user10" and "home page") registered in the keyword registry table 18, and automatically responds to the message in accordance with the character string "http://www.foo.bar.ne.jp/home/user10" that has been registered in the keyword registry table 18 as corresponding to this keyword group in the following format (S0305).

"It is http://www.foo.bar.ne.jp/home/user10"

Here, a user who registers the "memo" providing a correspondence between keyword groups and character strings may specify such a correspondence as effective only in a particular channel. In such a case, the user sends out to a channel a main message in the following format attached with the nickname (John) of the dummy client 3 as the addressee.

"Memo user10, home page, # sample http://www.foo.bar.ne.jp/home/user10"

Here, the "# sample" that follows a comma designates such a particular channel in which the correspondences are effective. The dummy client server 3 that has detected this message recognizes the "# sample", which is a sentence segment starting with "#", as specifying a channel in which the correspondence is effective, and registers the keyword group and the character string together with such an effective channel in the keyword registry table 18 (S2202).

Thereafter, if a message (utterance) containing the keyword group ("user10" and "home page") is transmitted in a channel other than the channel designated by "# sample", the dummy client 3 ignores such a message (utterance) (S0303). However, if a message (utterance) containing the keyword group ("user10" and "home page") is transmitted in the channel designated by "# sample", the dummy client 3 transmits the character string "http://www.foo.bar.ne.jp/home/user10", which has been registered in the keyword registry table 18 as corresponding to the keyword group (S0305).

Furthermore, each user can confirm the content of all "memos" which have been registered in the keyword registry table 18 in a manner described above. In such a case, the user sends to a channel a main message in the following format attached with the nickname (John) of the dummy client 3 as the addressee.

"Memo outlook"

Here, the "Memo outlook" is an operation instruction segment for information reference.

The dummy client 3 that has detected this message converts all information registered in the keyword registry table 18 to a HTML file and writes the HTML file in a Web server that is specified in the environment setting. The dummy client 3 also generates the corresponding URL for the file, and notifies the original requester of the URL in the following format, for example (S2302, S2304, S2305).

"Memo outlook is available at http://www.John.server.ne.jp/John/sample/2.html 23 items are found"

Here, in requesting such confirmation of the "memos", a user may request confirmation of the content of the "memos" that are effective only in a particular channel. In such a case, the user sends to a channel a main message in the following format attached with the nickname (John) of the dummy client 3 as the addressee.

"Memo outlook # sample"

Here, the "# sample" designates such a channel.

The dummy client 3 that has detected this message converts only information registered in the keyword registry table 18 that corresponds to the channel "# sample" to a HTML file and writes the HTML file in a Web server that is specified in the environment setting. The dummy client 3 also generates the corresponding URL for the file, and notifies the original requester of the URL in the following format, for example (S2303, S2304, 52305).

"Memo outlook for # sample is available at http://www.John.server.ne.jp/John/sample/3.html 11 items are found"

In the cases above, a character string (simple text), which is to be outputted when the corresponding keyword group is detected in an utterance, is registered in the keyword registry table 18. However, character strings including special character ($@, $%, $=) may also be registered in the keyword registry table 18.

Specifically, suppose that there is a document file named "dice.txt" having the following content.

"1

2

3

4

5

6"

In this case, a user can register the file name "dice.txt" in the keyword registry table 18 as a character string by attaching a special character string "$@" to the head of the file name. In this case, the user requesting such a registration sends to a channel a main message in the following format attached with the nickname (John) of the dummy client 3 as the addressee.

"Memo dice, $@dice.txt"

Once this is done, when the dummy client 3 detects a message including the keyword group "dice", the dummy client 3 arbitrarily reads out one line from the file named "dice.txt" that follows the special character string "$@", and responds to the message by sending it out (S0309, S0310). In this case, the conversation between the user who sent out the message and the dummy client 3 is as follows, for example:

"<user11> Dice

<John>4

<user11> Dice

<John>2"

In another example, suppose that there is a file named "news.txt" having the following content.

"news 1—1 news 1-2 news 1-3 news 2-1 news 2-2"

In this case, a user can register the file name "news.txt" in the keyword registry table 18 as a character string attached with a special character string "$%" at the head thereof. In this case, the user requesting such a registration sends to a channel a main message in the following format attached with the nickname (John) of the dummy client 3 as the addressee.

"Memo news, $% news.txt"

Once this is done, when the dummy client 3 detects a message including the keyword group "news", the dummy client 3 reads out an arbitrary one sentence separated by delimiters (one-character spaces, for example) from the file specified by the file name "news.txt" that follows the special character "$%", and responds to the message by sending it out. (S0309, S0310). In this case, the conversation between the user who sent out the message and the dummy client 3 is as follows, for example;

"<user12>News

<John>news 2-1

<John>news 2—2

<user12>News

<John> news 1—1

<John> news 1-2

<John> news 1-3"

Furthermore, a user can register a message requesting an instructed process (S0308) in the keyword registry table 18 as a character string attached with a special character string "$=". In this case, the user requesting such a registration sends to a channel a main message in the following format attached with the nickname (John) of the dummy client 3 as the addressee.

"Memo user A, are you there? $=user13 are you there?"

Here, the "user13 are you there" is a main message requesting instructed processes shown in FIG. 23. Once this is done, when the dummy client 3 detects a message including the keyword group ("user A" and "are you there?"), the dummy client 3 executes, in accordance with the main message that follows the special character string "$=", the instructed process (FIG. 23) corresponding to the operation instruction segment or the specified context (are you there?) in the main message (S0308).

With the embodiment explained above, by transmitting a message in a predetermined format to a channel of the chat server 1, a user connecting to such a channel can instruct the dummy client 3 to perform a designated process in accordance with the content of the message even when other client 2 (the intended receiver) is not connecting to that channel. Accordingly, users can utilize their time in a chat more effectively. Further, when a plurality of users are connecting to a channel, the dummy client 3 can perform various processes in accordance with the content of utterances (messages) from each user. Thus, the users can request the dummy client 3 to perform various processes to support the conversation (chat) without using separate tools other than the chat system.

As explained above, the dummy client device of the present invention behaves as a separate client with respect to a user client terminal which is connecting to a channel provided by a chat server, and can automatically conduct information exchange with the client terminal in accordance with the content of messages transmitted from the client terminal.

We claim:

1. A dummy client device for conducting a chat with at least one client device though a chat server, the dummy client device comprising:
    a monitoring part monitoring the content of an utterance sent to said chat server from a client device;
    a determination part determining whether the content of the utterance monitored by the monitoring part satisfies a predetermined sentence condition; and
    a process execution part, when the determination part determines that the utterance satisfies the predetermined sentence condition, executing a process corresponding to the predetermined sentence condition in accordance with the content of the utterance.

2. The dummy client device according to claim 1, wherein the predetermined sentence condition is that a predetermined word or sentence segment is included in the utterance.

3. The dummy client device according to claim 1, wherein the predetermined sentence condition is that a predetermined word or sentence segment is located at a predetermined position in the utterance.

4. The dummy client device according to claim 1, wherein said determination part determines whether the content of the utterance satisfies the predetermined sentence condition only when the utterance is addressed to itself.

5. The dummy client device according to claim 1, further comprising a message table for storing a correspondence between a message to be conveyed and its forwarding address,
    wherein when said determination part determines that an utterance from a client device satisfies a predetermined sentence condition, said process execution part registers a message to be conveyed and its forwarding address that are included in the utterance into said message table.

6. The dummy client device according to claim 5, wherein when said determination part determines that an utterance from a client device satisfies another predetermined sentence condition, said process execution part sends out to said chat server a message to be forwarded to the client device as an utterance, the process execution means thereafter deleting the message sent out and its forwarding address from said message table.

7. The dummy client device according to claim 6, wherein when said determination means determines that an utterance from a client satisfies still another predetermined sentence condition, said process execution part sends out, as an utterance, to said chat server messages that are currently registered in said message table among messages included in utterance that had been transmitted by said client in the past.

8. The dummy client device according to claim 6, wherein when said determination part determines that an utterance from a client satisfies still another predetermined sentence condition, said process execution part deletes messages included in utterance that had been transmitted by said client in the past from said message table.

9. The dummy client device according to claim 5, wherein when a predetermined condition is satisfied, said process execution part sends out message information to said chat server as an utterance, the message information indicating that there is a message to be forwarded to the forwarding address registered in said message table.

10. The dummy client device according to claim 9, wherein said predetermined condition is that a client that has been registered in said message table as the forwarding address transmits an utterance to said chat server.

11. The dummy client device according to claim 5, further comprising a date and time specified message table for storing a message to be conveyed, its forwarding address, and a specified date/time associated with one another,
    wherein when said determination part determines that an utterance from a client satisfies another predetermined sentence condition, said process execution part registers a message to be conveyed, its forwarding address, and its specified date/time that are included in the utterance into said date and time specified message table, and
    wherein when a current time reaches said specified date/time, said process execution part moves said message to be conveyed and its forwarding address that have been registered in the said date and time specified table corresponding to said specified date/time to said message table.

12. The dummy client device according to claim 1, further comprising management part, when an utterance from client monitored by said monitoring part includes a keyword indicating a termination of a chat, recording identification information of the client and the keyword spoken by the client,
    wherein when said determination part determines that an utterance from a client satisfies a predetermined sentence condition, said process execution part sends out to said chat server, as an utterance message information indicating whether a client whose identification information is included in said utterance is still accessing said chat server in accordance with the content recorded in said management part.

13. The dummy client device according to claim 1, wherein when said determination part determines that an utterance from a client satisfies a predetermined sentence condition, said process execution part sends out a message included in such an utterance to all channels of said chat server.

14. The dummy client device according to claim 1, wherein said predetermined sentence condition is that one or more of keywords that has been registered in advance is included in the utterance.

15. The dummy client device according to claim 14, wherein when said determination part determines that an utterance from a client satisfies said predetermined sentence condition, said process execution part sends out to said chat server, as an utterance, message information that has been associated with said one or more of keywords included in the utterance in advance.

16. The dummy client device according to claim 14, wherein when said determination part determines that an utterance from a client satisfies said predetermined sentence condition, said process execution part sends out to said chat server, as an utterance, the content of a document file specified by message information that has been associated with said one or more of keywords included in the utterance in advance.

17. The dummy client device according to claim 16, wherein when said message information includes an file name of said document file and a special character string, said process execution part sends out to said chat server, as an utterance, a part of the content of a document file having said file name.

18. The dummy client device according to claim 15 or 16, further comprising a keyword registry table for storing a correspondence between said one or more of keywords and said message information on demand, said determination part and said process execution part referencing the keyword registry table.

19. The dummy client device according to claim 18, wherein said keyword registry table further registers a specified channel of said chat server in which the correspondence between said one or more keywords and said message information is effective,
wherein when said determination part determines that an utterance from a client satisfies said predetermined sentence condition, said process execution part executes said process as long as correspondence of one or more of keywords contained in the utterance and a message information is not specified as effective in a channel that is different from a channel in which the utterance is transmitted.

20. The dummy client device according to claim 19, wherein when said determination part determines that an utterance from a client satisfies another predetermined sentence condition, said process execution part registers one or more of keywords included in the utterance, said message information, and at least one said specified channel into said keyword registry table with them associated with one another.

21. The dummy client device according to claim 18, wherein when said determination part determines that an utterance from a client satisfies another predetermined sentence condition, said process execution part registers one or more of keywords included in the utterance and said message information into said keyword registry table with them associated with each other.

22. The dummy client device according to claim 1, wherein when said determination pat determines that an utterance from a client satisfies a predetermined sentence condition, said process execution part executes a process corresponding to the predetermined sentence condition by cooperating with a back-end server connected via communication.

23. The dummy client device according to claim 22, wherein when said determination part determines that an utterance from a client satisfies a predetermined sentence condition, said process execution part requests a predetermined back-end server to transmit a message included in the utterance to a contact address of an addressee specified in the utterance.

24. The dummy client device according to claim 23, further comprising a contact registry table for registering said addressee, a communication method and a contact address in a mutually associated manner,
wherein said process execution part requests a back-end server to transmit said message to said contact address that is associated in said contact registry table with said addressee specified in said utterance, the back-end server being selected in accordance with the communication method that is associated with said addressee in the contact registry table.

25. The dummy client device according to claim 24, wherein when said determination part determines that an utterance from a client satisfies another predetermined sentence condition, said process execution part registers an addressee, a communication method, and a contact address that are included in the utterance into said contact registry table with them associated with one another.

26. The dummy client device according to claim 22, wherein when said determination part determines that an utterance from a client satisfies a predetermined sentence condition, said process execution part requests a predetermined back-end server to search for items in accordance with letters included in the utterance.

27. The dummy client device according to claim 26, wherein said process execution part requests a dictionary server to translate the letters included in said utterance, and sends out to said chat server, as an utterance, message information based on a response from the dictionary server.

28. The dummy client device according to claim 26, wherein said process execution part requests a portal site to search for URL of a home page relating to letters included in said utterance, said process execution means converting a response from the portal site to an HTML document and sending out a URL of the HTML document to said chat server as an utterance.

29. The dummy client device according to claim 26, wherein said process execution part requests a personal information management server to search for personal information based on a search condition included in said utterance, and sends out to said chat server, as an utterance, message information based on a response from the personal information management server.

30. The dummy client device according to claim 22, wherein when said determination part determines that an utterance from a client satisfies a predetermined sentence condition, said process execution part requests a calendar server that is managing a place specified in the utterance to reserve said place for a time specified in the utterance.

31. The dummy client device according to claim 22, wherein when said determination part determines that an utterance from a client satisfies a predetermined sentence condition, said process execution part requests a calendar server that is managing a facility specified in the utterance to check a reservation status of said facility for a time specified in the utterance, and sends out to said chat server, as an utterance, message information based on a response from the calendar server.

32. The dummy client device according to claim 22, wherein when said determination means determines that an utterance from a client satisfies a predetermined sentence condition, said process execution part requests a calendar server that is managing a schedule of an individual specified by an individual name included in the utterance to check said schedule of the individual for a time specified in the utterance and sends out to said chat server, as an utterance, message information based on a response from the calendar server.

33. The dummy client device according to claim 1, further comprising an alarm table for storing an alarm message and a specified date/time associated with each other, wherein when said determination part determines that an utterance from a client satisfies another predetermined sentence condition, said process execution part resisters an alarm message and a specified time that are included in the utterance into said alarm table, and wherein when a current time reaches said specified time, said execution part sends out to said chat server, as an utterance, said alarm message that has been registered in said alarm table as corresponding to said specified time.

34. A computer readable medium storing a dummy client program, the dummy client program causing a computer that is capable of communication via a communication channel to perform the steps of:

having a chat with other clients through a chat server;

monitoring the content of utterance sent to said chat server from said other clients;

determining whether the content of said utterance satisfies a pre-determined sentence condition; and executing, when the utterance satisfies the predetermined sentence condition, a process corresponding to the predetermined sentence condition in accordance with the content of the utterance.

35. A chat system comprising:

a chat server to which a plurality of clients is able to access via a communication channel, and which provides a chat environment where an utterance transmitted from any one of clients is sent out to other clients, and a dummy client device including a communication part accessing the chat server as a client through a communication channel, a monitoring part monitoring the content of utterances set to said chat server from said other clients, a determination part determining whether the content of the utterance monitored by the monitoring part satisfies a predetermined sentence condition, and a process execution part, when the determination part determines that an utterance satisfies the predetermined sentence condition, executing a process corresponding to the predetermined sentence condition in accordance with the content of the utterance.

* * * * *